(12) United States Patent
Canini et al.

(10) Patent No.: US 9,373,016 B2
(45) Date of Patent: Jun. 21, 2016

(54) IMAGE CAPTURING DEVICE

(75) Inventors: Federico Canini, Zola Predosa (IT); Guido Maurizio Oliva, Rovigo (IT)

(73) Assignee: DATALOGIC IP TECH S.R.L., Lippo di Calderara di Reno (Bologna) (IT)

( * ) Notice: Subject to any disclaimer, the term of this patent is extended or adjusted under 35 U.S.C. 154(b) by 798 days.

(21) Appl. No.: 13/583,344

(22) PCT Filed: Mar. 11, 2010

(86) PCT No.: PCT/IT2010/000103
§ 371 (c)(1),
(2), (4) Date: Sep. 7, 2012

(87) PCT Pub. No.: WO2011/111079
PCT Pub. Date: Sep. 15, 2011

(65) Prior Publication Data
US 2013/0038719 A1 Feb. 14, 2013

(51) Int. Cl.
*G06K 7/10* (2006.01)
*G06K 7/14* (2006.01)

(52) U.S. Cl.
CPC ........ *G06K 7/10732* (2013.01); *G06K 7/10801* (2013.01)

(58) Field of Classification Search
CPC . G06K 7/10; G06K 7/10574; G06K 7/10587; G06K 7/10722; G06K 7/10732; G06K 7/10801
USPC ................. 235/454, 462.01–462.49
See application file for complete search history.

(56) References Cited

U.S. PATENT DOCUMENTS

| | | | |
|---|---|---|---|
| 5,168,167 A * | 12/1992 | Prakash | G06K 7/10841 250/236 |
| 5,319,182 A | 6/1994 | Havens et al. | |
| 5,331,176 A | 7/1994 | Sant' Anselmo et al. | |
| 5,354,977 A | 10/1994 | Roustaei | |
| 5,359,185 A * | 10/1994 | Hanson | 235/454 |

(Continued)

FOREIGN PATENT DOCUMENTS

| | | |
|---|---|---|
| CN | 1725800 A | 1/2006 |
| DE | 233463 A1 | 2/1986 |

(Continued)

OTHER PUBLICATIONS

Extended European Search Report and Opinion dated Sep. 19, 2014 from corresponding European Application No. 14169862.1-1806.

(Continued)

*Primary Examiner* — Laura Gudorf
(74) *Attorney, Agent, or Firm* — Duane Morris LLP

(57) ABSTRACT

An image capturing device includes an image forming device including a sensor defining an optical reception axis, at least one reading distance, and a region framed by the sensor on a substrate at said at least one reading distance. An illumination device includes an array of adjacent light sources defining an optical illumination axis. The light sources are individually drivable, and each light source is adapted to illuminate an area of a size much smaller than the size of said region framed by the sensor. The illumination axis does not coincide with the reception axis. A driver of the light sources is adapted to drive the light sources so as to switch off at least the light sources that illuminate outside of the boundary of the region framed by the sensor on the substrate at said at least one reading distance.

42 Claims, 24 Drawing Sheets

(56) References Cited

U.S. PATENT DOCUMENTS

| | | | |
|---|---|---|---|
| 5,378,883 | A | 1/1995 | Batterman et al. |
| 5,430,286 | A | 7/1995 | Hammond, Jr. et al. |
| 5,949,057 | A | 9/1999 | Feng |
| 6,000,612 | A | 12/1999 | Xu |
| 6,166,375 | A * | 12/2000 | Ahten et al. ............... 250/234 |
| 6,811,085 | B2 | 11/2004 | Carlson et al. |
| 6,812,467 | B2 | 11/2004 | Nakamura et al. |
| 7,296,749 | B2 | 11/2007 | Massieu |
| 7,392,951 | B2 | 7/2008 | Ray et al. |
| 7,579,582 | B2 | 8/2009 | Kaltenbach et al. |
| 7,602,505 | B2 | 10/2009 | Kaltenbach |
| RE41,349 | E * | 5/2010 | Piva et al. ............... 235/462.43 |
| 2001/0035489 | A1* | 11/2001 | Chaleff et al. ............ 250/201.1 |
| 2002/0047046 | A1 | 4/2002 | Piva et al. |
| 2003/0062413 | A1 | 4/2003 | Gardiner et al. |
| 2006/0162226 | A1 | 7/2006 | Tai |
| 2006/0163355 | A1 | 7/2006 | Olmstead et al. |
| 2007/0090193 | A1* | 4/2007 | Nunnink et al. ............ 235/473 |
| 2007/0158427 | A1 | 7/2007 | Zhu et al. |
| 2007/0201003 | A1 | 8/2007 | Rankin |
| 2008/0128511 | A1 | 6/2008 | Schwartz et al. |
| 2009/0039383 | A1 | 2/2009 | Chu et al. |
| 2009/0224053 | A1* | 9/2009 | Barkley et al. .......... 235/462.42 |
| 2009/0230884 | A1* | 9/2009 | Van Doorn ................ 315/297 |
| 2009/0273794 | A1 | 11/2009 | Østergaard |

FOREIGN PATENT DOCUMENTS

| | | |
|---|---|---|
| DE | 102005054658 A1 | 5/2007 |
| DE | 102006056556 A1 | 6/2008 |
| EP | 0524029 A2 | 1/1993 |
| EP | 0962880 A1 | 8/1999 |
| EP | 1128315 A1 | 8/2001 |
| EP | 1466292 B1 | 3/2007 |
| EP | 1764835 A1 | 3/2007 |
| EP | 1850269 A1 | 10/2007 |
| WO | WO97/19416 A1 | 5/1997 |
| WO | WO2005/043449 A | 5/2005 |
| WO | 2005050390 A2 | 6/2005 |
| WO | WO2009/100358 A1 | 8/2009 |

OTHER PUBLICATIONS

United States Patent and Trademark Office Non-Final Office Action issued Jun. 26, 2015, including cited references, for corresponding U.S. Appl. No. 14/568,460, filed Dec. 12, 2014.
International Search Report dated Mar. 9, 2011 in corresponding International Application No. PCT/IT2010/000103.
"OLEO/CMOS combo opens a new world of microdisplay", Laser Focus World, Dec. 2001, vol. 37, issue 12, Pennwell Publications.
"Organically grown: Luminescent organic crystals and polymers promise to revolutionize flat-panel displays with possibilities for low-cost manufacture and more portability", Laser Focus World, Aug. 2001, vol. 37, issue 8, Pennwell Publications.
W.J. Smith, Modern Optical engineering, 3rd ed., ed. McGraw Hill 2000, chap. 6.8.
Office Action issued on Jul. 15, 2014 in corresponding Chinese Application No. 201080066573.4.
United States Patent and Trademark Office, Final Office Action including cited references in corresponding U.S. Appl. No. 14/568,460, issued Dec. 10, 2015, pp. 1-15.
European Patent Office, Notice of Opposition listing attached references filed in EP 2545491 on Feb. 5, 2016, pp. 1-45.
E1 Document: Internet publication Reicheltpedia: "LED," http://www.reichelt.de/reicheltpedia/index.php5?title=LED&oldid=1414,published on Feb. 16, 2010.
E2 Document: Internet publication LED-INFO: "Abstrahlcharakteristik," http://led-info.de/grundlagen/leuchtdioden/led-abstrahlcharakteristik.html as captured by the Internet Archive Wayback Machine on Mar. 5, 2010; Wayback Machine Link: https://web.archive.org/web/201 00305181922/http://www.ledinfo.de/grundlagen/leuchtdioden/led-abstrahlcharakteristik.html.

* cited by examiner

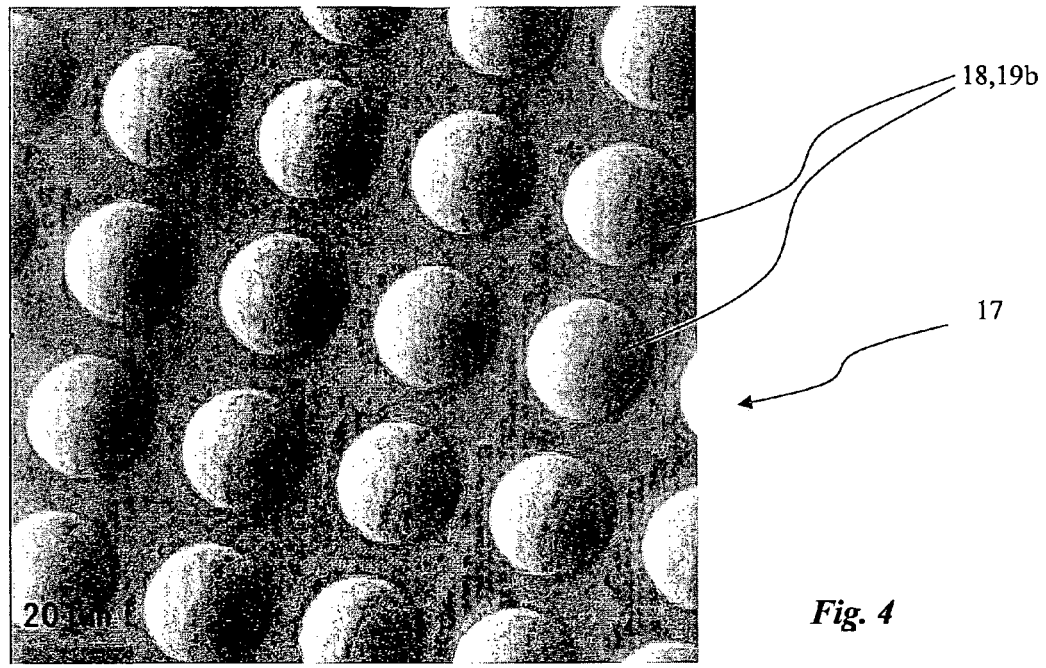
*Fig. 4*
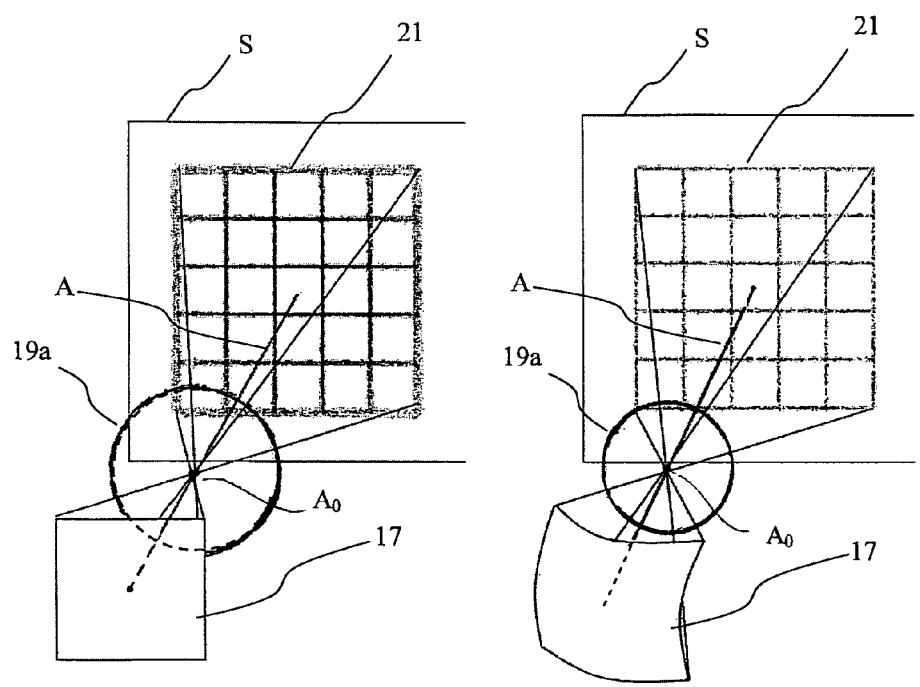
*Fig. 5*        *Fig. 6*

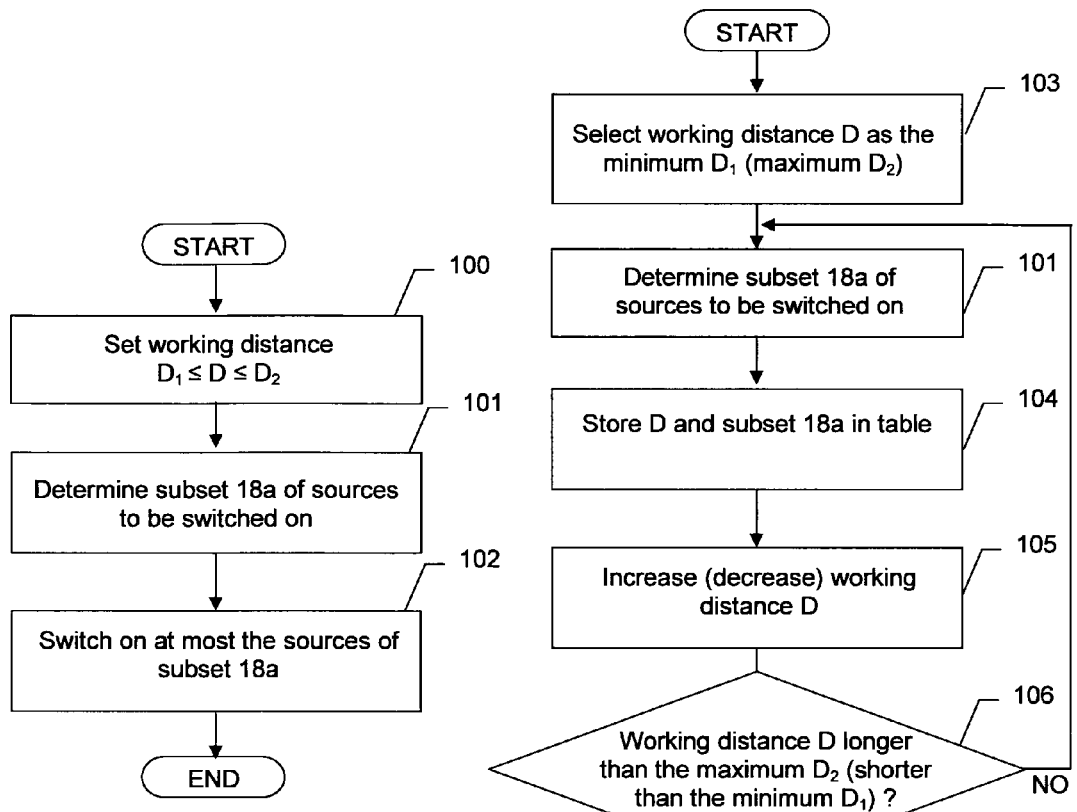
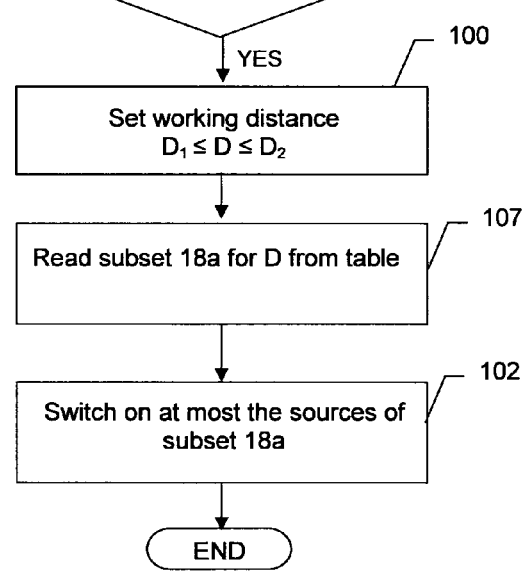
Fig. 7
Fig. 8

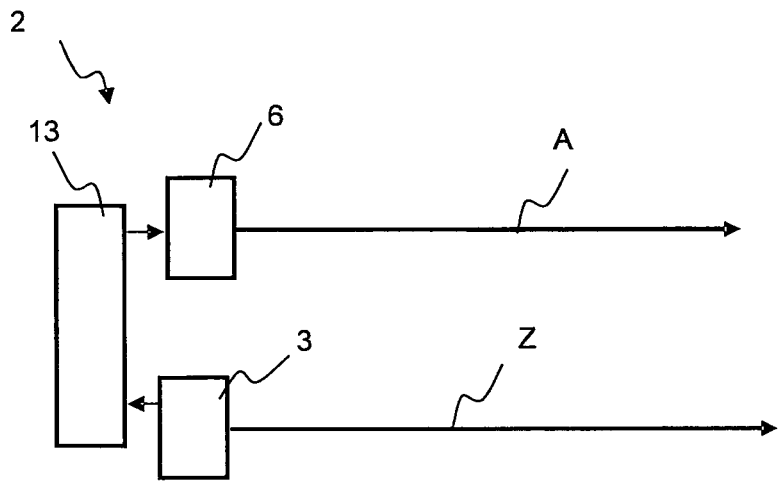
*Fig. 22*
*Fig. 23*
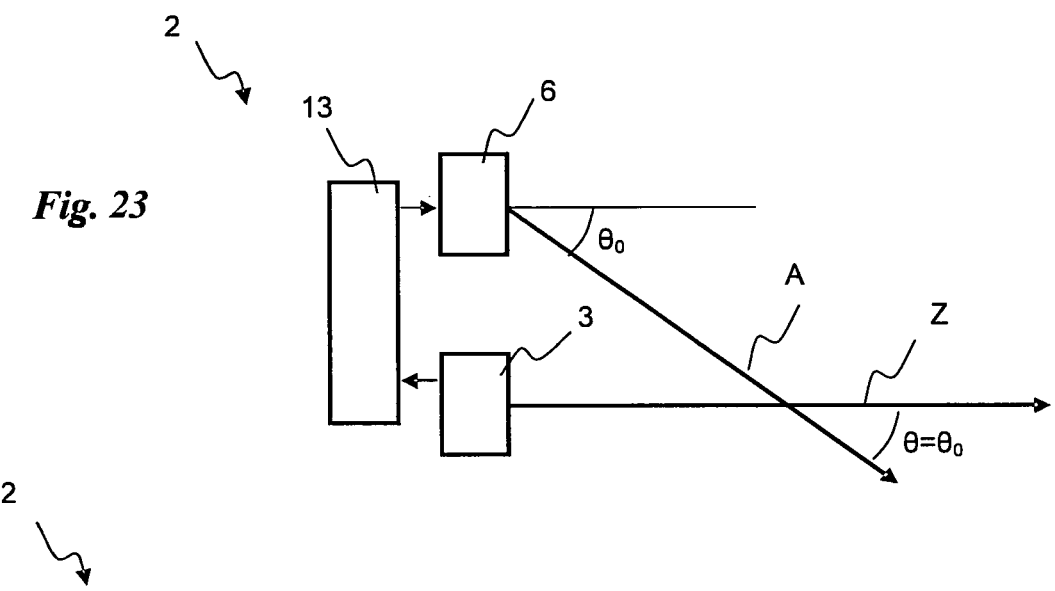
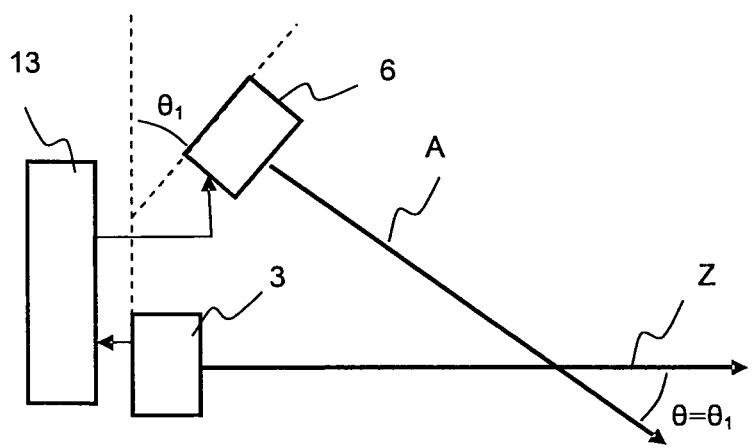
*Fig. 24*

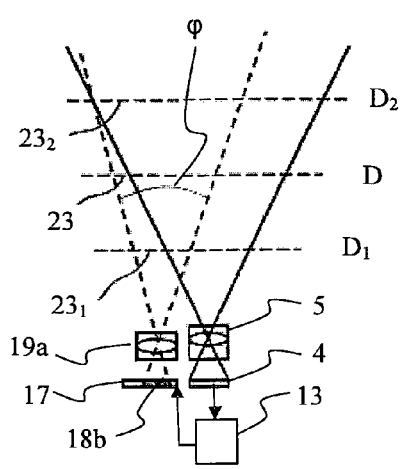 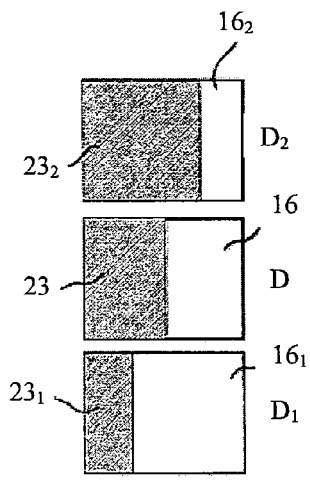
*Fig. 30*          *Fig. 31*
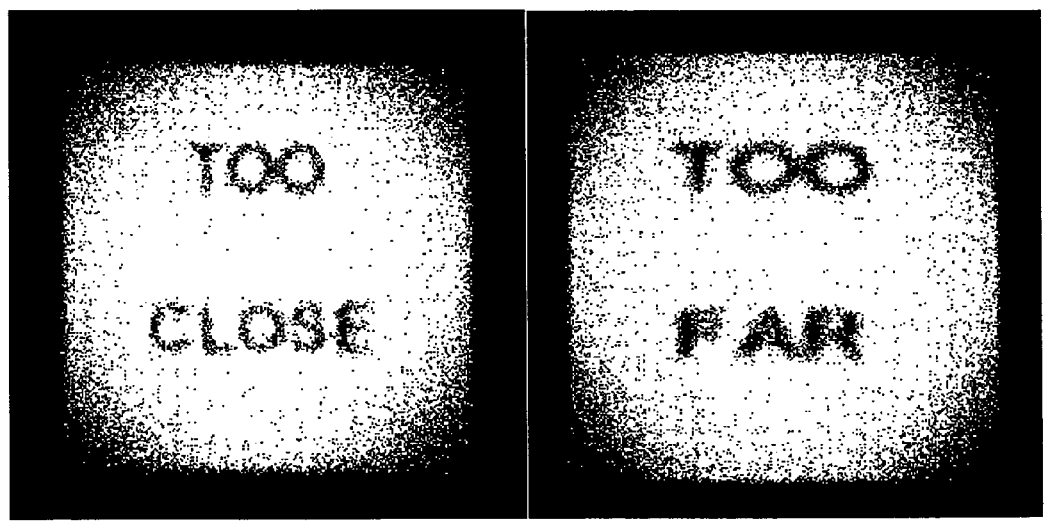
*Fig. 32*          *Fig. 33*

US 9,373,016 B2

IMAGE CAPTURING DEVICE

BACKGROUND AND SUMMARY OF THE INVENTION

The present invention concerns an image capturing device and in particular such a device of a reading system or reader of optical information of the "imager" type.

Imager type readers of optical information are well known. Such readers comprise an image capturing device capable of capturing or acquiring the image of optical information present on a substrate of whatever kind, including a display on which the optical information is displayed in turn by whatever electrical or electronic device.

In the present description and in the attached claims, the expression "optical information" is used in its widest sense to include both one-dimensional, stacked and two-dimensional optical codes, in which information is encoded in the shapes, sizes, colours and/or reciprocal positions of elements of at least two distinct colours, and alphanumeric characters, signatures, logos, stamps, trademarks, labels, hand-written text and in general images, as well as combinations thereof, in particular present on pre-printed forms, and images containing features suitable for identifying and/or selecting an object based on its shape and/or volume.

In the present description and in the attached claims, the term "light" is used in its widest sense, indicating electromagnetic radiation of a wavelength or of a range of wavelengths not only in the visible spectrum, but also in the ultraviolet and infrared spectra. Terms such as "colour", "optical", "image" and "view" are also used in the same widest sense. In particular, the encoded information can be marked on a substrate in invisible ink, but sensitive to ultraviolet or infrared rays.

Imager type readers of optical information typically comprise, in addition to the image capturing device, devices having one or more different other functions, or are in communication therewith.

Among such further devices are mentioned herein: a device for processing the captured image, capable of extracting the information content from such an image or from a portion thereof; a memory device; a device or interface for communicating the acquired image and/or the extracted information content outside the reader; a device or interface for inputting configuration data for the reader, coming from an external source; a device for displaying to the user alphanumeric and/or graphical information relating for example to the operative state of the reader, the content of the information read, etc.; a device for manually inputting control signals and data; an internal device for supplying power, or for taking a power supply signal from the outside.

Moreover, among the further devices that can be included in or associated with an imager type optical information reader are mentioned herein: an aiming device that aids the operator in positioning the reader with respect to the optical information by displaying on the substrate a visual indication of the region framed by the image capturing device, for example its centre and/or at least part of its edges and/or corners; an aid device for correctly focussing the image capturing device (rangefinder), which displays on the substrate a luminous figure having variable shape, size and/or position between a focussed condition and an out-of-focus condition, and possibly indicative of the direction in which to mutually move the image capturing device and the substrate to reach the focussed condition; an outcome indication device, which displays on the substrate a luminous figure indicative of the positive or negative outcome, and possibly of the reasons for a negative outcome, of an attempt at capturing an image and/or decoding the optical information, through variations in shape, size, colour and/or position of the luminous figure; a device for detecting the presence of a substrate and/or for measuring or estimating the reading distance, namely the distance between a reference in the reader, in particular a sensor of the image capturing device, and the substrate. The functions of targeting and indicating focus can also be made together through the projection of a suitable luminous figure, for example a pair of inclined bars or a pair of crosses, respectively, that cross each other at their centres or superimpress to each other, respectively, at the centre of the region framed by the image capturing device only at the focused distance.

The measurement or estimate of the distance is typically used by the reader to activate the decoding algorithm only when the optical information is located at a distance comprised between the minimum and maximum working distance, and/or to control a zoom device and/or a device for automatically changing the focussing distance of the image capturing device (autofocus). Moreover, the measurement or estimate of the distance can be used in the case in which digital restoration of the image is necessary, since the degrading function, or the PSF (point spread function) of the optics of the image forming device, depends upon the reading distance. Furthermore, the measurement or estimate of the distance is necessary to calculate the volume of an object.

Devices for aiming and/or indicating focus are for example described in U.S. Pat. Nos. 5,949,057, 6,811,085, 7,392,951 B2, in 5,331,176, in 5,378,883 and in EP 1 466 292 B1.

Outcome indication devices are described, for example, in the aforementioned document U.S. Pat. No. 5,331,176 and in EP 1 128 315 A1.

It is worth emphasising that each of the functions of aiming, indication of the focus condition, outcome indication, detection of presence and measurement or estimate of the reading distance can be implemented in different ways that are per se well known and do not exploit the projection of light on the substrate. Purely as an example are quoted herein, for the aiming and/or the focus condition, viewfinders and displays of what is framed by the sensor; for the indication of outcome, sound indications and visual indications projected not on the substrate, rather towards the operator; for the detection of presence, measurement or estimate of the distance and/or evaluation of the focus condition, photocell systems, radar or ultrasound devices, etc.

An image capturing device of the imager type comprises an image forming device or section, comprising a sensor in the form of an ordered arrangement or array—linear or preferably of the matrix type—of photosensitive elements, capable of generating an electric signal from an optical signal, and typically also a receiver optics of the image, capable of forming an image of the substrate containing the optical information, or of a region thereof, on the sensor.

The image capturing device is characterised by an optical reception axis, which is defined by the centres of the elements of the receiver optics, or by the centres of curvature of the optical surfaces in the case of a single lens, and which defines its main working direction. The image capturing device is also characterised by a working space region, generally shaped like a frustum of pyramid, extending in front of the sensor. The working space region, in other words the region of space in which optical information is correctly framed by the sensor and the image of which is sufficiently focussed on the sensor, is usually characterised through a field of view, which expresses the angular width of the working region about the reception axis, and a depth of field, which expresses its size along the direction of the reception axis. The depth of field therefore expresses the range between the minimum and maximum useful distances, along the reception axis, between the reader and the region on the substrate framed by the sensor. The field of view can also be expressed in terms of "vertical" and "horizontal" field of view, in other words in terms of two angular sizes in planes passing through the reception axis and perpendicular to each other, to take due account of the shape factor of the sensor, or even, in the case of reception system without any symmetry, four angular sizes in half-planes 90° apart.

The working space region—and therefore the field of view and the depth of field—can be fixed or made dynamically variable in size and/or in proportions through well known zoom and/or autofocus systems, such as electromechanical, piezoelectric or electro-optical actuators for moving one or more lenses or diaphragms, mirrors or other components of the receiver optics or for moving the sensor, and/or for changing the curvature of one or more lenses of the receiver optics, such as liquid lenses or deformable lenses.

EP 1 764 835 A1 describes an optical sensor wherein each photosensitive element or group of photosensitive elements has an associated lens or other optical element, such as diaphragms, prismatic surfaces, light guides or gradient index lenses. Such a document is totally silent about the illumination of the region framed by the sensor.

Although image capturing devices operating with ambient light only are well known, the image capturing device of the imager type typically further comprises an illumination device or section suitable for projecting one or more beams of light, possibly variable in intensity and/or spectral composition, towards the substrate carrying the optical information. The beam of light emitted by the illumination device, or the whole of the beams of light, defines an optical illumination axis, which is the average direction of such a single or composite light beam, being an axis of symmetry thereof in at least one plane and typically in two perpendicular planes in the case of a two-dimensional array.

For correct operation of the image capturing device, the illumination device must be able to illuminate the entire working space region of the image forming device.

An image capturing device wherein, as illustrated in FIG. 1—and which is analogous to that of FIG. 4 of U.S. Pat. No. 5,378,883 referred to above—, the illumination device 90 is not coaxial with the image forming device 91, rather is arranged alongside the image forming device 91 and configured so that the illumination axis 92 of the illumination beam 93 and the reception axis 94 converge, is subject to an intrinsic parallax error and to an intrinsic perspective distortion error in the two-dimensional case. Such errors make the intersection between the substrate S and the illumination beam 93 and the intersection between the substrate S and the working space region 95 of the image forming device 91 substantially concentric at most in a very small range of reading distances (about the distance where the substrate S is partly indicated in FIG. 1). Consequently, in order to that the illumination device 90 is able to illuminate the entire working space region 95 of the image forming device 91, at most of the reading distances the illumination is overabundant (cfr. the distances where the substrate $S_1$ or the substrate $S_2$ is partly indicated in FIG. 1), in other words the illumination extends outside of the region framed by the sensor on the substrate, with consequent waste of energy.

In some devices for capturing images of the prior art, the parallax error is solved by making the illumination device coaxial to the image forming device.

U.S. Pat. No. 5,319,182 describes an image capturing device, not of the imager type but rather of the scanning type, wherein the illumination device and the sensor are overall coaxial, in that they consist of a matrix in which emitters with programmable activation alternate with the photosensitive elements of the sensor. This device is potentially very compact and flexible, but it is also subject to remarkable problems of optical insulation between the emitters and the photosensitive elements: even by providing for an insulator between them as suggested in the document, the light emitted by the emitters and reflected, even to a minimal extent, onto the photosensitive elements by any surface, such as an opaque dividing wall or the rear surface of a projection optics with anti-reflection treatment, is of much higher intensity than that received from the substrate carrying the optical information. Moreover, laying out on a single substrate photosensitive elements and photo-emitting elements leads to compromises in terms of efficiency since the required characteristics of the material in order to have efficient photo-emitting elements are the opposite to those required to obtain efficient photosensitive elements.

In U.S. Pat. No. 5,430,286 the coaxiality between the light emitted by the illumination device and the image forming device is obtained through a beam splitter. As a result there are a very large space occupied in the reader and a very low efficiency, due to the loss of 50% of power both along the illumination path and along the reception path.

Such a system, also suffering from problems of occupied space, is described in the aforementioned U.S. Pat. No. 5,331,176, which uses a semi-transparent mirror instead of the beam splitter. Such a document also teaches to adjust the size of the section of the illumination beam, but through mechanical moving devices that contribute to the occupied space and to the consumption of the reader. Moreover, such a solution does not avoid the drawback of wasting energy for illumination, since a portion of the illumination beam is merely obscured.

US 2007/0158427 A1, which represents the closest prior art, in FIG. 5B describes an illumination system comprising a pair of illumination arrays each arranged on opposite sides of the sensor and associated with the greater working distances, and a pair of illumination arrays, also each arranged at said opposite sides of the sensor and associated with the smaller distances. Since the section of the light beam overall emitted by the pair of arrays associated with the greater working distances is oriented and sized to uniformly illuminate the entire region framed by the sensor at least at the maximum distance, it follows that at such a distance and at the shorter reading distances the illumination by such arrays is overabundant, in other words it extends outside of the region framed by the sensor. This kind of drawback occurs with regard to the pair of arrays associated with the smaller working distances. The device of such a document is therefore scarcely efficient, in particular scarcely suitable for battery-powered portable readers, where energy saving is an important requirement. The document also teaches to switch on only one array of each pair to avoid problems of reflection from the substrate, therefore falling into the case of a system subject to parallax and perspective distortion errors, or to switch on both of the pairs of arrays when the reading distance is unknown. The document further describes a further pair of illuminators, each arranged at the other two sides of the sensor, to illuminate a thin line for reading one-dimensional codes, and four illuminators for aiming a region of interest, arranged at the vertexes of the sensor.

The technical problem at the basis of the invention is to provide an efficient image capturing device, and more specifically such a device of an imager type reader of optical information, which in particular is free from parallax error, still without providing overabundant illumination, extending outside of the region framed by the sensor, and which avoids any possibility of optical interference between light sources and photosensitive elements.

In a first aspect thereof, the invention concerns an image capturing device of the imager type, comprising:

an image forming device including a sensor including a one-dimensional or two-dimensional array of photosensitive elements and defining an optical reception axis, at least one reading distance, and a region framed by the sensor on a substrate at said at least one reading distance, an illumination device including an array or array of adjacent light sources, defining an optical illumination axis, characterised:

in that the light sources are individually drivable and each light source is adapted to illuminate an area of a size much smaller than the size of said region framed by the sensor, in that the illumination axis does not coincide with the reception axis, by comprising a driver of the light sources adapted to drive the light sources so as to switch off at least the light sources that illuminate outside of the boundary of the region framed by the sensor on the substrate at said at least one reading distance.

In the present description and in the attached claims, the term "optical reception axis" is meant to indicate the direction defined by the centres of the elements of the receiver optics, or by the centres of curvature of the optical surfaces in the case of a single lens.

In the present description and in the attached claims, the term "optical illumination axis" is meant to indicate the average direction of the maximum illumination beam that would be emitted by the illumination device if all of the light sources of the array were switched on—apart from a possible different angular blur of the sources at opposite extremes of the array.

It should be noted that in the present description and in the claims the term "axis" is used for the sake of simplicity, although in practice in both cases it is a half-axis.

In the present description and in the attached claims, under "adjacent" it is meant to indicate that between the light sources there are no components having different functions from the light emitting function and/or from a function slaved to this, like for example addressing, driving, heat dissipation, optical insulation of the light sources; such a term must not therefore be construed in a limiting sense to indicate that the light sources are in contact with each other.

In the present description and in the attached claims, under "boundary" of the region framed by the sensor on the substrate it is meant to indicate a line having a thickness equal at most to the region illuminated by an individual light source of the array. In other words, the terminology takes into account the fact that the light sources are in any case finite in number, and that every light source illuminates a region having a finite size, thus dictating a resolution limit of the illumination system with respect to the geometric boundary of the region framed by the sensor.

Each individually drivable light source preferably comprises an individual illuminating element, but it could comprise more than one.

Preferably, said at least one reading distance comprises a plurality of reading distances within a depth of field, in other words a plurality of reading distances between the minimum reading distance and the maximum reading distance inclusive.

The reading distances at which the driver is adapted to drive the light sources so as to switch off at least the light sources that illuminate outside of the boundary of the region framed by the sensor on the substrate can be discrete from one another, or variable with continuity within the depth of field.

Typically, in order to increase the depth of field and/or to better define the direction and/or the shape in space of the region framed by the sensor, the image forming device further comprises at least one receiver optics, with fixed or variable focal length. Such a receiver optics can in particular comprise a single lens or optical group shared by the photosensitive elements of the sensor and/or an array of lenses, prismatic surfaces and/or diaphragms each associated with a photosensitive element or sub-group of elements, for example as described in the aforementioned EP 1 764 835 A1.

Typically, the image forming device comprises a zoom and/or autofocus system, in which case the region framed by the sensor is variable in a way not directly proportional to the reading distance within the depth of field.

The reception axis can coincide with the normal to the plane of the sensor or be inclined with respect to it by an angle.

Preferably, in order to increase the focal depth on the image side and/or to incline the illumination axis with respect to the normal to the array of light sources, the latter is associated with at least one projection lens. More specifically, each light source can be provided with its own projection lens, and/or at least one single projection lens can be provided, shared by the light sources of the array.

Each projection lens can be replaced by or associated with other optical elements, such as diaphragms, prismatic surfaces, light guides and/or gradient index lenses, in an analogous way to what is described in the aforementioned EP 1 764 835 A1.

The illumination axis can coincide with the normal to the plane of the array or be inclined with respect to it by an angle.

In some embodiments, the illumination axis is parallel to and spaced from the reception axis.

In other embodiments, the illumination axis is inclined and not coplanar with respect to the reception axis. In the case in which the two axes are inclined, they can intersect, generally in front of the sensor, or else they can be oblique.

In some embodiments, the array and the sensor are coplanar, so that they can advantageously be made on a same support, on a same integrated circuit board, or be made on a same integrated circuit substrate.

In other embodiments, the array and the sensor are arranged on planes inclined to each another, so that advantageously the angle of inclination between the illumination axis and the reception axis is determined or is contributed to being determined.

Preferably, the light sources of the array are adapted to overall illuminate, if all of them were switched on, a larger area than the maximum region framed by the sensor within the depth of field.

More specifically, the number of light sources is selected so that the area overall illuminated on the substrate by the illumination device undergoes a sufficiently small percentage change when a single light source is switched on/off.

Preferably, the percentage change is less than or equal to 15%, more preferably less than or equal to 10%, even more preferably less than or equal to 5%.

Preferably, the driver is adapted so as not to switch on all of the light sources of the array at any reading distance.

More preferably, the driver is adapted to switch off at least one light source at an edge of the array at each reading distance. In other words, the driver is adapted so as not to switch on both of the light sources arranged at opposite extremes of the array at any reading distance.

Preferably, the driver is adapted to switch off all of the light sources that illuminate outside of the boundary of the region framed by the sensor at the reading distance, and to switch on all of the sources that illuminate within the boundary of the region framed by the sensor in an operating mode.

Preferably, the driver is adapted to switch on only the light sources that illuminate at least one region of interest within the region framed by the sensor in an operating mode.

The driver can respond to a measurer of, or device for estimating, the reading distance.

The measurer of the reading distance can be a distinct device from the reader and in communication with it, for example a system of photocells, a device based on the measurement of the phase or of the time of flight of a laser or LED beam, visible or IR, or of the radar or ultrasound type, etc.

Preferably, however, the driver is adapted to switch on light sources of the array selected to project a luminous figure for evaluating the reading distance in an operating mode. The reading distance is measured or estimated based on the shape and/or position of the image formed on the sensor by the light emitted by said at least some of the light sources of the array.

The driver can be adapted to switch on light sources of the array selected to overall illuminate a luminous figure for aiming the region framed by the sensor and/or at least one region of interest thereof in an operating mode.

The driver can be adapted to switch on light sources of the array selected to overall illuminate a luminous figure for indicating an outcome of an attempt at capturing an image within the region framed by the sensor in an operating mode.

The light sources of the array are preferably individually drivable also in the intensity of emission.

Preferably, the array of light sources is suitable for emitting light of more than one wavelength. In particular, the array can comprise a first sub-plurality of light sources suitable for emitting at a first wavelength and at least one second sub-plurality of light sources suitable for emitting at a different wavelength from the first wavelength. Alternatively, each light source can be suitable for selectively emitting light of different wavelengths.

With such a provision it is for example possible to adjust the colour of the illumination based on the colour of an optical code and its background. Moreover, it is possible to easily provide a diversified indication of outcome of the capture or reading attempt, for example by projecting a green luminous figure for a positive outcome and a red luminous figure for a negative outcome. Furthermore, it is possible to diversify the luminous figures for aiming plural regions of interest, also for the sake of their selection by the user.

The array of light sources can be one-dimensional or two-dimensional.

The array of light sources can be flat or curved. By arranging the light sources on a curved surface it is possible to make the lengths of the optical paths between each light source and the substrate the same or substantially the same, therefore compensating for the different attenuation that the light emitted by the light sources would undergo in the case of a flat array, and therefore obtaining illumination of uniform intensity at the reading distance. A curved arrangement can also be used to determine or contribute to determining the divergence of the illumination beams of the various light sources.

Preferably, the number of light sources of the array is greater than or equal to 32 in the one-dimensional case, or 32×32 in the two-dimensional case, respectively.

More preferably, the number of light sources of the two-dimensional array is selected from the group consisting of 32×32, 64×64, 44×32 and 86×64, and in the one-dimensional case it is selected from the group consisting of 32 and 64.

In an embodiment the driver is adapted to switch off at least all of the sources that illuminate outside of the boundary of a first half of the region framed by the sensor at the reading distance, the image capturing device further comprising a second array of individually drivable, adjacent light sources, defining a second illumination axis, the second illumination axis not coinciding with the reception axis, and the driver of the light sources being adapted to drive the light sources of the second array so as to switch off at least the light sources that illuminate outside of the boundary of a second half of the region framed by the sensor complement to the first half.

In an embodiment, the image capturing device further comprises a second array of individually drivable, adjacent light sources, defining a second illumination axis, the second illumination axis not coinciding with the reception axis, and the driver of the light sources being adapted to drive the light sources of the second array so as to switch off at least the light sources that illuminate outside of the boundary of the region framed by the sensor.

In an embodiment the driver is adapted to run-time determine which light sources of the array to switch on or off, respectively, as a function at least of the reading distance.

In embodiments, the run-time determining is carried out through an analytical method, in other words making use of analytical formulae that depend only upon known (design) geometric parameters of the reader, and in particular of its image forming device, of its illumination device and/or of their relative spatial arrangements, including the relative spatial arrangement of their components or subassemblies.

Preferably, the analytical method comprises the steps of:
- in a first reference system associated with the reception device, calculating the coordinates of peculiar points of the region framed on the substrate by the sensor;
- carrying out a transformation of coordinates into a second reference system associated with the illumination device; and
- in the second reference system, calculating the light sources of the array that illuminate corresponding peculiar points.

Preferably, in the aforementioned steps one or more of the formulae from (1) to (31) described below are implemented.

In embodiments, the run-time determining is carried out at least in part through an empirical or adaptive method, comprising, in a recursive manner, driving so as to switch on a subset of light sources, evaluating the position and/or extent of the illuminated area on the substrate with respect to the region framed by the sensor, and adapting the subset of light sources based on such an evaluation.

The initial subset of light sources can be determined in advance in an analytical manner, the empirical or adaptive method thus being used for example to correct imprecisions of the array of light sources of each image capturing device of a production batch.

In embodiments, said recursive adaptation of the subset of light sources to be switched on is carried out along a plurality of radially spaced directions.

In embodiments, the subset of light sources to be switched on is determined by an interpolation of the positions of the extreme light sources to be switched on along said plurality of directions.

In an alternative embodiment, the driver is adapted to determine which light sources to switch on or off, respectively, as a function of the reading distance by reading them from a look-up table.

The driver can be adapted to build one-off (una tantum) said look-up table, in particular with analytical or empirical/adaptive method, similarly to the run-time determining.

Alternatively, the driver can be adapted to receive as an input said look-up table, one-off built by a separate processing device, with analytical or empirical/adaptive method, similarly to the run-time determining.

Should the determining of the light sources to be switched on or off, respectively, as a function of the reading distance one-off occur in a separate processing device, it is preferably implemented by a computer program that parametrically manages one or more quantities of the image capturing device. In this way, advantageously the same computer program can be used for example for a range of reader models.

Such a computer program represents a further aspect of the invention.

The light sources of the array are preferably of the solid state type or are organic, and more preferably they are selected from the group comprising LEDs, OLEDs, microLEDs and microlasers.

In another aspect thereof, the invention concerns an imager type reader of optical information comprising an image capturing device as described above.

In another aspect thereof, the invention concerns a computer readable memory means comprising the aforementioned program.

In another aspect thereof, the invention concerns an optical reader comprising an array of individually drivable, adjacent light sources, and a driver adapted to drive the light sources of the array in an illumination mode, an aiming mode, and a reading outcome indication mode.

Preferably, said driver is also adapted to drive the light sources in an optical distance measurement system or measurer mode.

BRIEF DESCRIPTION OF THE DRAWINGS

Further characteristics and advantages of the invention will be better highlighted by the description of some embodiments thereof, made with reference to the attached drawings, in which:

FIG. 4 illustrates, in greatly enlarged scale, a portion of an array of microLEDs with pre-collimation lens on each light source, FIG. 5 illustrates the illumination of a flat array of light sources of an illumination device not coaxial with the image forming device, FIG. 6 illustrates the illumination of a curved array of light sources of an illumination device not coaxial with the image forming device, FIGS. 7 to 9 are block diagrams that illustrate some embodiments of the driving of the light sources of the illumination device.

DETAILED DESCRIPTION

Figure 1:
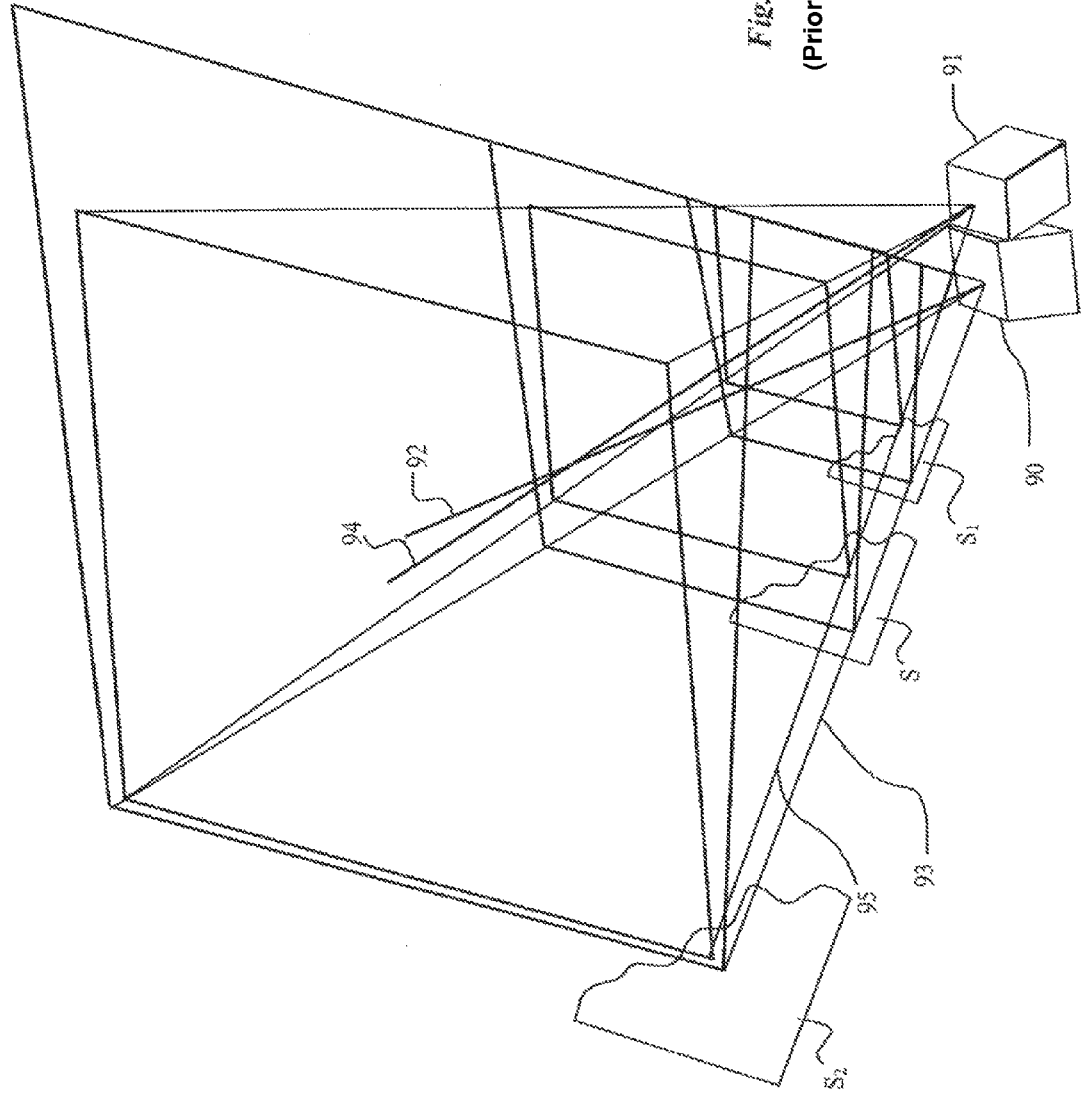
FIG. 1, already described in detail, illustrates an image capturing device of the prior art, wherein an illumination device is not coaxial to an image forming device, FIG. 2 schematically illustrates an imager type reader of optical information according to the invention, FIG. 3 schematically illustrates an image capturing device according to the invention.
Figure 2:
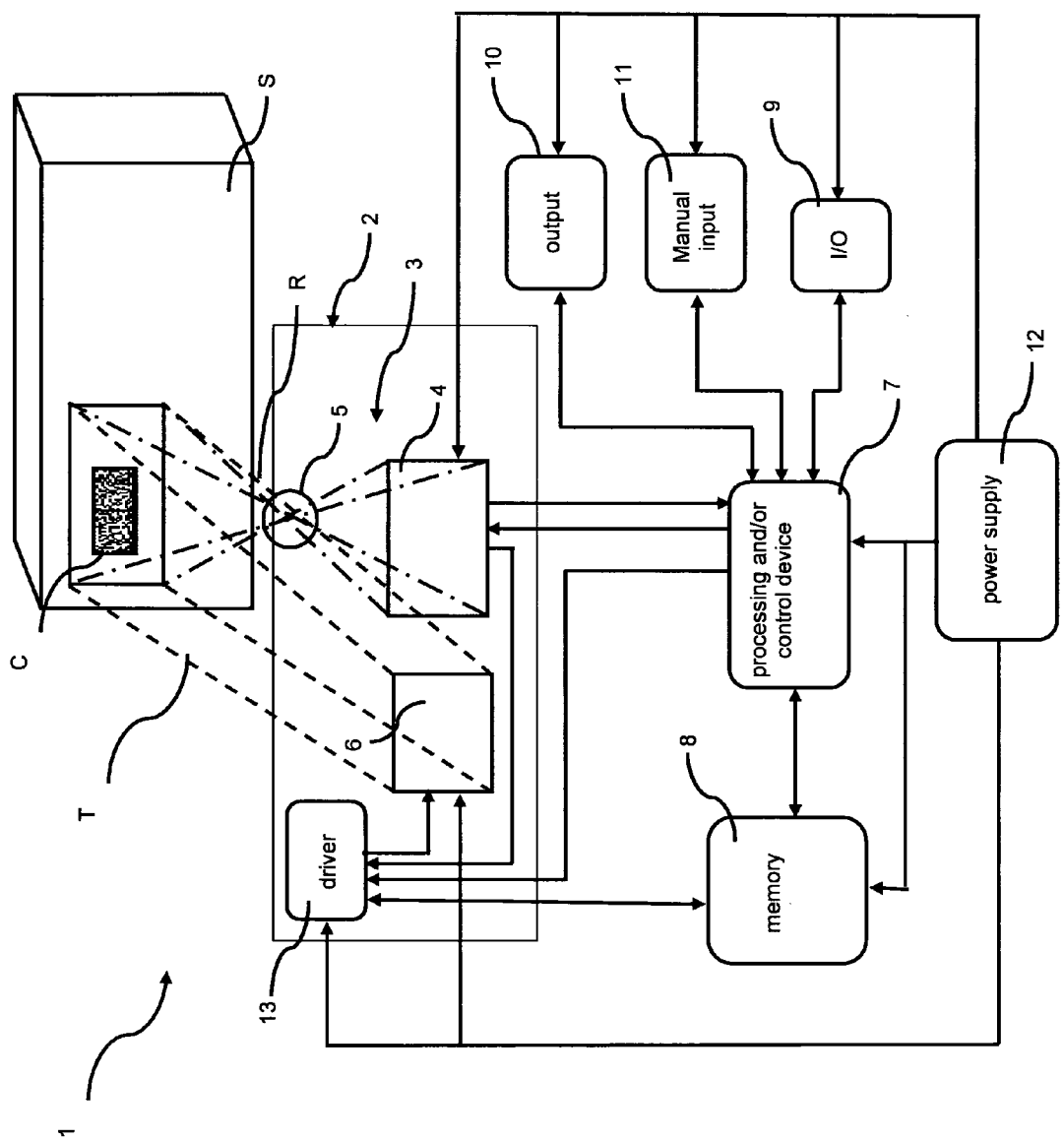

FIG. 2 is the block diagram of a reading system or in short reader 1 of an imager type optical information according to the invention.

The reader 1 comprises an image capturing device 2 capable of capturing or acquiring the image of optical information C, exemplified in FIG. 2 by a two-dimensional optical code, present on a substrate S.

The image capturing device 2, better described hereinafter, comprises an image forming device or section 3, comprising a sensor 4 in the form of an array—linear or preferably of the matrix type as shown—of photosensitive elements, capable of generating an electrical signal from an optical signal, in other words from the light R emitted by the substrate S, which is modulated by the graphical elements present, in particular by the code or other optical information C.

The image forming device 3 further typically, even if not necessarily, comprises an image reception optics 5, capable of forming on the sensor 4 an image sufficiently focused of the substrate S containing the optical information C, or of a region thereof.

The image capturing device 2 further comprises an illumination device or section 6, suitable for projecting an illumination beam T towards the substrate S.

The reader 1 further comprises a processing and/or control device 7, capable of extracting the information content from the image captured by the image capturing device 2 or by a portion thereof, for example the decoding the two-dimensional code C, as well as of controlling the other components of the reader 1.

The processing and/or control device 7 is per se well known and comprises hardware and/or software means for treating the signal emitted by the sensor 4, such as filters, amplifiers, samplers and/or binarizers, modules for reconstructing and/or decoding optical codes, including modules for consulting a table of possible codes, models for consulting a table of whatever plaintext information associated with the possible codes, optical character recognition modules, etc.

The acquired images and/or processings thereof, as well as the programming codes of the reader 1, processing parameter values and said look-up tables, are typically saved in digital form in at least one temporary and/or mass memory device 8, possibly removable, of the reader 1. The memory device 8 is also used as service memory to execute software algorithms.

The reader 1 can further comprise a communication device or interface 9, for communicating the acquired image and/or the extracted information content outside of the reader 1 and/or per for entering configuration data for the reader 1, coming from an external source.

The reader 1 further comprises at least one output device 10, for displaying to the user alphanumerical and/or graphical information relative for example to the operating state of the reader 1, to the content of the information read, etc., and/or for displaying the image currently framed by the sensor 4. The output device 10 can, alternatively or additionally, comprise a printer, a voice synthesiser or other output devices of the aforementioned information.

The reader 1 further comprises at least one manual input device 11 of control signals and/or data, for example for configuring the reader, like for example a keyboard or a plurality of buttons or control levers, directional buttons, a mouse, a touch-pad, a touch screen, a voice control device etc.

The reader 1 further comprises at least one power supply device 12 for the various components with suitable voltage and current levels, with a battery source, or by taking a power supply signal from the electrical mains or from an external device.

The reader 1 further comprises a driver 13 of the illumination device 6, better described hereinafter.

The driver 13 and the illumination device 6 preferably implement, as better described hereinafter, besides the illumination function of the substrate S or of one or more regions of interest (ROI) thereof in order to capture the image by the image forming device 3, also one or more of the following: an aiming device, an outcome indication device, a device for detecting the presence of a substrate S and/or for optically measuring or estimating the reading distance and/or the focussing condition of the image capturing device 2 (rangefinder).

The processing and/or control device 7 can be implemented by one or more processors, in particular one or more microprocessors or microcontrollers, and/or circuits with discrete or integrated components.

Similarly, the driver 13 can be implemented by one or more circuits with discrete or integrated components and/or by one or more processors, in particular one or more microprocessors or microcontrollers.

Moreover, although in FIG. 2 the processing and/or control device 7 and the driver 13 are shown as separate; they can share one or more of such circuits and processors, and/or the or one or more devices implementing the memory means 8.

More generally, it should be understood that FIG. 2 illustrates distinct blocks from the functional point of view. From the physical point of view, the various components of the reader 1 described above can be made in distinct objects, provided that they are in communication with each other as schematically illustrated in FIG. 2, for the communication of control, data and/or power supply signals. The connection can be via cable and/or wireless.

Thus, the reader 1 described above can be made as a single object, wherein the various components are housed in a casing, not shown, having suitable shape and size for example for use in a fixed or portable station; said casing comprises at least one transparent region for the passage of the emitted light T and of the received light R. The casing and/or one or more internal supports are also configured to support the components of the image capturing device 2 and of the illumination device 6 in a predetermined mutual relationship.

Vice-versa, the output device 10 and/or the manual input device 11 and/or the processing and/or control device 7 could be implemented at least in part from a computer.

Furthermore, the illumination device 6 and the image forming device 3 can be made in separate casings, each with its own transparent region, and be constrained in space in a predetermined mutual relationship during the installation step of the reader or reading system 1.

Figure 3:
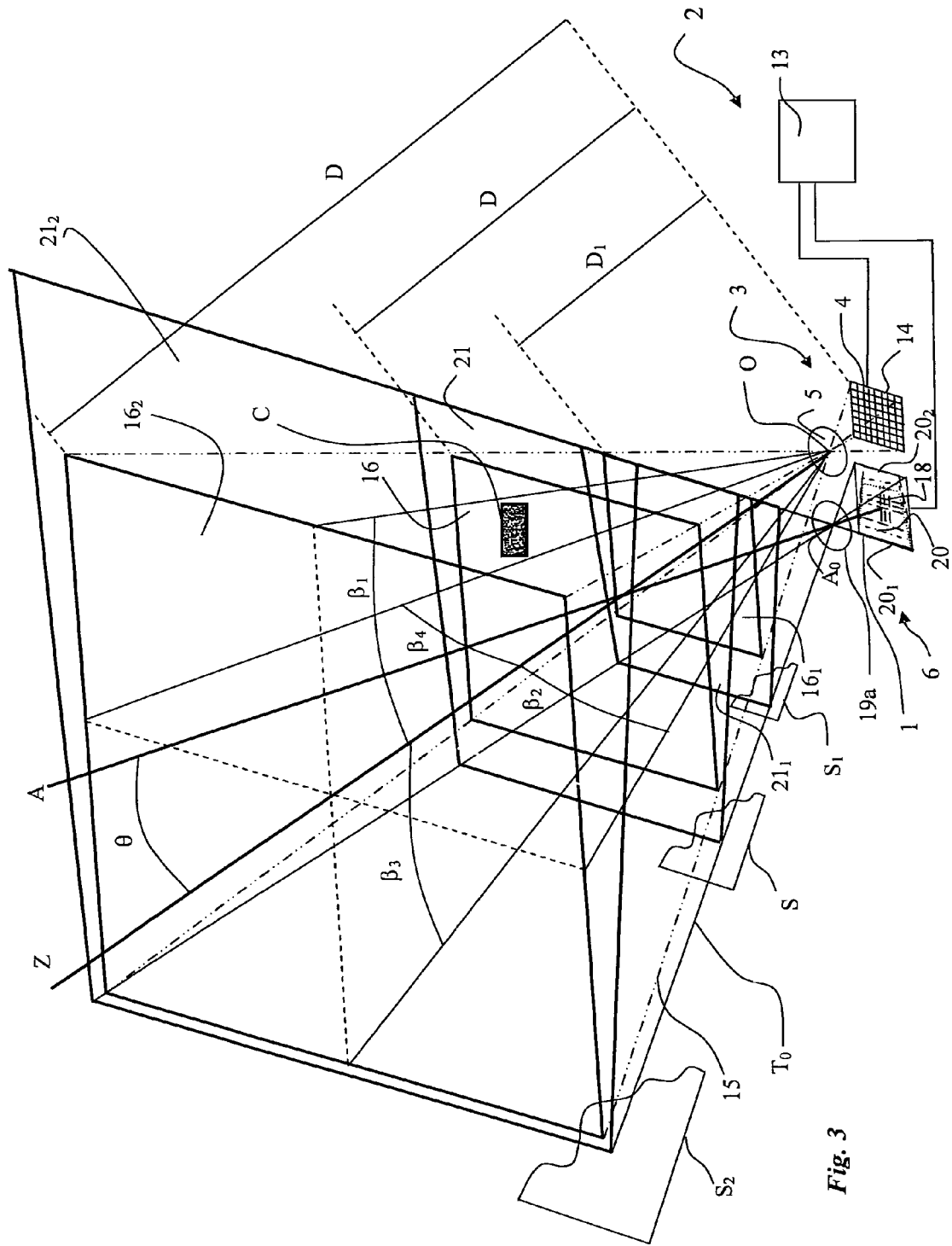

FIG. 3 illustrates in greater detail, though schematically, the image capturing device 2 according to an embodiment of the present invention.

The sensor 4 of its image forming device 3 comprises an array of photosensitive elements 14, each of which provides an electrical signal the intensity of which is a function of the light striking it. As an example, FIG. 3 shows a square two-dimensional sensor 4, but it can also be rectangular, round or elliptical. The sensor 4 can, for example, be made in C-MOS or CCD technology. Optionally, the sensor 4 can be driven to extract the signal generated by a subset of its photosensitive elements 14, and as a borderline case, each individual photosensitive element 14 can be individually driven.

The receiver optics 5 of the image forming device 3 of the image capturing device 2 is designed to form on the sensor 4 an image of the substrate S containing the optical information C, or of a region thereof. The receiver optics 5 can comprise one or more lenses, one or more diaphragms, refractive, reflective or diffractive optical elements, possibly anamorphic to modify the effective aspect ratio of the sensor 4. As an example, in FIG. 3 the receiver optics 5 is shown as an inverting lens lying in a plane parallel to the sensor 4, and coaxial therewith.

The image forming device 3 defines a working space region 15 extending in front of the sensor 4. The working space region 15 is the region of space in which optical information C is correctly framed by the sensor 4 and the image of which is sufficiently focused on the sensor 4. Within such working space region 15, the optimal focal plane can be fixed or made variable through an autofocus system. In the case represented of a square sensor 4 as a particular case of a rectangular sensor, the working space region 15 is pyramid- or frustum of pyramid-shaped; in the case of a round or elliptical sensor 4, the working space region 15 is a cone or a frustum of cone; in the case of a one-dimensional sensor 4 the base of the pyramid becomes substantially thinner and the working region 15 can be considered to be substantially flat.

The image forming device 3 further defines an optical axis of the receiver optics 5, in short reception axis Z. The reception axis Z is defined by the centres of the elements of the receiver optics 5, or by the centres of curvature of the optical surfaces in the case of a single lens. As will become clear hereinafter, the reception axis Z is not necessarily perpendicular to the sensor 4, nor does it necessarily pass through the centre of the sensor 4.

Especially in the case in which the reception optics 5 comprises deflecting elements, the reception axis Z may be non-rectilinear inside the image forming device 3, but within the meaning of to the invention it can in any case be modelled by a rectilinear reception axis Z.

Along the reception axis Z the vertex O of the working space region 15, in short the reception vertex O, is arranged. The vertex O of the working space region 15 is the vertex of the pyramid or cone, and in the case of inverting receiver optics 5 it falls in the optical centre thereof, while in the case of non-inverting receiver optics 5 it typically falls behind the sensor 4.

The image forming device 3 further defines the angular width of the working region 15 about the reception axis Z, which is typically expressed in terms of four angles $\beta_1, \beta_2, \beta_3, \beta_4$ having origin in the reception vertex O and one of the sides coinciding with the reception axis Z, and extending in four half-planes that are perpendicular to each other. With reference to the two main directions of the sensor 4, namely the row and column directions of its photosensitive elements 14, it is possible to speak of a "horizontal" field of view expressed by the angles $\beta_1, \beta_3$, and of a "vertical" field of view expressed by the angles $\beta_2$, $\beta_4$. In the particular case in which the sensor 4 is coaxial and centred with respect to the receiver optics 5, the working space region 15 has a symmetry and $\beta_1=\beta_3$ and $\beta_2=\beta_4$ in absolute value. In the case of a one-dimensional sensor, the "vertical" field of view is much smaller than the "horizontal" one, and can be substantially neglected.

The image forming device 3 further defines a depth of field DOF, which expresses the extent of the working space region 15 along the reception axis Z.

In FIG. 3, the substrate S at a generic reading distance D is indicated with S, and the region correspondingly framed by the sensor is indicated with 16; as particular cases the substrate S at the minimum possible reading distance $D_1$ is indicated with $S_1$, and the region framed by the sensor is indicated with $16_1$, while the substrate S at the maximum possible reading distance $D_2$ is indicated with $S_2$, and the region framed by the sensor is indicated with $16_2$. The depth of field is therefore given by $DOF=D_2-D_1$.

It is worth emphasising that the reading distances D, $D_1$, $D_2$ are measured along the reception axis Z from the reception vertex O, even if the reception axis Z is not necessarily perpendicular neither to the sensor 4 nor to the region 16 of the substrate framed by the sensor 4.

The working space region 15 can be fixed or made dynamically variable in size and/or in proportions through well known zoom and/or autofocus systems, such as electromechanical, piezoelectric or electro-optical actuators for moving one or more lenses or diaphragms, mirrors or other components of the receiver optics 5, and/or for changing the curvature of one or more lenses, such as liquid lenses or deformable lenses and/or for moving the sensor 4. In a preferred embodiment the receiver optics 5 comprises an Arctic 416 SL-C1 liquid lens, manufactured by Varioptic SA, France.

In other words, while in FIG. 3 for the sake of simplicity it is assumed that the field of view $\beta_1$, $\beta_2$, $\beta_3$, $\beta_4$ is equal at the various reading distances D, this can be made variable along the reception axis Z through zoom systems, so that the working region 15 is no longer a static frustum of pyramid or cone, rather has variable size and/or proportions. The description of the invention in any case remains totally valid.

The illumination device 6 of the image capturing device 2 of the imager-type optical information reader 1 comprises an array 17 of adjacent light sources 18. In FIG. 3, for the sake of clarity, only some of the light sources 18 are shown.

The light sources 18 of the array 17 can be individually driven, by the driver 13, to be switched on and off, and preferably also in the intensity and/or in the wavelength, or range of wavelengths, of emission. Therefore, this is what is defined in the field as a "pixelated source", or that can be defined as PPEA (programmable photonic emitter array).

The light sources 18 of the array 17 preferably each comprise a single illuminating element, the illuminating elements being identical to one another in shape and size. However, the light sources 18 of the array 17 can also comprise illuminating elements of different shape and/or size. Furthermore, the light sources 18 of the array 17 can each comprise plural illuminating elements collected into groups of a same or a different shape and/or size. In other words, the driving of the pixelated source can take place at the level of clusters of illuminating elements or pixels, provided that the number of clusters, in other words of light sources 18 individually drivable according to the invention, is still sufficiently large to implement the functionalities described below of the illumination device 6.

The illumination device 6 optionally comprises an illumination optics.

The illumination optics can comprise one or more lenses and possible diaphragms, refractive, reflective or diffractive optical elements, possibly anamorphic, common to all of the light sources 18 of the array 17. The illumination optics can be a common and image inverting optics 19a, which as an example in FIG. 3 is shown coaxial with the array 17.

The illumination optics can also, as an alternative or additionally, comprise a plurality of lenses 19b, each associated with a light source 18 of the array 17, as better described as an example in FIGS. 14-16 described hereinbelow. Such lenses 19b, of comparable size to that of the light sources 18 or of their illuminating elements, have the function of determining and in particular of reducing the effective emission angle of the individual light source 18, and they can also have the function of determining the orientation of the illumination beam emitted by the individual light source 18.

Each lens 19b can be replaced by or associated with other optical elements, such as diaphragms, prismatic surfaces, light guides or gradient index lenses, in order to better select the direction of the beam emitted by the individual source, for example as described in the aforementioned EP 1 764 835 A1.

The plurality of lenses 19b can also be used in association with a common, non-inverting imaging optics 19c, as shown as an example in FIG. 16 described hereinbelow, or in association with a common, inverting imaging optics 19a.

The light sources 18 of the array 17 are preferably made in the form of an integrated circuit on a common substrate. Preferably, the light sources 18 are also driven through an address bus with row and column indexes.

Preferably, the fill factor, namely the ratio between the overall area occupied by the active surface of the light sources 18 (or of the plurality of lenses 19b) and the total area of the substrate of the integrated circuit on which the sources (lenses) are arranged, is high, preferably over 90%.

In an embodiment, the light sources 18 of the array 17 are microLEDs. The microLEDs are micro-emitters, made for example with gallium nitride (GaN) technology, with emitting area of larger linear size equal to about 20 micrometres, but currently also down to 4 micrometres; with this technology arrays 17 can be made containing thousands or tens of thousands of light sources 18 in extremely small size (for example, a side of a few mm for an array of 512×512 illuminating elements) and with minimal costs and consumption. Such devices are also able to emit at different wavelengths.

In an embodiment, the light sources 18 of the array 17 are OLEDs (Organic Light Emitting Diodes). An OLED is an opto-electronic device obtained by arranging a series of thin organic films between two conductors. When an electric current is applied, a light flow is emitted. This process is called electrophosphorescence. Even with a system of many layers, an array 17 of OLEDs 18 is very thin, currently less than 500 nanometres (0.5 thousandths of a millimetre) and down to 100 nm. OLEDs consume very little power, requiring very low voltages (2-10 Volts). OLEDs can emit at different wavelengths in the visible spectrum. OLEDs can also be arranged in very compact arrays, with a density currently up to 740 illuminating elements per inch (pixel/inch), each of 15 square micrometres ("OLED/CMOS combo opens a new world of microdisplay", Laser Focus World, December 2001, vol. 37, issue 12, Pennwell Publications, available at the link "http://www.optoiq.com/index/photonics-technologies-applications/lfw-display/lfw-article-display/130152/articles/laser-focus-world/volume-37/issue-12/features/microdisplays/oled-cmos-combo-opens-a-new-world-of-microdisplay.html"; "Organically grown: Luminescent organic crystals and polymers promise to revolutionize flat-panel displays with possibilities for low-cost manufacture and more portability", Laser Focus World, August 2001, vol. 37, issue 8, Pennwell Publications, available at the link "http://www.optoiq.com/index/photonics-technologies-applications/lfw-display/lfw-article-display/113647/articles/laser-focus-world/volume-37/issue-8/features/back-to-basics/organically-grown.html"). OLEDs have a very wide emission angle, currently up to 160°. An array 17 of OLEDs can also be deposited on flexible substrates and therefore take on a curved configuration. An array 17 of OLEDS can also be formed so that the emitting elements have different shapes and/or sizes.

In an embodiment, the light sources 18 of the array 17 are LEDs (Light Emitting Diodes). LEDs are photoemitting devices, with a greatest linear dimension of 50 microns, which can reach 350 microns and more; these devices can achieve a high efficiency, but at the expense of having large chip size and of needing dissipation elements between each other, which make an array 17 thus formed somewhat bulky and with large empty areas between one emitter and the other, i.e. with a low fill factor; alternatively, LED emitters can be made on a substrate, as described for example in the aforementioned document U.S. Pat. No. 5,319,182, for example a C-MOS substrate, but with lower efficiency. Moreover, the driver chips of LEDs 18 tend to have a contact at the centre that produces a shading at the centre of the area respectively illuminated. Even if there are ways to avoid this drawback, like for example the contact geometries proposed in the aforementioned U.S. Pat. No. 6,811,085, these systems are relatively expensive and consume a relatively large amount of energy, besides often needing a rather large dissipation area near to each source 18, which reduces its fill factor, as stated above.

In an embodiment, the light sources 18 of the array 17 are lasers, associated with micromirrors made in MEMS (MicroElectroMechanical System) technology, that can be moved into an orientation such as not to allow light to pass, in other words switching it off within the meaning of the invention, and into at least one orientation such as to allow light to pass, in other words switching it on within the meaning of the invention. Such devices are known in the field as "picoprojectors". It is possible to provide for a laser associated with each micromirror, or also a single laser common to the micromirrors. The presence of moving parts however involves a certain amount of consumption and wear.

Other technologies can be used to make the array 17 of light sources 18.

As an example of an array 17 of light sources 18, FIG. 4 illustrates, in a greatly enlarged scale, a portion of an array 17 of microLEDs with pre-collimation lens 19b on each light source 18.

The illumination device 6 is configured so that each light source 18 of the array 17 emits an elementary illumination beam, having an own average direction of propagation in the space in front of the illumination device 6. The illumination device 6 is also configured so that the areas illuminated on a substrate S by adjacent light sources 18 of the array 17 are adjacent to one another and possibly slightly overlapping, to form an overall illumination beam, indicated with T hereinafter, the shape and size of which depends upon how many and which light sources 18 are currently switched on by the driver 13, as better explained hereinafter. The number of light sources 18 of the array 17 is selected so that the area overall illuminated on a substrate S by the illumination device 6 undergoes a sufficiently small percentage change when an individual light source 18 is switched on/off. Preferably, the percentage change is less than or equal to 15%, more preferably less than or equal to 10%, even more preferably less than or equal to 5%.

FIG. 3 illustrates the illumination beam $T_0$ that would be emitted—apart from angular blur of the light sources at opposite extremes of the array 17—by the illumination device 6 if all of the light sources 18 of the array 17 were switched on.

The illumination device 6 defines an optical illumination axis A, which is the average direction of such a maximum illumination beam $T_0$, being an axis of symmetry thereof in at least one plane, and typically in two perpendicular planes in the illustrated case of a two-dimensional array 17.

In the case of common illumination optics 19a, 19c and array 17 centred with respect to the optical axis of such a common illumination optics 19a, 19c, the illumination axis A is defined by the centres of the elements of the common illumination optics 19a, 19c, or by the centres of curvature of the optical surfaces in the case of a common single lens 19a, 19c. Especially in the case in which the illumination optics 19a, 19b, 19c comprises deflecting elements, the illumination axis A may be non-rectilinear inside the illumination device 6, but within the meaning of the invention it can still be modelled by a rectilinear illumination axis A.

In the represented case of a square or in general rectangular two-dimensional array 17, the maximum illumination beam $T_0$ is pyramid- or frustum of pyramid-shaped; in the case of a round or elliptical array 17, the illumination beam $T_0$ is a cone or a frustum of cone; in the case of a one-dimensional array 17 the base of the pyramid becomes substantially thinner, having a thickness equal to the size of the area illuminated by the individual light source 18, and the maximum illumination beam $T_0$ can be considered to be substantially flat.

The illumination device 6 further defines an illumination vertex $A_0$, which is the vertex of such a pyramid or cone; in the case of common, inverting illumination optics 19a, the illumination vertex $A_0$ coincides with the optical centre thereof, while in the case of non-inverting illumination optics 19b, 19c it typically falls behind the array 17.

It is worth emphasising that, depending on the orientation and positioning of the common illumination optics 19a, 19c with respect to the array 17 and/or on the geometry of the individual lenses 19b associated with the light sources 18, as shall become clear hereinafter the illumination axis A is not necessarily perpendicular to the array 17, nor does it necessarily pass through the centre of the array 17.

According to the invention, the illumination axis A does not coincide with the reception axis Z. In particular, the illumination device 6 and the image forming device 3 are not coaxial. In general, the reception vertex O and the illumination vertex $A_0$ do not coincide and the illumination axis A and the reception axis Z are inclined with respect to each other. The illumination axis A and the reception axis Z can be parallel, provided that the reception vertex O and the illumination vertex $A_0$ then do not coincide. The reception vertex O and the illumination vertex $A_0$ could in principle coincide, provided that the illumination axis A and the reception axis Z are then inclined with respect to each other.

According to the invention, the driver 13 of the light sources 18 of the array 17 is adapted, in the way described later on, to drive the light sources 18 so as to switch off at least the light sources 18 that illuminate outside of the boundary of the region 16 framed by the sensor 4 on the substrate S at the generic reading distance D. Thus, in FIG. 3 reference numeral 20 indicates the light sources 18 in the array 17 that illuminate the boundary of the region 16 framed by the sensor 4 at the reading distance D. At the distance D, the driver 13 takes care of switching on the light sources 18 within the perimeter 20 inclusive, and of switching off those outside of the perimeter 20. In the case in which it is wished to illuminate only a portion of the region 16 framed by the sensor 4, as better described hereinafter, the driver 13 will take care of switching on only a subset of the light sources 18 within the perimeter 20.

It is worth emphasising that, here and in the rest of the present description and claims, by "switch off" and "switch on" and derived forms it is not necessarily meant to indicate a switching of state, rather it is meant to encompass that, if a light source 18 is already in the desired state, the driver 13 maintains such a state.

It is understood that under "boundary" of the region 16 framed by the sensor it is meant to indicate a layer across the geometric perimeter thereof, the thickness of which is determined by the area illuminated by the individual light source 18 of the array 17, and therefore is comparatively small with respect to the entire region 16 framed by the sensor 4.

As particular cases, in FIG. 3 reference numeral $20_1$ indicates the light sources 18 in the array 17 that illuminate the boundary of the region $16_1$ framed by the sensor 4 at the minimum reading distance $D_1$, at which the driver 13 takes care of switching on at most all of the sources within the perimeter $20_1$ inclusive, and of switching off those outside of the perimeter $20_1$; reference numeral $20_2$ indicates the light sources 18 in the array 17 that illuminate the boundary of the region $16_2$ framed by the sensor 4 at the maximum reading distance $D_2$, at which the driver 13 takes care of switching on at most all of the sources within the perimeter $20_2$ inclusive, and of switching off those outside of the perimeter $20_2$.

As can be seen from FIG. 3, the shifting within the array 17 of the peripheral switched-on sources $20_1$, 20 and $20_2$ as the reading distance D changes between $D_1$ and $D_2$ allows the parallax error and the perspective distortion error inherent to the non-coaxial arrangement of the illumination device 6 with respect to the image forming device 3 to be corrected (in this specific case the axis A also being inclined with respect to the axis Z, hence the trapezoidal shape of the regions 20, $20_1$, $20_2$). Reference numerals 21, $21_1$, $21_2$ illustrate the perimeters of the region that would be illuminated, respectively at the distances D, $D_1$ and $D_2$, if all of the light sources 18 of the array 17 were switched on, in other words the intersections of the maximum illumination beam $T_0$ with the substrate S, $S_1$, $S_2$ at the various distances D, $D_1$, $D_2$: it should be noted how each of such maximum illumination regions 21, $21_1$, $21_2$ extend well beyond the region 16, $16_1$, $16_2$ framed by the sensor 4 at the corresponding distance, which would correspond to a waste of energy, as well as bring about drawbacks in terms of deceiving visual indication to the user of the region 16, $16_1$, $16_2$ framed by the sensor 4, in the case in which the light emitted by the light sources 18 is in the visible spectrum.

Although it is not totally clear from FIG. 3, the optical paths between the individual sources 18 of the array 17 that are switched on, the common illumination optics 19a, 19c where present, and the region 16, $16_1$, $16_2$ framed by the sensor 4 on the substrate S, $S_1$, $S_2$ are not constant. As a result of this there is a disuniformity of illumination and/or loss of focus, schematically represented in FIG. 5.

Such a disuniformity of illumination and/or loss of focus can be corrected through a suitable design of the illumination optics 19a, 19b, 19c, that may however turn out to be particularly burdensome.

Alternatively or additionally, the driver 13 can drive the light sources 18 so that they emit with different intensity, in particular increasing going from right to left in FIG. 3.

It is worth emphasising that, by modulating the intensity of the individual light sources 18, it is also possible to correct possible disuniformities in intensity of the sources 18 themselves, thus increasing the insensitivity of the illumination device 6 to production tolerances. In other words, it is not necessary to have a uniform emitter array 17.

Still alternatively or additionally, the array 17 of light sources 18 can be arranged on a curved surface—which substantially becomes a curved line in the case of a one-dimensional array—, corresponding to the optimal focus curve (caustic) of the common illumination optics 19a, 19c, so that the outermost light sources 18 of the array 17 are brought to the correct distance by the common illumination optics 19a, 19c, so as to project a focused image onto the substrate S. An embodiment with a curved array 17 is schematically illustrated in FIG. 6 and is possible in particular in the case of OLEDs. In an embodiment, the light sources 18 of the array 17 can be arranged on a curved surface with the opposite concavity to that of FIG. 6. In this case, the illumination beams of the individual light sources 18 diverge and the illumination optics can be absent.

There are different methods according to which the driver 13 selects which light sources 18 of the array 17 to switch on, and optionally with what intensity and/or emission wavelength(s), as a function of the reading distance D within the depth of field DOF of the image forming device 3, in order to illuminate the entire and only the region 16 framed by the sensor 4 on the substrate S. Hereinafter, for the sake of brevity reference shall be made only to the determining of the light sources 18 to switch on, it being implicit that it is possible at the same time to determine the respective intensity and/or emission wavelength(s).

First, the determining can occur either run-time or one-off.

In the case of run-time determining, the driver 13 itself shall comprise hardware and/or software modules to implement the determining method. As illustrated in FIG. 7, in a step 100 the current working distance D within the depth of field DOF ($D_1 \leq D \leq D_2$) is set or detected. In a step 101 the subset 18a of light sources 18 that must be switched on to illuminate the entire and only the region 16 framed by the sensor 4 is determined, in particular with one of the methods described below. In a step 102, at most all of the light sources of the subset 18a are switched on.

In the case of one-off determining a look-up table is built, to which the driver 13 then refers during the normal operation of the image capturing device 2 of reader 1. The driver 13 can again comprise said hardware and/or software modules, or the method can be carried out through an external processor, and only the look-up table can be loaded in the memory 8 of the reader 1 associated with the driver 13. The one-off determining preferably takes place substantially for each reading distance D within the depth of field DOF, in other words variable between $D_1$ and $D_2$ with continuity or with suitable sampling, and thus provides for a cycle of operations. The sampling range of the working distances D may be non-constant, in particular the sampled working distances D can be closer to each other near to the minimum working distance $D_1$ and less close to each other near to the maximum working distance $D_2$, where the configuration of light sources 18 to be switched on changes more slowly. With reference to FIG. 8, in a step 103 the working distance D is selected as the minimum working distance $D_1$, or the maximum working distance $D_2$, respectively. The step 101 of determining the subset 18a of light sources 18 that must be switched on to illuminate the entire and only the region 16 framed by the sensor 4 is then carried out. In a step 104 a record is then stored in the look-up table, comprising the selected working distance D (corresponding in this first execution of the cycle to $D_1$ or $D_2$, respectively) and the subset 18a determined in step 101. In a step 105 the working distance D is then increased or decreased, respectively, by an infinitesimal amount or an amount based on the preselected sampling. In a step 106 it is then checked whether the cycle has been carried out over the entire depth of field DOF, in other words whether the working distance D exceeds the maximum working distance $D_2$, or is less than the minimum working distance $D_1$, respectively. In the negative case, steps 101, 104, 105 and 106 are repeated, therefore inserting a new record in the look-up table. When the cycle has been carried out over the entire depth of field DOF, in other words when the check of step 106 is positive, the driver 13 can enter into normal use mode. In this mode, in step 100 the current working distance D within the depth of field DOF ($D_1 \leq D \leq D_2$) is set or detected. In a step 107 the subset 18a of light sources 18 that must be switched on to illuminate the entire and only the region 16 framed by the sensor 4 at the current working distance D is read from the look-up table. In step 102, at most the light sources of the subset 18a are switched on.

The step 101 of determining the subset 18a of light sources 18 that must be switched on, at a given current working distance D within the depth of field DOF, to illuminate the entire and only the region 16 framed by the sensor 4 can be implemented, in different embodiments of the image capturing device 2, according to different methods, both run-time (step 101 of FIG. 7) and one-off (step 101 of FIG. 8).

A first method is of the analytical type. Once the geometric and optical configuration of the image capturing device 2 has been established, it is indeed possible to calculate, for each reading distance D, which light source 18 of the array 17 illuminates the elementary area framed by each photosensitive element 14 of the sensor 4. It should be noted that in practice the elementary area framed by each photosensitive element 14 of the sensor 4 can be illuminated at most by four light sources 18 arranged adjacent to one another forming a square in the array 17.

Figure 9:
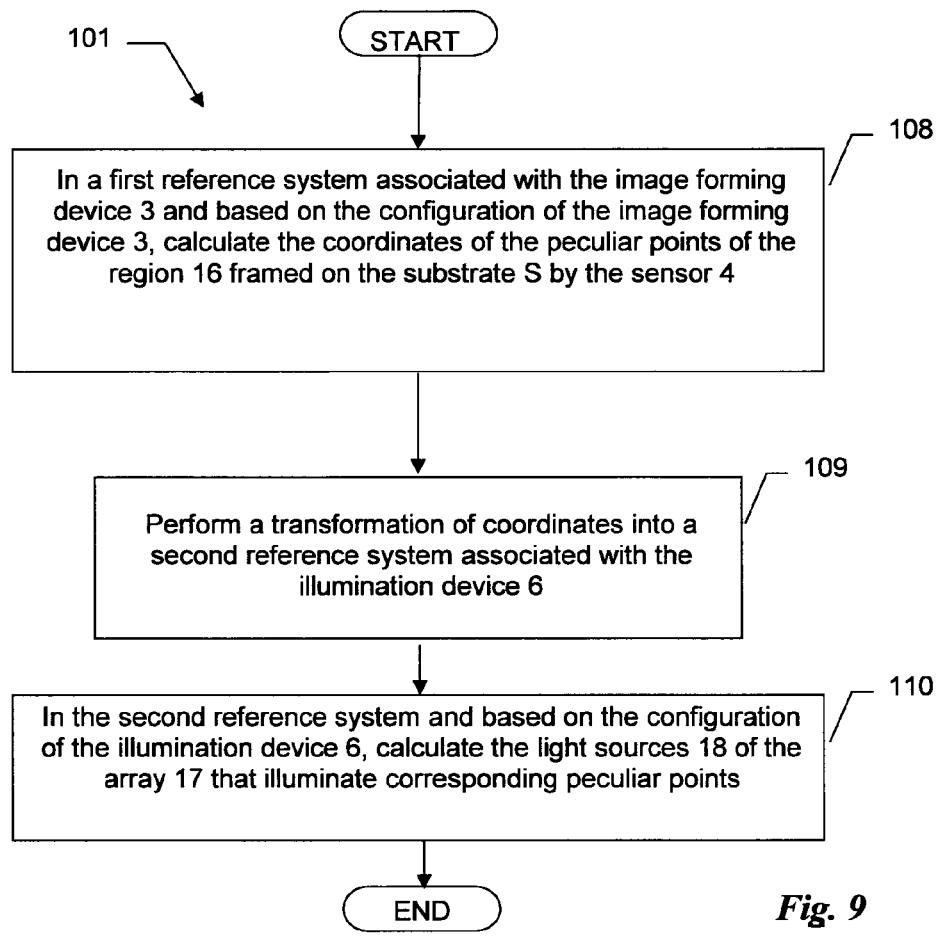

A preferred embodiment of analytical method is schematically illustrated in FIG. 9 and subsequently described in greater detail with reference to FIGS. 10 to 17.

With reference to FIG. 9, in a step 108, in a first reference system associated with the reception device 3, in particular originating in the reception vertex O, and based on the configuration of the image forming device 3, the coordinates of some peculiar points are calculated, which allow the boundary of the region 16 framed on the substrate S by the sensor 4 to be identified. Such peculiar points are preferably those whose image is formed on photosensitive elements 14 that define the perimeter of the sensor 4 and/or on the central photosensitive element 14 of the sensor 4. In particular, in the case of a rectangular or square sensor 4, the reference system is preferably Cartesian and the peculiar points preferably correspond to those seen by the photosensitive elements 14 at least at two opposite vertexes of the sensor 4; in the case of a circular or elliptical sensor 4, the reference system is preferably cylindrical and the peculiar points preferably correspond to the central photosensitive element 14 and to a peripheral photosensitive element 14, or to the two or four peripheral photosensitive elements 14 along the axes of symmetry of the sensor 4. Indeed, there is an analytical relationship that expresses the coordinates of all of the points corresponding to the perimeter of the region 16 framed by the sensor 4 on the substrate S as a function of such peculiar points.

In a step 109 a transformation of the coordinates of the peculiar points into a second reference system, associated with the illumination device 6 and in particular originating in the illumination vertex $A_0$, is carried out. In particular, in the case of a rectangular or square array 17, the second reference system is preferably Cartesian; in the case of a circular or elliptical array 17, the second reference system is preferably cylindrical. In some cases, it may be suitable to change, increase or decrease the peculiar points passing from one reference system to another and using the analytical relationships that express the coordinates of all of the points corresponding to the perimeter of the region 16 framed by the sensor 4 on the substrate S and/or that express the coordinates of all of the points corresponding to the perimeter of the region to be illuminated on the substrate by the array 17: for example, if the region 16 framed by the sensor 4 on the substrate S is a rectangle and is seen as a trapezium by the illumination device 6, it is possible to operate on the four vertexes, or it is possible to operate for example on two opposite vertexes or on the centre and one vertex in the first reference system, and to pass through the analytical expression of the rectangle to obtain the four vertexes of the trapezium in the second reference system.

In a step 110, in the second reference system and based on the configuration of the illumination device 6, the light sources 18 of the array 17 that illuminate the corresponding peculiar points are calculated.

The transformation of coordinates between two reference systems, carried out in step 109, is per se well known. Purely as an example, with reference to FIG. 10, in the case in which the first reference system is a Cartesian system X,Y,Z having origin in the reception vertex O and the second reference system is a Cartesian system U,V,W having origin in the illumination vertex $A_0$, the transformation of coordinates is in general a rototranslation (rotation plus translation), which can be reduced to a rotation or to a translation in particular cases. Indicating the coordinates of the illumination vertex $A_0$ of the second reference system in the first reference system with $x_0, y_0, z_0$, and the direction cosines of the axes U,V,W of the second reference system with respect to the first reference system X,Y,Z with $\cos \alpha_1 \ldots \cos \alpha_9$ (the angles $\alpha_1 \ldots \alpha_9$ are indicated with respect to a reference system U',V',W' translated in O in FIG. 10 for clarity of representation), said transformation is expressed by the following set of relationships:

$$u=(x-x_0)*\cos \alpha_1+(y-y_0)*\cos \alpha_2+(z-z_0)*\cos \alpha_3 \quad (1)$$

$$v=(x-x_0)*\cos \alpha_4+(y-y_0)*\cos \alpha_5+(z-z_0)*\cos \alpha_6 \quad (2)$$

$$w=(x-x_0)*\cos \alpha_7+(y-y_0)*\cos \alpha_8+(z-z_0)*\cos \alpha_9 \quad (3)$$

The position of the illumination vertex $A_0$ is illustrated in the first quadrant (positive values of $x_0, y_0, z_0$), but it can be in any quadrant. The illumination vertex $A_0$ can also lie along one of the axes and/or at the reception vertex O. Moreover, one or more of the direction cosines $\cos \alpha_1 \ldots \cos \alpha_9$ can be zero or unitary in the case in which one or more axes of the two reference systems are parallel and/or coincide or are perpendicular.

Figure 12:
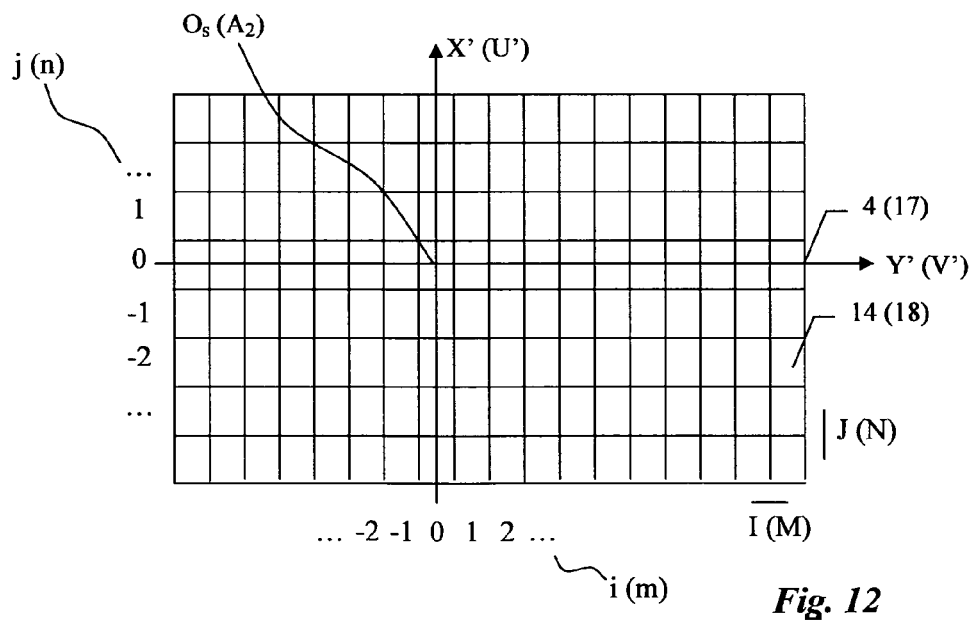
FIGS. 10 to 17 are representations of the geometry of the image capturing device or of parts thereof.
Figure 10:
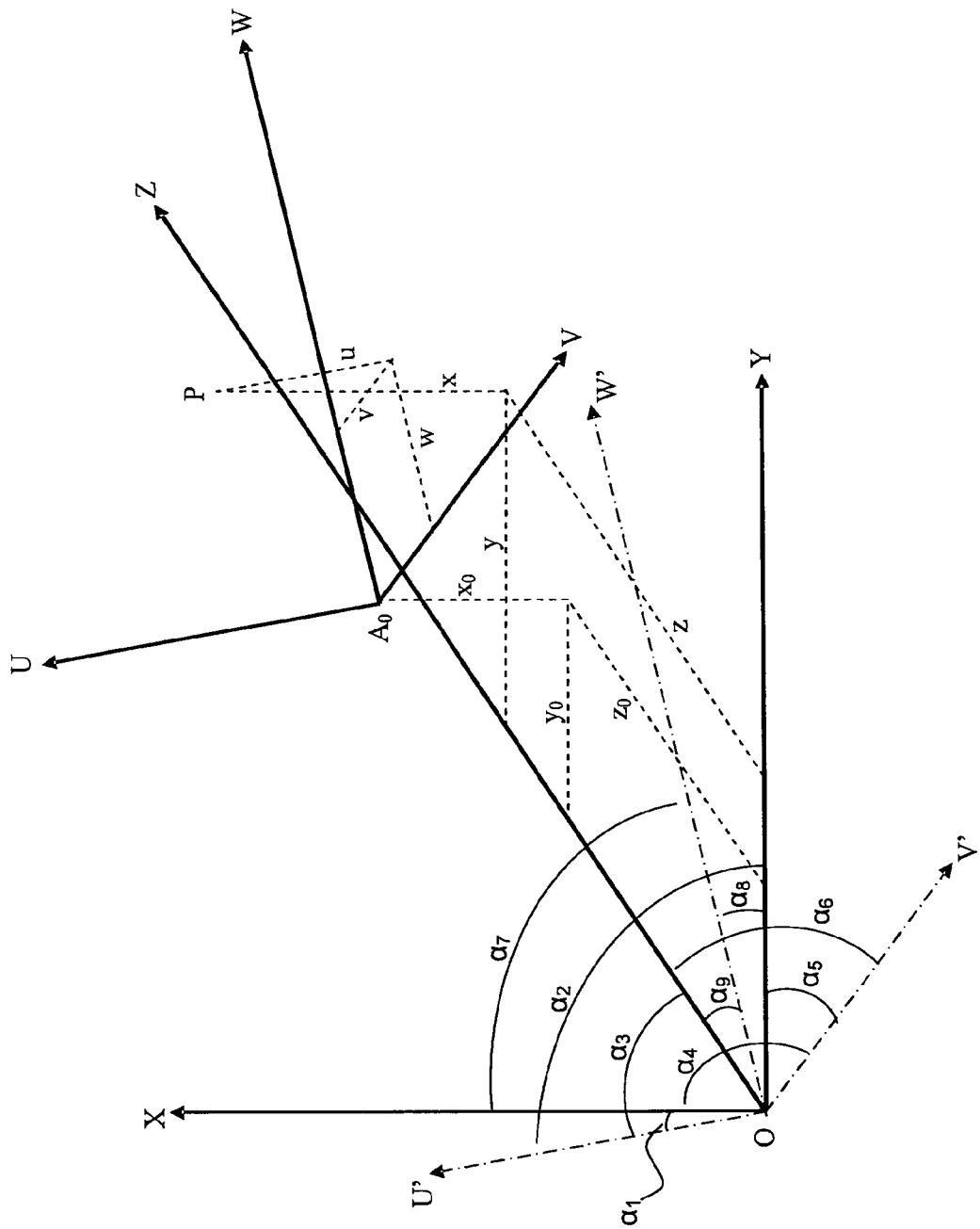
Figure 11:
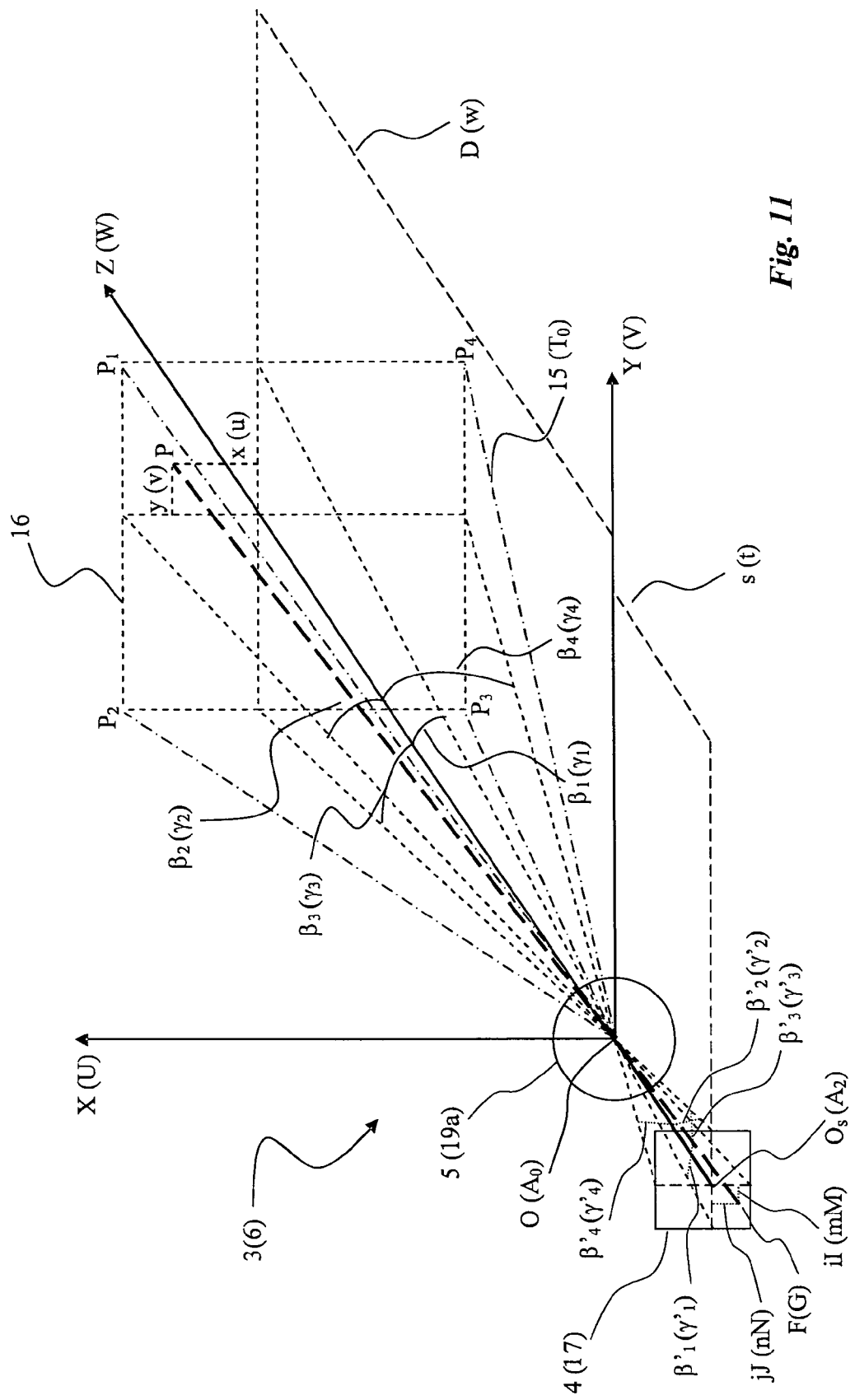

With the aid of FIGS. 11 and 12, the relationship that correlates the points of the region 16 framed by the sensor 4 on the substrate S with the photosensitive elements 14 shall now be explained, said relationship being used in step 108 of the method of FIG. 9, in the case of two-dimensional rectangular—or square as a special case—sensor 4 and inverting optics, schematised as a single paraxial lens 5, having the main plane—which in the specific case is the plane perpendicular to the reception axis Z passing through the optical centre of the receiver optics 5—parallel to the plane of the sensor 4. It should be noted that, in order to remain in general terms, the reception axis Z does not pass through the centre of the sensor 4, rather through a generic point $O_s$ thereof.

In the case of such an embodiment of the image forming device 3, the first reference system is advantageously selected as a Cartesian reference system X,Y,Z, having origin in the reception vertex O, axis Z selected to coincide with the reception axis Z, but oriented the opposite way to the path of the reception light R, and axes X, Y oriented parallel to the main directions of the sensor 4, namely the column and row directions of its photosensitive elements 14.

At the generic working distance D, namely in the plane having the equation $$z = D \quad (4),$$

the working space region 15 (indicated with a dotted and dashed line) defines the region 16 framed by the sensor 4 on the substrate S (not shown for the sake of clarity).

The angles $\beta_1, \beta_2, \beta_3, \beta_4$ that define the field of view on the side of the substrate S are correlated to the angles $\beta'_1, \beta'_2, \beta'_3, \beta'_4$, on the side of the sensor 4 in opposite quadrants, between the reception axis Z and the edges of the sensor 4 by the following relationship:

$$\beta'_k = AMAG_S * \beta_k \quad (5)$$

where $AMAG_S$ is the angular magnification of the receiver optics 5, generally $AMAG_S \leq 1$.

As stated above, although the field of view $\beta_1, \beta_2, \beta_3, \beta_4$ is shown as constant along the reception axis Z, this is not in general necessary, in the case for example of zoom and/or autofocus systems, in which there can be fields of view which are a function of the working distance, namely of the current z coordinate. In the above formula (5) and in the following ones illustrated below, in this case the values of the field of view at the considered working distance D will be used.

If s is the distance between the sensor 4 and the main plane of the receiver optics 5, the reception axis Z meets the sensor 4 at a point $O_s$ of coordinates (0,0,s). With reference to FIG. 12, if the point $O_s$ falls at the centre of a photosensitive element 14 thereof, and if I and J are the column and row inter-axis spacing of the sensor 4, namely the distances between the centres of two adjacent photosensitive elements 14 along the row direction and column direction, respectively, each photosensitive element 14 is defined by its centre, having coordinates in the reference system X,Y,Z expressed by the following relationship:

$$F(i*I, j*J, s) \quad (6)$$

where i and j are the column and row indexes of the sensor 4, respectively, which can take on positive and negative integer values, and take on zero value at the photosensitive element 14 centred at $O_s$.

If the point $O_s$ were not to fall at the centre of a photosensitive element 14, rather a distance $I_1, J_1$ from the centre, the coordinates of the centre of each photosensitive element would be expressed by $(i*I+I_1, j*J+J_1, s)$. If the photosensitive elements 14 of the sensor 4 were not the equal to each other, it would still be possible to calculate the coordinates thereof in the reference system X,Y,Z. It should be noted that the column and line inter-axis spacing I,J of the sensor 4 are equal to each other in the case of square or circular photosensitive elements uniformly spaced on the sensor 4.

If the point $O_s$ falls at the centre of the sensor 4, the reception axis Z is an axis of symmetry for the sensor 4 and the working space region 15 has two planes of symmetry, for which reason $\beta_1 = \beta_3$ and $\beta_2 = \beta_4$. In this case, the column index, as well as the row index, has extreme values that are equal in absolute value.

It can easily be recognized that the centre P of the region framed by the generic photosensitive element 14, defined by indexes i,j, at distance D has coordinates expressed by the following relationships:

$$x = x(j) = D * \tan\left\{\frac{1}{AMAGs} * \arctan\left(\frac{j*J}{s}\right)\right\} \quad (7)$$

$$y = y(i) = D * \tan\left\{\frac{1}{AMAGs} * \arctan\left(\frac{i*I}{s}\right)\right\} \quad (8)$$

$$z = D \quad (9)$$

In the case of unitary angular magnification $AMAG_S = 1$, the relationships (7), (8) reduce to simple proportions:

$$x = x(j) = D * \left(\frac{j*J}{s}\right) \quad (10)$$

$$y = y(i) = D * \left(\frac{i*I}{s}\right) \quad (11)$$

In the case of the embodiment illustrated in FIG. 11, in step 108 of the method of FIG. 9 the relationships (7), (8), (9) or (10), (11), (9), respectively, are applied to the four points $P_1, P_2, P_3, P_4$ defining the vertexes of the region 16 framed by the sensor 4 on the substrate S, or else even only at the opposite vertices $P_1$ and $P_3$ o $P_2$ and $P_4$.

Although not used in the method of FIG. 9, it is worthwhile illustrating the following relationships, the inverses of relationships (7), (8) and wherein the working distance D is replaced by the generic coordinate z:

$$j = j(x, z) = \frac{s}{J} * \tan\left\{AMAGs * \arctan\left(\frac{x}{z}\right)\right\} \quad (12)$$

$$i = i(y, z) = \frac{s}{I} * \tan\left\{AMAGs * \arctan\left(\frac{y}{z}\right)\right\} \quad (13)$$

that allow, given any point P of the working space region 15, the indexes of the photosensitive element 14 of the sensor 4 that receives its image to be identified. Of course, since the indexes i,j are integer numbers, the relationships will be approximated to the nearest integer number. In the case of slightly overlapping fields of view of the individual photosensitive elements 14, in the overlapping areas the two integer numbers approximated by defect and by excess will identify the pair of photosensitive elements 14 that receive the image of the point being considered.

It is straightforward to recognize that what has been outlined with reference to FIGS. 11 and 12 holds true, mutatis mutandis, for an embodiment of the illumination device 6 with rectangular—or square as a special case—two-dimensional array 17 and common, inverting illumination optics 19a, having the main plane—that in this particular case is the plane perpendicular to the optical axis of the illumination optics 19a passing through the optical centre of the illumination optics 19a itself—parallel to the plane of the array 17. The related references are indicated between brackets in FIGS. 11 and 12. The point G indicates the position of the virtual light source that illuminates the point P, to which corresponds at least one light source 18 of the array 17, and at most four light sources 18 adjacent to one another forming a square.

In the case of such an embodiment of the illumination device 6, the second reference system is advantageously selected as a Cartesian reference system U,V,W, having origin in the illumination vertex $A_0$, with axis W coinciding with the optical axis of the common, inverting illumination optics 19a and axes U, V oriented parallel to the main directions of the array 17, namely the row and column directions of its light sources 18. It should be noted that the axis W coincides with the illumination axis A only in the particular case in which it passes through the centre of the array 17.

Once the coordinates u,v,w of the generic point P in the system U,V,W, or rather of the peculiar points $P_1, P_2, P_3, P_4$ or $P_1, P_3$ o $P_2, P_4$, have been obtained in step 109 of the method of FIG. 9 and through the relationships (1), (2), (3), in step 110 of the method of FIG. 9 the following relationships will therefore be applied to such coordinates:

$$n = n(u, w) = \frac{t}{N} * \tan\left\{AMAGa * \arctan\left(\frac{u}{w}\right)\right\} \quad (14)$$

$$m = m(v, w) = \frac{t}{M} * \tan\left\{AMAGa * \arctan\left(\frac{v}{w}\right)\right\} \quad (15)$$

The relationships (14), (15), corresponding to the relationships (12), (13), allow the column and row indexes m, n of the light source 18 of the array 17 that illuminates point P to be calculated, where indexes 0,0 are associated with the light source 18 lying along axis W (point $A_2$).

In relationships (14), (15), M and N are the column and row inter-axes of the light sources 18, $AMAG_a$ is any angular magnification of the common, inverting illumination optics 19a, wherein the following relationship (16) holds true $$\gamma'_k = AMAGa * \gamma_k \quad (16)$$

t is the distance between the plane of the array 17 and the illumination vertex $A_0$, therefore measured along the axis W, and the generalizations and the special cases discussed above with reference to the image capturing device 3 hold true.

In the embodiment of the illumination device 6 illustrated in FIG. 11, there can additionally be lenses 19b associated with the individual light sources 18 of the array 17, in order to modify the angular emission width and/or direction of emission thereof. Regarding this, reference shall be made to the subsequent description of FIGS. 14-16.

Figure 13:
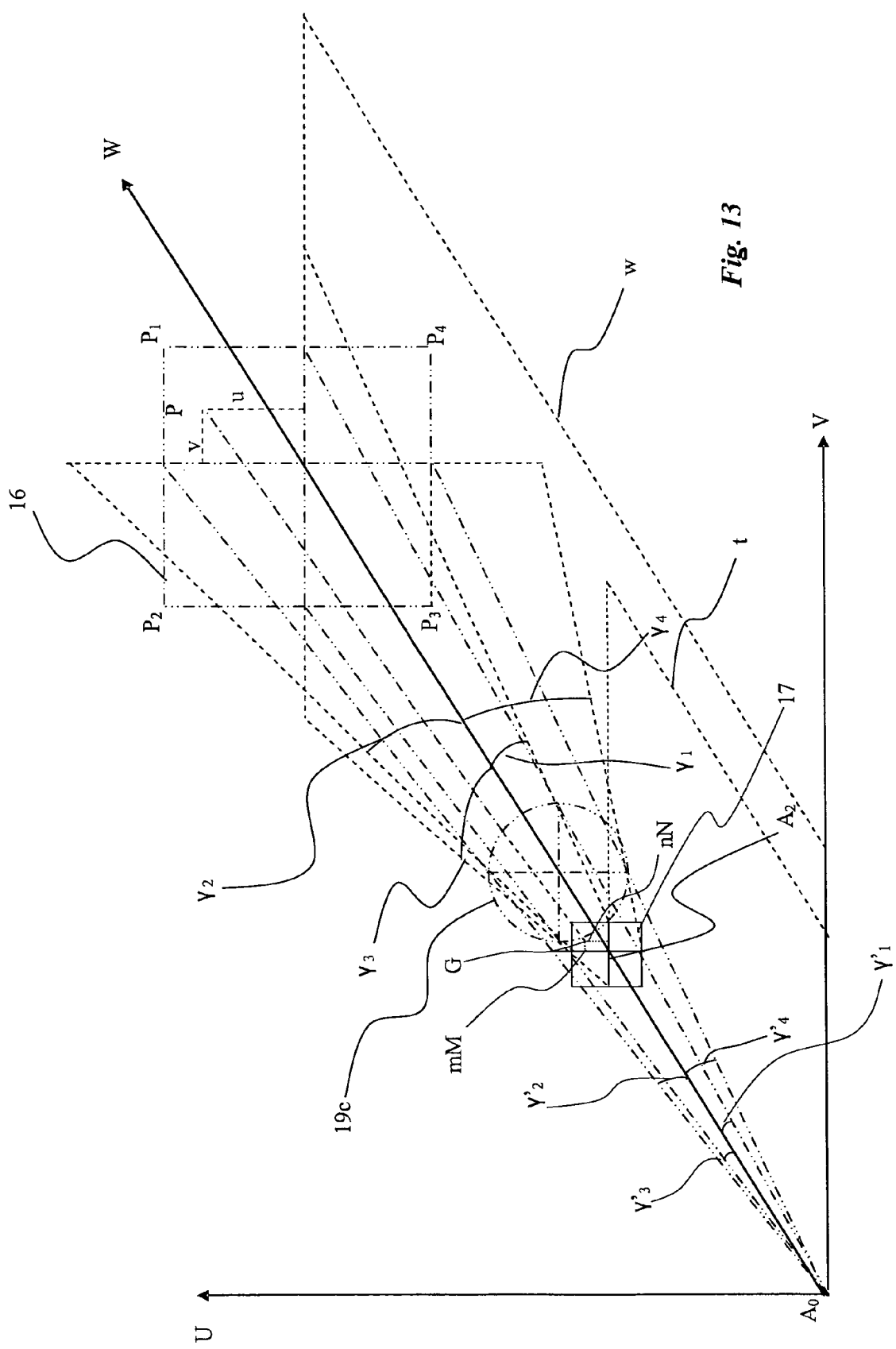

The relationships (14) and (15) express the correlation, to be used in step 110 of the method of FIG. 9, between any point P of the working space region 15 and the row and column indexes of the light source 18 of the array 17 that illuminates it also for an embodiment of the illumination device 6 with common, non-inverting illumination optics 19c, again having the main plane—which in this particular case is the plane perpendicular to the optical axis of the illumination optics 19c passing through the optical centre of the illumination optics 19c itself—parallel to the plane of the array 17, as shown in FIG. 13.

It should be emphasised that the relationships (1) to (16) are analytical relationships that only depend on known (design) geometric parameters of the reader 1, and in particular of its image forming device 3 and of its illumination device 6, and/or of their relative spatial arrangements, including the relative spatial arrangements of their components or subassemblies.

Figure 14:
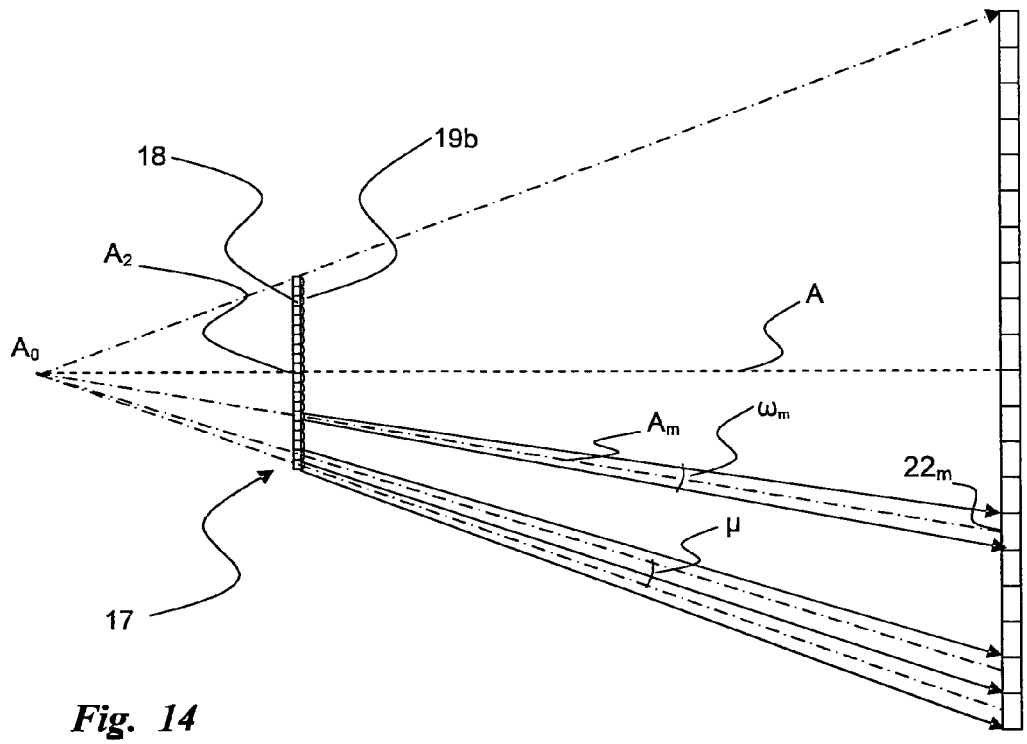
Figure 15:
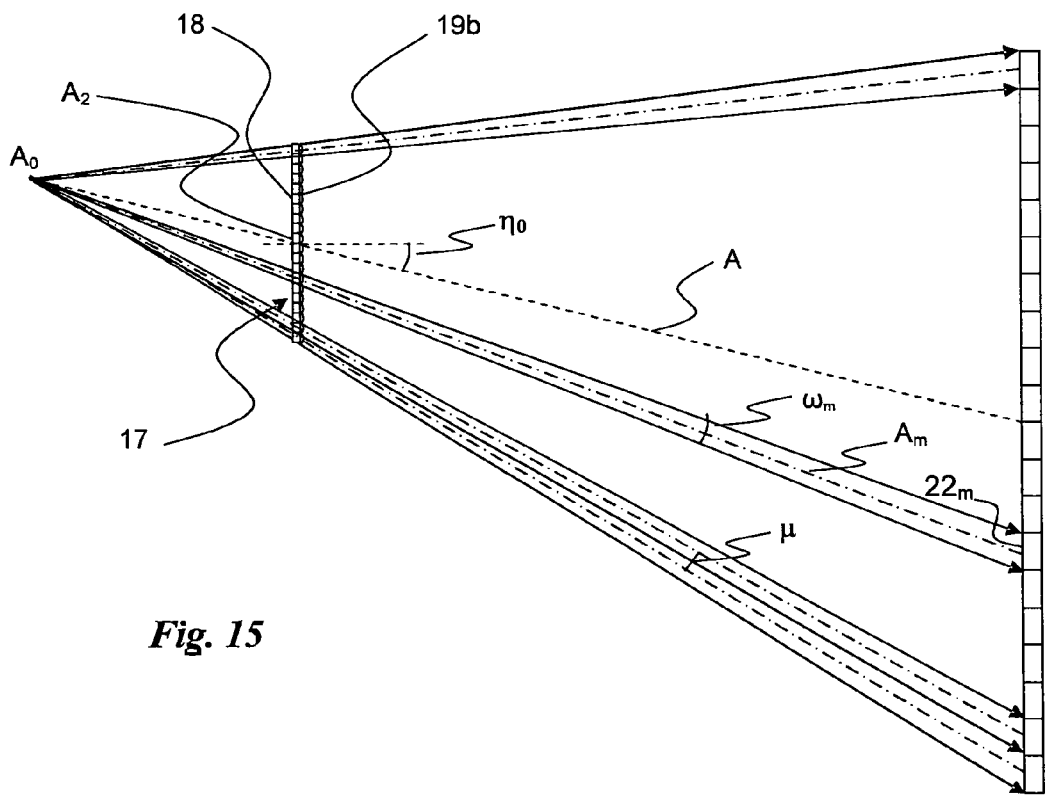
Figure 16:
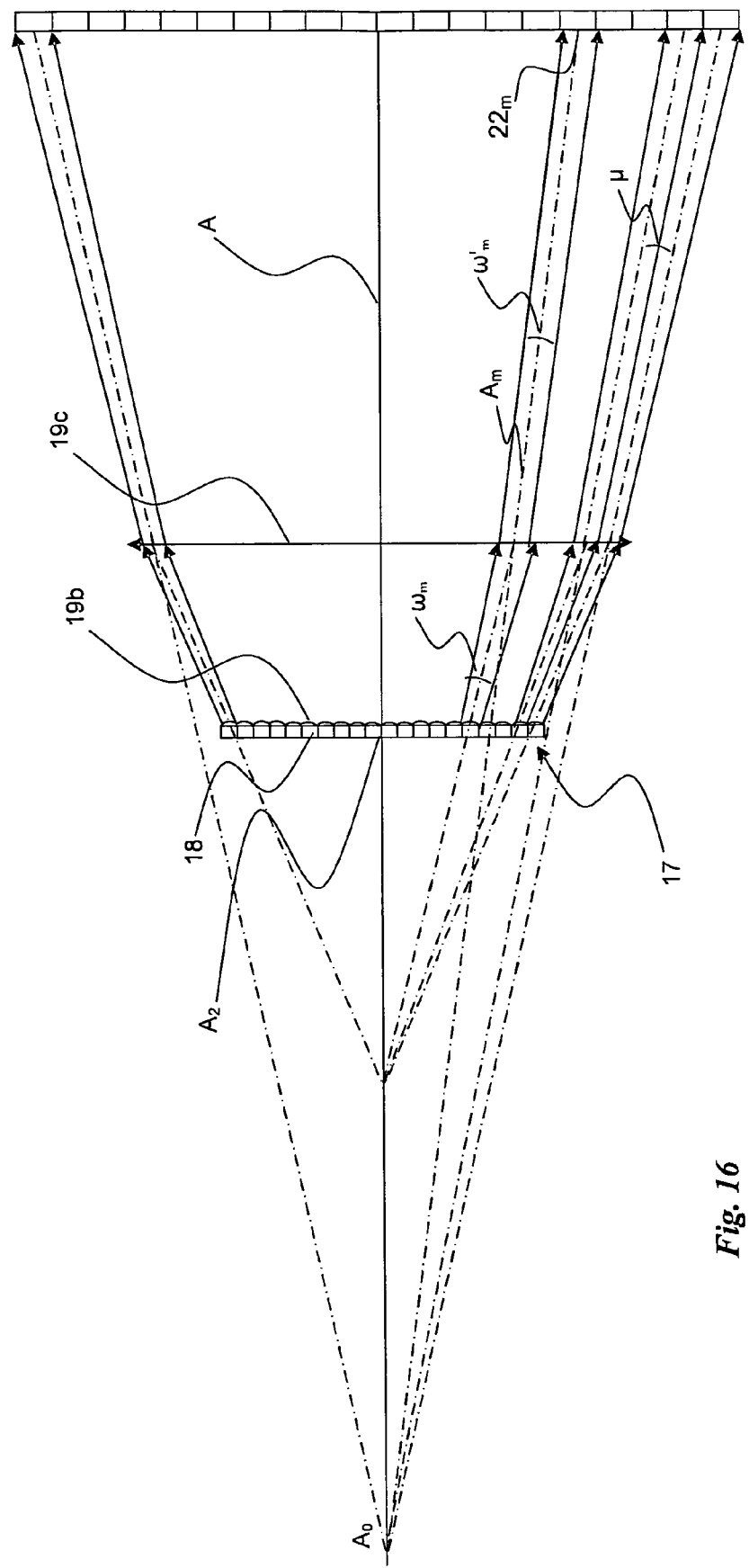

The relationships (14) and (15) hold true also in the case in which the non-inverting-type illumination optics comprises the aforementioned plurality of lenses 19b associated with the individual light sources 18 of the array 17, possibly in association with a common non-inverting lens 19c, as illustrated in FIGS. 14-16.

For the sake of simplicity, an illumination device 6 having such lenses 19b is illustrated in FIG. 14 in a plane that is assumed to contain one or the main direction of the array 17 and the illumination axis A, believing that such a figure is sufficiently descriptive of the more general three-dimensional case in the light of the previous teachings.

Each individual lens 19b addresses the light emitted by the light source 18 on which it is placed so as to form a beam that emits within an angle $\omega_m$ determined by the size of the lens 19b, centred around its own illumination axis $A_m$ determined by the line joining the centre of the light source 18 and the centre of the lens 19b associated therewith. By suitably positioning the centre of the lens 19b with respect to the light source 18 it is therefore possible to ensure that the individual illumination axis $A_m$ is inclined by a desired angle with respect to the plane of the array 17.

In the embodiment of FIG. 14, the illumination axes $A_m$ diverge from each other to define the illumination vertex $A_0$—which in the case shown falls behind the array 17—and uniformly radially spaced by an angle $\mu$. In this case, the illumination axis A of the illumination device 6 is the bisector of the angle defined by the illumination axes of the first and of the last source, and it is perpendicular to the plane of the array 17. Nevertheless, by suitably orienting the lenses 19b with respect to the light sources 18, it would be possible to have the elementary beams cross in front of the array 17. In the case illustrated, the emission angles $\omega_m$ are all equal to angle $\mu$, for which reason adjacent light sources 18 illuminate adjacent contacting areas $22_m$, however the emission angles $\omega_m$ can be slightly greater than angle $\mu$ so that the illuminated areas $22_m$ slightly overlap.

The embodiment of FIG. 15 differs from that of FIG. 14 in that the illumination axis A is not perpendicular to the plane of the array 17, rather inclined by an angle $\eta_0$ with respect to the normal to the plane of the array 17.

These embodiments of illumination device 6 have the advantage of having a very low thickness in the direction perpendicular to the plane of the array 17.

In both cases, in order to reduce the size of the emitted beam it is sufficient to place a lens with angular magnification <1, and precisely with an angular magnification $AMAGm = \omega_1/\omega$, in front of each light source 18, which will emit within its native angle $\omega$.

The embodiment of the illumination device 6 of FIG. 16 differs from that of FIG. 14 in that downstream of the array 17 and of the individual lenses 19b, a further common, non-inverting optics 19c is arranged, having angular magnification factor AMAGm<1 to further reduce the emission angle of the individual light sources 18, to a value $\omega'_m = AMAGm * \omega_m$. The thickness of the illumination device 6 in the direction perpendicular to the plane of the array 17 increases, but the collimation of the illumination beam T is more progressive. In the case of light sources 18 having a particularly small native emission angle w, the angular magnification factor AMAGm could be AMAGm>1. A similar common, non-inverting optics 19c can also be provided for in the case of the embodiment of FIG. 15.

In the embodiments of FIGS. 14-16, the illumination axes $A_m$, the emission angles $\omega'_m$, and the angular magnification factors AMAGm of the individual light sources 18 can be different to one another, and similarly the illumination axes $A_m$ do not necessarily have to be equally spaced, even if with a correlated complication of the method of determining (step 101) the light sources 18 of the array 17 to be switched on.

However, given an illumination device 6, the angles that the individual illumination axes of the light sources 18 form with the illumination axis A can in any case be calculated or measured. Therefore, it is always possible to determine a function, however complex it might be, that correlates a point P on the substrate S with a light source 18 of the array 17 that illuminates it.

In FIGS. 14 to 16 the regions $22_m$ illuminated by the light sources 18 are shown purely for illustrative purposes on a plane parallel to the plane of the array, which however is not necessarily a plane at a given reading distance D, nor is necessarily a plane of focus or of equal blurring of the image forming device 3.

FIGS. 11 and 13-16, as well as FIG. 17 described hereinafter, can be considered as representing as many embodiments of the illumination device 6 wherein the array 17 is curved (FIG. 6).

It is straightforward to recognize that what has been outlined with reference to FIGS. 13-16 holds true, mutatis mutandis, for corresponding embodiments of the image forming device 3. The relative reference numerals are not indicated within brackets in FIGS. 13-16 for the sake of brevity.

Figure 17:
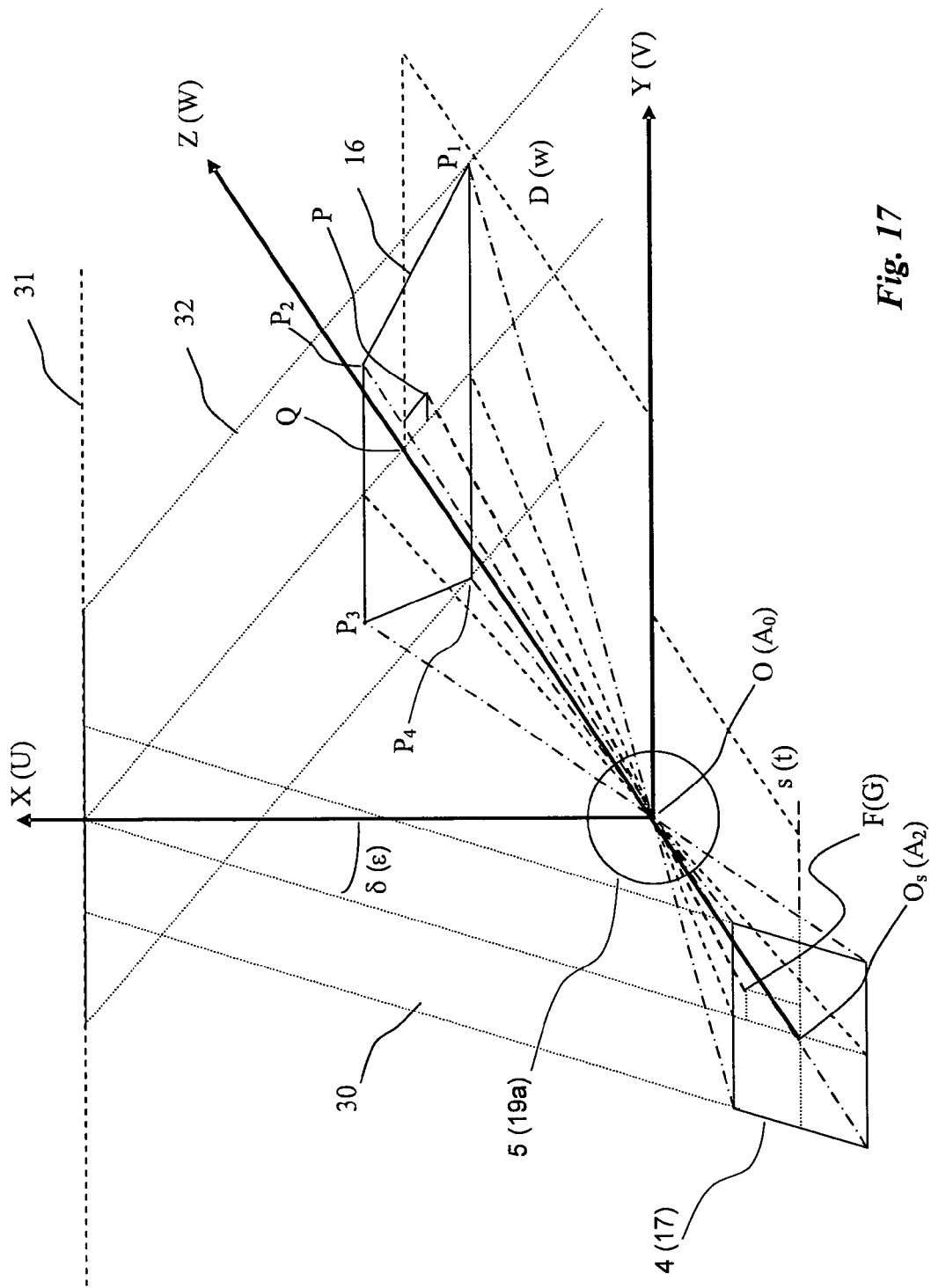

With the aid of FIG. 17 the relationship that correlates the points of the region 16 framed by the sensor 4 on the substrate S with the photosensitive elements 14 of the sensor 4 shall now be explained, said relationship being used in step 108 of the method of FIG. 9, in the case of a rectangular—or square as a special case—two-dimensional sensor 4 and inverting optics, schematised as a single paraxial lens 5, having the main plane—that in this specific case is the plane perpendicular to the reception axis Z passing through the optical centre of the receiver optics 5—not parallel to the plane of the sensor 4.

In the case of such an embodiment of the image forming device 3, the first reference system is advantageously selected as a Cartesian reference system X,Y,Z, having origin in the reception vertex O, axis Z selected so as to coincide with the reception axis Z but oriented the opposite way to the path of the reception light R (FIG. 2), and axis Y oriented parallel to the row direction of the sensor 4, according to which the photosensitive elements 14 are indexed by index i. The column direction of the sensor 4, according to which the photosensitive elements 14 are indexed by index j, forms an angle δ with axis X. The case in which the main plane of the receiver optics 5 is also inclined with respect to the row direction of the sensor 4 is a generalisation thereof, that is not dealt with for the sake of brevity. Moreover, in FIG. 17 the reception axis Z is, for the sake of simplicity, indicated as passing through a point $O_s$ of the sensor 4 corresponding to the centre of the sensor 4, and in particular through the centre of a photosensitive element 14 thereof, however in general this is not strictly necessary and the considerations outlined with reference to FIG. 12 hold true.

The plane 30 (schematically indicated by three dotted lines) on which the sensor 4 lies meets the plane X,Y along a straight line 31 defined by the set of equations $$x = -s/\tan \delta \quad (17)$$

$$\text{any } y \quad (18)$$

$$z = 0 \quad (19)$$

where the minus sign in relationship (17) takes the fact that the distance s between the reception vertex O and the intersection $O_s$ of the reception axis Z with the sensor 4 is negative in the reference system X,Y,Z into account.

At the generic working distance D within the depth of field DOF of the image forming device 3, measured along the reception axis Z and defined by the point Q of the reception axis Z of coordinates $$Q(0,0,D) \quad (20),$$

the plane 32 (also schematically indicated by three dotted lines) passing through the straight line 31 and through the point Q is defined, and therefore can be expressed through the following relationship:

$$x^*D + z^*(-s/\tan \delta) - [(-s/\tan \delta)^*D] = 0 \quad (21)$$

With the conventions used above with reference to FIG. 12, each photosensitive element 14 of the sensor 4 is defined by its centre, having coordinates in the reference system X,Y,Z expressed by the following relationship (22):

$$F(j^*J^*\cos \delta, i^*I, s+j^*J^*\sin \delta) \quad (22)$$

written assuming, for the sake of simplicity, a unitary angular magnification $AMAG_S$ of the receiver optics 5. In this hypothetical case, the centre of the region framed by the generic photosensitive element 14 identified by the indexes i,j, lies on the straight line passing through the photosensitive element 14 itself, and through the reception vertex O (straight line FOP of FIG. 17) and therefore can be expressed through the following set of parametric equations:

$$x = j^*J^*\cos \delta^* f \quad (23)$$

$$y = i^*I^* f \quad (24)$$

$$z = (s + j^*J^*\sin \delta)^* f \quad (25)$$

with any f.

In the region 16 framed by the sensor 4 on the plane 32, the coordinates of the centre P of the region framed by each photosensitive element 14 are therefore expressed by the equations (23),(24),(25) for the value of the parameter f that is obtained by combining relationships (23),(24),(25) themselves with relationship (21), namely:

$$f = -\frac{s * D}{[j * J * \sin\delta * (D - s)] - s^2} \quad (26)$$

In the case of the embodiment illustrated in FIG. 17, in step 108 of the method of FIG. 9 relationships (23), (24), (25) with the value of f of relationship (26) are applied to the four points $P_1, P_2, P_3, P_4$ defining the vertexes of the region 16 framed by the sensor 4 on the substrate S, or even only to the opposite vertices $P_1$ and $P_3$, or $P_2$ and $P_4$.

FIG. 17 and the previous description can also apply, mutatis mutandis, to the illumination device 6 in the case in which the latter has a corresponding embodiment, in other words with rectangular—or square as a special case—two-dimensional array 17 and inverting optics, having the main plane—that in this specific case is the plane perpendicular to the axis of the illumination optics 19a passing through the optical centre of the common illumination optics 19a itself—not parallel to the plane of the array 17. Also in this case the relative reference numerals are put within brackets in FIG. 17.

Once the coordinates u,v,w in the system U,V,W of the generic point P, or better of the points $P_1, P_2, P_3, P_4$ or $P_1, P_3$ or $P_2, P_4$, have been obtained, in step 109 of the method of FIG. 9 and through relationships (1), (2), (3), in step 110 of the method of FIG. 9 the following relationships will therefore be applied to such coordinates $$n = u/(N^* \cos \epsilon^* f) \qquad (27)$$

$$m = v/(M^* f) \qquad (28)$$

that are inverse to relationships (23), (24), where the value of parameter f also satisfies the relationship $$f = -\frac{t*w}{[n*N*\sin\epsilon*(w-t)] - t^2} \qquad (29)$$

with $$w = (t + n^*N^* \sin \epsilon)^* f \qquad (30)$$

where relationships (29) and (30) correspond to relationships (26) and (25).

By combining relationships (30) and (27), one obtains:

$$n(u, w) = \frac{u*t}{N} * (w\cos\epsilon - u\sin\epsilon); \qquad (31)$$

by replacing (31) in (29), f(u,w) is obtained, and finally by replacing the latter value in (28), m(u,v,w) is found, which are omitted for the sake of brevity.

It should be emphasised that also the relationships from (17) to (31) are analytical relationships that only depend upon known (design) geometric parameters of the reader 1, and in particular of its image forming device 3 and of its illumination device 6, and/or of their relative spatial arrangements, including the relative spatial arrangements of their components or subassemblies.

Said relationships therefore allow the row and column indexes m, n of the light source 18 of the array 17 that illuminates the peculiar points, and in general any point P of the working space region 15, to be calculated, wherein the indexes 0,0 are associated with the light source 18 lying along axis W (point $A_2$), in the various configurations of the image forming device 3 and of the illumination device 6.

It should be understood, as stated above with reference to FIG. 9, that it might be necessary or advantageous to change/increase/decrease the peculiar points in either reference system, according to the type of figure resulting in each of them. Therefore, relationships (1) to (3) and their inverses can be applied not only to peculiar points, rather also to expressions of lines or curves.

The formulae described above therefore allow the determining, according to the analytical method, of the subset 18a of light sources 18 of the array 17 to be switched on to illuminate the entire region 16 framed by the sensor 4 on a substrate S at a given working distance D to be completed, step 101 of the run-time or one-off method of FIG. 7 or of FIG. 8.

The formulae described above can be simplified with particular configurations of the image capturing device 2. Moreover, different reference systems may be equally or more advantageous, with the application of correspondingly different formulae.

In order to calculate the intensity with which to switch on each light source 18 of the array 17 determined in step 101 of the method of FIG. 7 or of FIG. 8, in the case in which it is variable, it is easy to calculate the distance d of every point P of the region 16 framed by the sensor 4 on the substrate S from the light source 18 that illuminates it (the distance d is not indicated in the figures for the sake of clarity). In the cases of FIGS. 10-17 it is possible to easily express such distances in the reference system U,V,W through the following relationship:

$$d = \sqrt{(u-nN)^2 + (v-mM)^2 + (w-t)^2} \qquad (32)$$

where the magnitudes are taken with suitable signs.

For the purposes of the initial design of the array 17 of light sources 18, it is worthwhile calculating what is the minimum solid angle within which the array 17 must be able to emit in order to illuminate the entire working space region 15, namely the entire field of view of the image forming device 3 within its entire depth of field DOF. In other words, the solid angle subtended by the maximum illumination beam $T_0$ must be at least equal to such a minimum solid angle.

This can be easily carried out by applying the concepts and formulae described above to the suitable peculiar points, for example to the vertexes of the working region 16$_1$ framed by the sensor S at the minimum reading distance D=$D_1$ and to the vertexes of the working region 16$_2$ at the maximum reading distance D=$D_2$, and by evaluating which are the most positive and most negative values obtained for the indexes m and n. One or more of the quantities indicative of the configuration and geometry of the illumination device 6 and of its position with respect to the image forming device 3 are, in such an evaluation, advantageously kept in parameter form. Such quantities include the coordinates $x_0, y_0, z_0$ of the illumination vertex $A_0$ in the reference system X,Y,Z associated with the image forming device 3, the direction cosines $\cos \alpha_1 \ldots \cos \alpha_9$, the distance t of the array 17 from the illumination vertex $A_0$, the angular magnification $AMAG_a$ of the illumination optics, the angle of inclination $\epsilon$ in the case of the embodiment of FIG. 17, and also in general the column and row inter-axes M and N, and the extremes of the column and row indexes m, n of the array 17, in other words the number of light sources 18 of the array 17, and the location of point $A_2$ within the array 17. The effective values of such quantities may be subject to possible design restrictions, such as the maximum size of the image capturing device 2 and the availability of arrays 17 having suitable characteristics. However, in general it is always possible to size and position the array 17 in such a way that all of its light sources 18 are exploited, in other words switched on, at at least one reading distance D. Similar considerations are valid in the case of designing of the entire image capturing device 2, when one or more of the quantities indicative of the configuration and geometry of the image forming device 3 will also be maintained in parameter form, for example the distance s of the sensor 4 from the reception vertex O, the angular magnification $AMAG_S$ of the receiver optics 5, the angle of inclination $\delta$ in the case of the embodiment of FIG. 17, and also in general the column and row inter-axes I and J, and the extremes of the column and row indexes i, j of the sensor 4, in other words the number of photosensitive elements 14 of the sensor 4, and the location of the point $O_s$ within the sensor 4.

Nevertheless, it should be understood that the values of the quantities listed above are known constants for a given image capturing device 2.

From what has been outlined above simplified formulae can be derived, to be applied in the case of one-dimensional sensor 4 and/or array 17, and/or formulae, in general more complex, to be applied in the case of a curved array 17 (FIG. 6).

It must also be clear that the substrate S can in practice have any orientation with respect to the reception axis Z, provided that the optical information C occupies an area in space that overall lies within the working space region 15, and at sufficiently similar local distances, so that the focussing on the sensor 4 is sufficiently uniform; in such conditions the illumination obtained by the illumination device 6 is also suitable in practice, even if calculated based on a single working distance D. A more accurate determination of the light sources 18 to be switched on, which takes such an inclination into account, can however be carried out, even if the formulae to be applied according to the analytical case are more complex.

Figure 18:
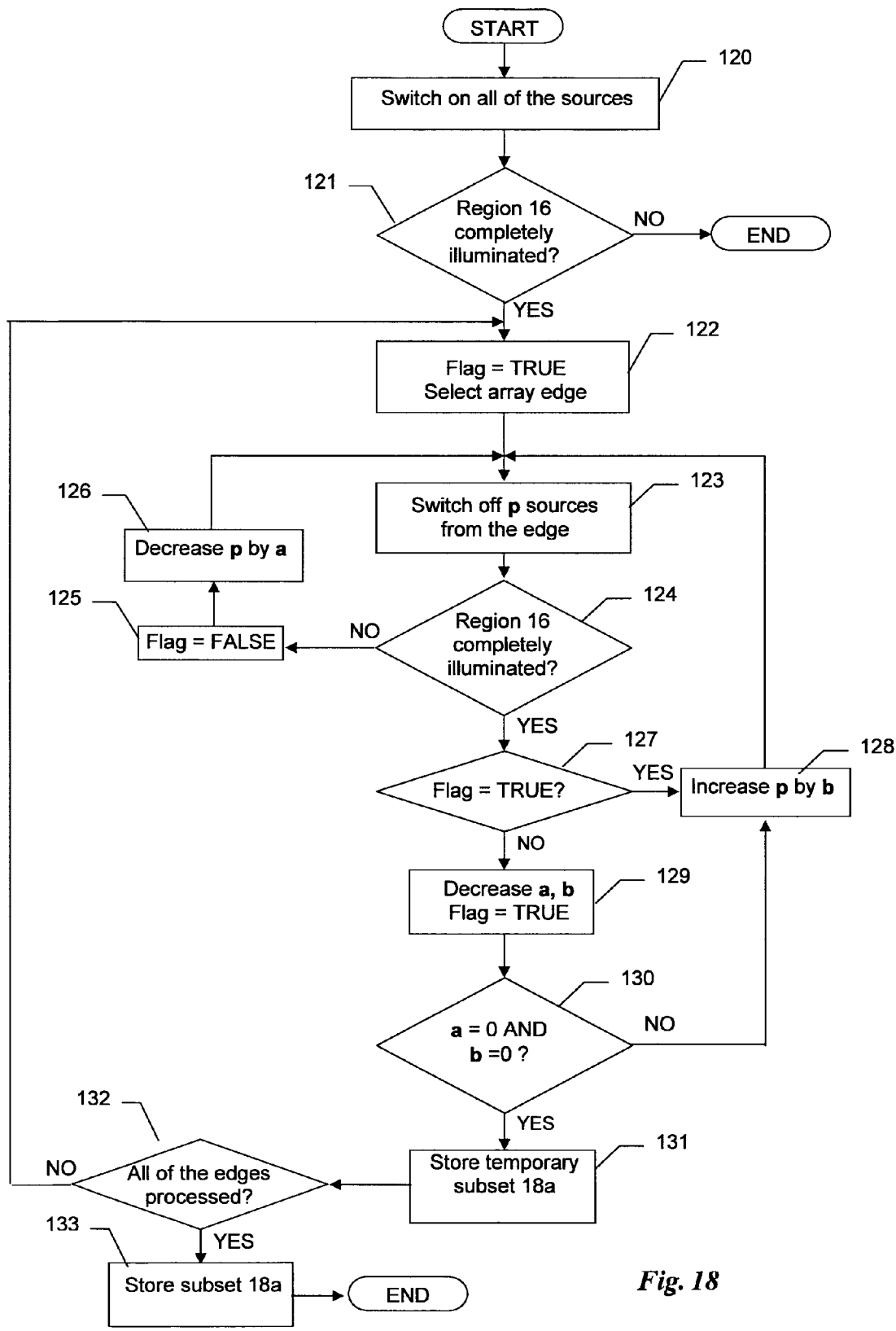
FIG. 18 is a block diagram that illustrates another embodiment of the driving of the light sources of the illumination device.

A second method for implementing, in different embodiments of the image capturing device 2, both run-time (FIG. 7) and one-off (FIG. 8), the step 101 of determining the subset 18a of light sources 18 that must be switched on, at a given current working distance D within the depth of field DOF, in order to illuminate the entire and only the region 16 framed by the sensor 4 is of the empirical or adaptive type, and an exemplary embodiment thereof is shown in FIG. 18.

This embodiment is well adapted to the case in which the plane of the sensor 4 and the plane of the array 17 are parallel, and they are rectangular. A more general method is described below.

The driver initially takes care of switching on all of the light sources 18 of the array 17 in a step 120. In such a condition, the entire region 16 framed by the sensor 4 is certainly illuminated, and this is checked in a step 121. The negative case implies a design and/or assembly error of the image capturing device 2—in other words the condition that the maximum illumination beam $T_0$ is greater than or equal to the minimum required solid angle is not met and/or the position of the illumination vertex $A_0$ and/or the inclination of the illumination axis A with respect to the reception axis Z are not correct—and/or a malfunction of the array 17, and consequently the method ends. Steps 120, 121 can however be omitted.

In the case of an affirmative outcome of step 121, in a step 122 a flag is set to TRUE, an edge of the array 17 is preselected and the following cycle of operations begins. In a step 123, the driver takes care of switching off a number p of light sources 18 starting from the preselected edge of the array 17. In a step 124, it is checked whether the entire region 16 framed by the sensor 4 is still illuminated. In the negative case, in a step 125 the flag is set to FALSE, and in a step 126 the number p is decreased by a number a. Then execution of step 123 and the subsequent check step 124 are returned to. In the case of an affirmative outcome of step 124, in a step 127 it is checked whether the flag is still TRUE. In the affirmative case, in a step 128 the number p is increased by a number b, and execution of step 123 is returned to. In the case of a negative outcome of step 127, i.e. when the flag has been set to FALSE in step 125, in a step 129 the numbers a, b are decreased and the flag is set to TRUE. In a step 130 it is checked whether the numbers a, b are at value 0. In the negative case, step 128 is returned to. In the affirmative case, the current value of p indicates the light sources 18 to be switched off starting from the preselected edge of the array 17, and thus a temporary version of the subset 18a of the sources 18 to be illuminated is set in a step 131. In a step 132 it is then checked whether all of the edges of the array 17 have been examined and, in the negative case, step 122 is returned to, wherein a different edge of the array 17 is of course selected. When all of the edges of the array 17 have been examined, positive outcome of step 132, the final subset 18a of the sources 18 to be illuminated is set in a step 133.

Figure 19:
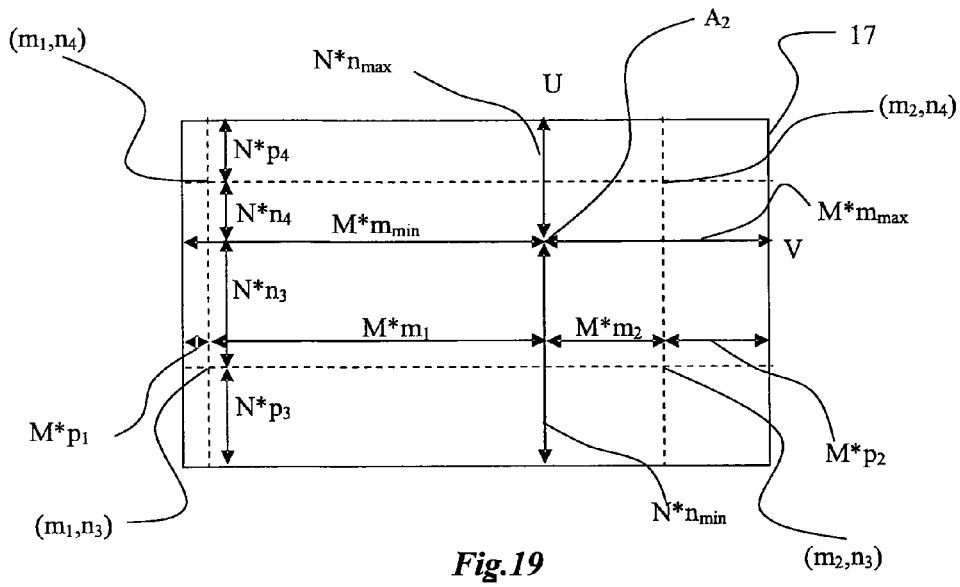
FIG. 19 is a graphical representation of the embodiment of the driving of the light sources of the illumination device of FIG. 18.

Wishing to refer to the previous description of the analytical method, also with reference to FIG. 19, selecting the edge of the array as that of the light source 18 with most negative column index m, this being $-m_{min}$, the value of $p=p_1$ at the positive outcome of step 130 indicates that the column index of the first light source 18 to be switched on is $m_1=-m_{min}+p_1$; selecting the edge of the array as that of the light source 18 with maximum column index, this being $m_{max}$, the value of $p=p_2$ at the positive outcome of step 130 indicates that the column index of the last source to be switched on is $m_2=m_{max}-p_2$; selecting the edge of the array as that of the light source 18 with most negative row index, this being $-n_{min}$, the value of $p=p_3$ at the positive outcome of step 130 indicates that the row index of the first light source 18 to be switched on is $n_3=-n_{min}+p_3$; selecting the edge of the array as that of the light source 18 with maximum row index, this being $n_{max}$, the value of $p=p_4$ at the positive outcome of step 130 indicates that the row index of the last source to be switched on is $n_4=n_{max}-p_4$. Therefore the light sources of indexes $(m_1,n_3)$, $(m_2,n_3)$, $(m_2,n_4)$, $(m_1,n_4)$ will be switched on.

The cycle of steps 123-130 described above can be carried out simultaneously for both edges of a one-dimensional array 17 or, in the case of a two-dimensional array 17, simultaneously for a pair of opposite edges (i.e. simultaneously determining the row, respectively column subset) or adjacent edges (i.e. simultaneously determining the row and column indexes of the first source to be switched on starting from a vertex of the array); of course, in such a case the variables p, a, b and the flag will be suitably multiplied. In certain configurations of the image capturing device 2 it may moreover be sufficient to repeat the cycle of steps 123-130 only on two or three edges of the array 17, for example when the region 16 framed by the sensor 4 on the substrate S is rectangle-shaped and centred both as seen by the sensor 4, and as seen by the illumination device 6.

It should be understood that the use of numbers a and b allows the number of cycles to be overall carried out to be reduced, by carrying out a sort of binary search of the first source of the subset 18a of light sources 18 to be switched on starting from the preselected edge of the array 17. In other words, as long as the region 16 framed by the sensor 4 on the substrate S is totally illuminated—the flag remains TRUE—, many (b) light sources 18 are switched off each time in step 128. When too many light sources 18 have been switched off—flag brought to FALSE—, it is attempted to switch off less of them at a time by switching back on some (a) sources, until meeting the last source that can be switched off starting from the edge. In particular in steps 126, 129 the decrease and/or increase of a and/or b can occur by successive halving and/or doubling (dichotomic method) to make the convergence of the algorithm faster. However, the use of numbers a and b is optional, it being possible to switch on and off a single source at a time.

Those skilled in the art will understand how to modify the block diagram of FIG. 18 to start from a configuration wherein all of the light sources 18 are left switched off, and only one or more of them are switched on at a time, or to start from a configuration wherein the light sources 18 of a central region of the array 17 are initially switched on.

Moreover, it should be understood that the initial number p of light sources 18 that are switched off can be selected as a function of the last determination carried out. Indeed, as the working distance D increases (or decreases, respectively), the number of light sources 18 to be switched off starting from one edge of the array 17 increases, and the number of light sources 18 to be switched off starting from the opposite edge of the array 17 decreases (cfr. FIG. 3). Therefore, instead of always starting back from the illumination of the entire array 17, it is possible to start from the subset 18a of sources determined for the closest working distance D.

In the more general case in which the area to be switched on the array 17 is a generic quadrilateral and not a rectangle or square, which generally occurs when the planes on which the sensor 4 and the array 17 lie are not parallel and in particular in the case of FIG. 17, a different embodiment of the empirical/adaptive method is more advantageous to implement, both run-time (FIG. 7) and one-off (FIG. 8), the step 101 of determining the subset 18*a* of light sources 18 that must be switched on, at a given current working distance D within the depth of field DOF, to illuminate the entire and only the region 16 framed by the sensor 4.

Figure 20:
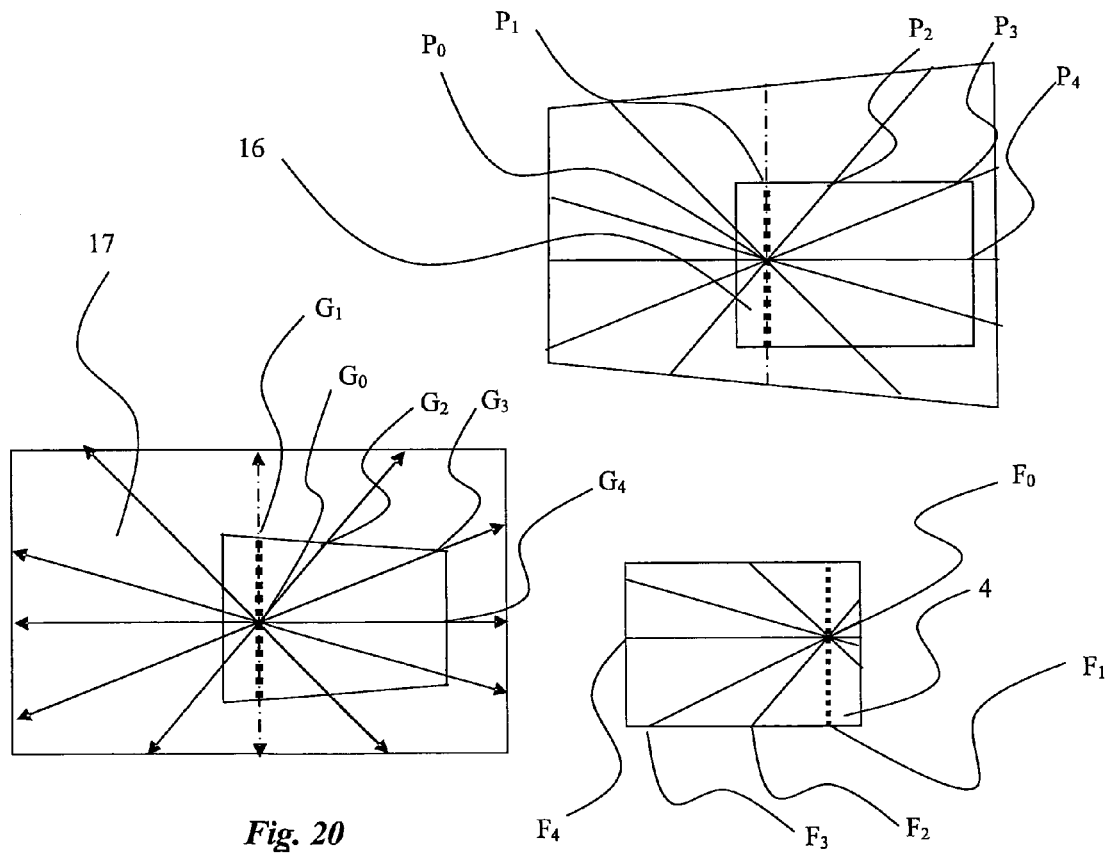
FIG. 20 is a graphical representation of an embodiment of the driving of the light sources of the illumination device.

This embodiment is based on the following steps, described also with reference to FIG. 20:
a) switching on a series of rows or columns of the array 17 in succession until the region 16 framed by the sensor 4 is at least partially illuminated, in particular until the sensor 4 detects the image of a line, in general oblique and not centred;
b) identifying and switching on a light source 18 of the array 17, indicated as "starting light source" hereinafter, represented by point $G_0$ in FIG. 20, which illuminates a point $P_0$ of such an illuminated line, which in turn illuminates a point $F_0$ (or photosensitive element 14) of the sensor 4; preferably the starting light source is selected as the one that illuminates the middle point of the portion of illuminated line seen by the sensor 4; the selection can take place for example with rapid sequential switching on of all of the light sources 18 of the row or column under examination;
c) selecting an oriented direction along the array 17, having origin in the starting light source $G_0$, and identifying the light source 18 (represented by point $G_1$ in FIG. 20) along such a direction that illuminates a point $P_1$ the image of which is formed onto one of the photosensitive elements 14 at an edge of the sensor 4, represented by point $F_1$ in FIG. 20;
d) storing the light source 18 identified, together with the corresponding edge of the sensor 4;
e) repeating steps c) and d) each time selecting an oriented direction angularly spaced from that of the previous execution, until 360° are completed, identifying the sources $G_2$, $G_3$, $G_4$ . . . corresponding to the photosensitive elements $F_2$, $F_3$, $F_4$ . . . ; it should be noted that the edge of the sensor 4 identified each time can be the same as that of the previous execution, or else the adjacent one; the angular spacing between the directions is suitably selected so that there are at least eight iterations of steps c) and d), preferably at least twelve, so as to identify at least two light sources 18 for each edge of the sensor 4;
f) identifying, for each group of sources that illuminate points whose image is formed onto one of the photosensitive elements 14 of a same edge of the sensor 4, like for example the sources $G_2$, $G_3$ of FIG. 20, the straight line that joins them on the array 17; and
g) connecting such straight lines to form the perimeter of the polygon (quadrilateral) defining the light sources 18 to be switched on.

For a circular/elliptical sensor the method is identical, but obviously it does not make sense to distinguish the different edges of the sensor 4, and in order to find the boundary of the light sources 18 to be switched on, starting from the ones identified, a non-linear interpolation between the positions of the identified sources, known by a skilled in the art, needs to be used.

Figure 21A:
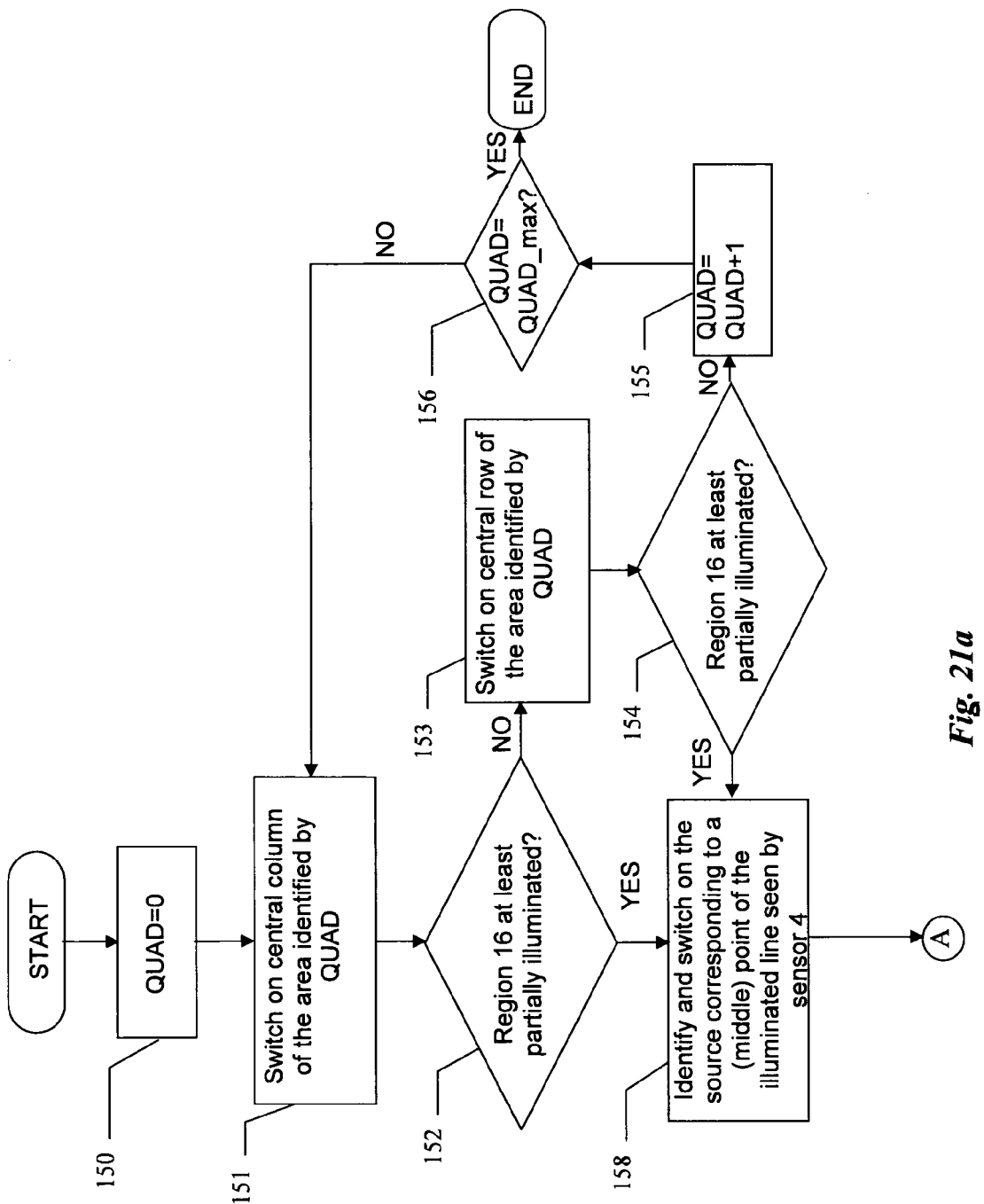
FIGS. 21a, 21b and 21c represent as a whole a block diagram that illustrates in detail the embodiment of the driving of the light sources of the illumination device represented in FIG. 20, FIGS. 22 to 27 are schematic representation of various embodiments of the image capturing device.
Figure 21B:
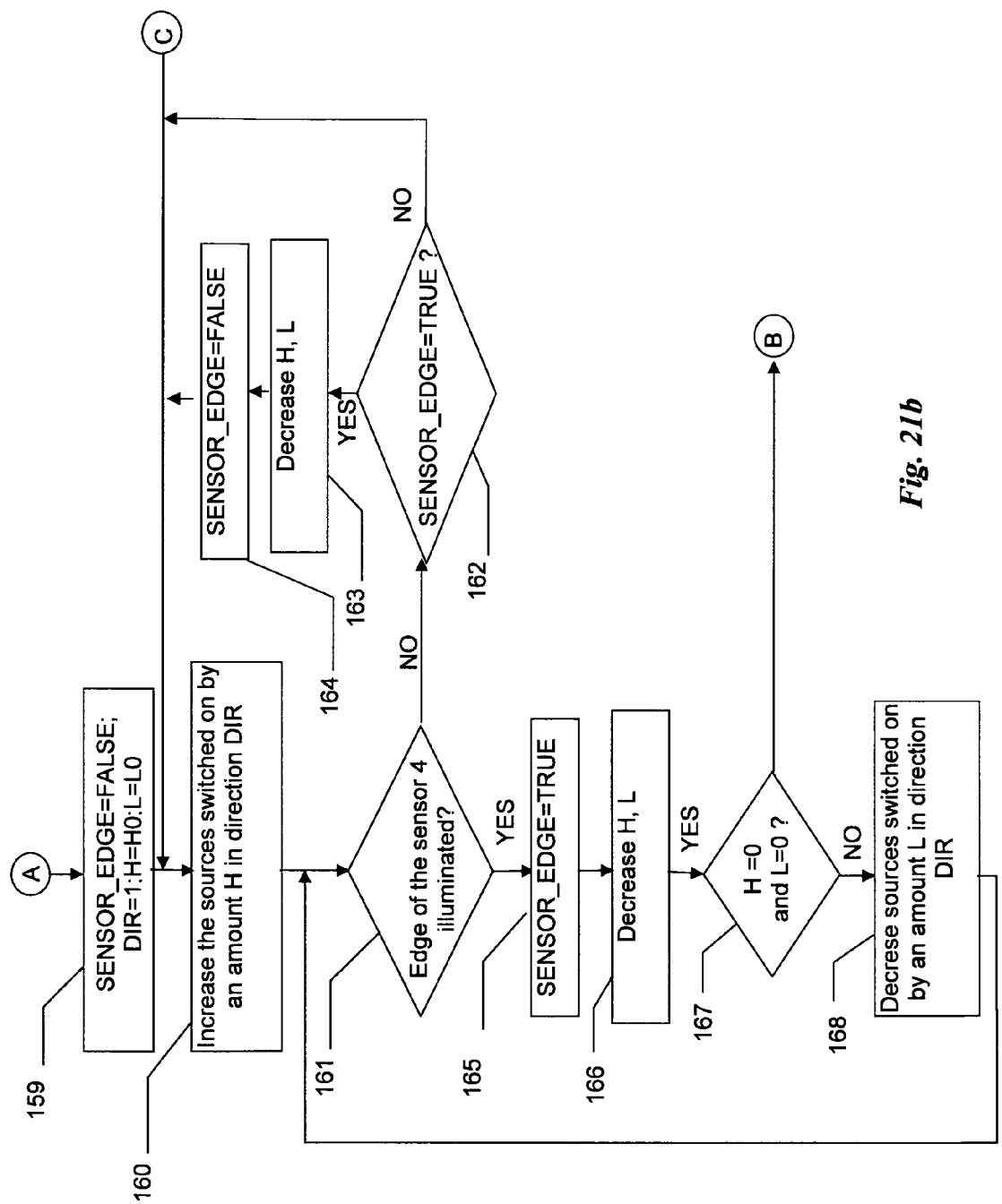
Figure 21C:
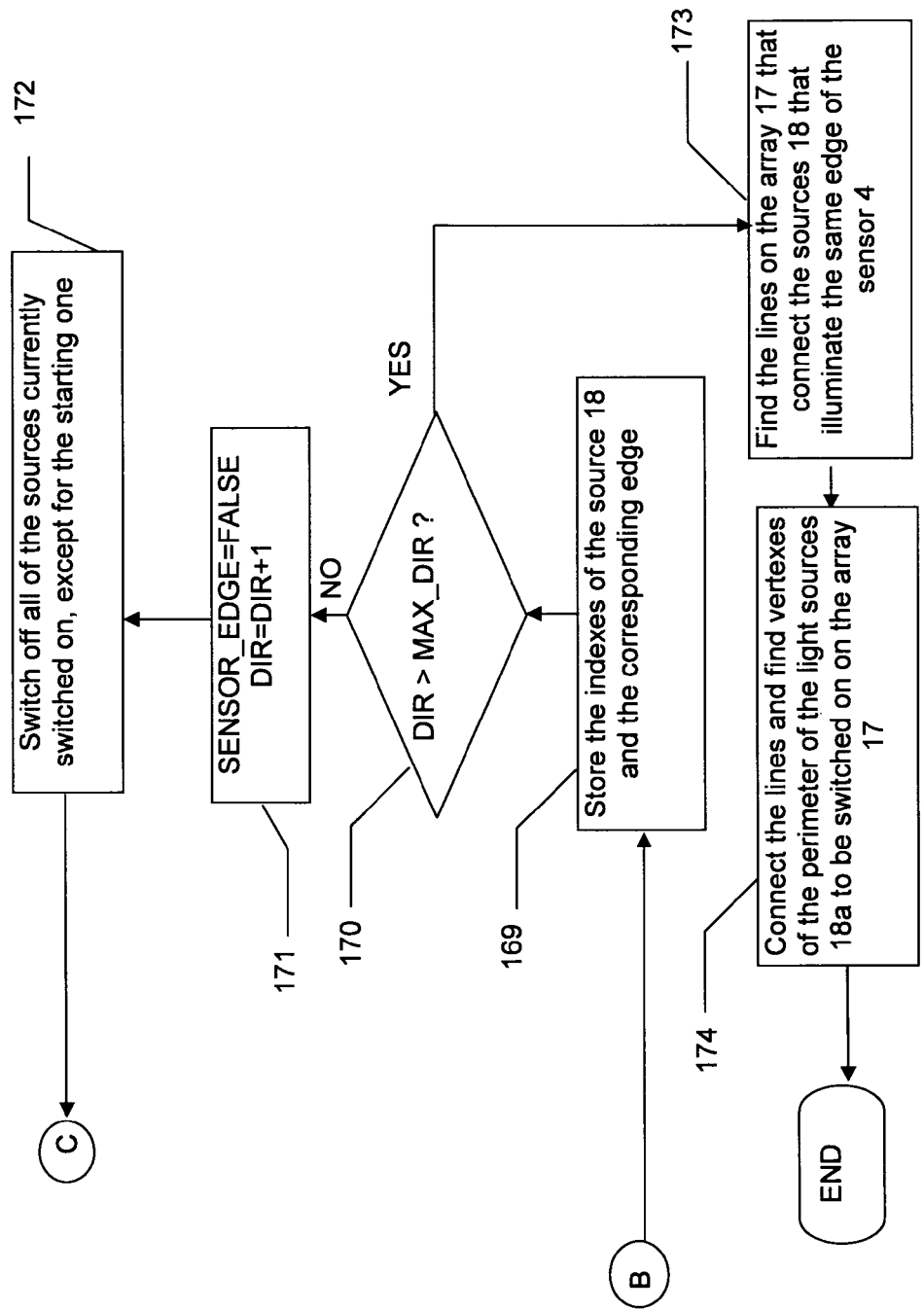

A possible implementation of such an embodiment is shown in FIG. 21, divided over plural pages.

The aforementioned step a) is thus implemented with a first cycle of operations. In a first step 150, a counter QUAD is initialized, for example at 0. This counter identifies an area of the array 17 in which the search of the subset 18*a* of light sources 18 of the array 17 to be switched on is being carried out. In the preferred implementation, the value QUAD=0 identifies the entire array 17, while the values QUAD from 1 to 4 indicate the four quadrants of the array 17. Other subdivisions of the array 17 can be used. In the subsequent step 151, the central column of the area identified by the current value of the counter QUAD is switched on, so that when QUAD=0 all of the light sources 18 of the central column of the array 17 are switched on. In step 152 it is checked whether the region 16 framed by the sensor 4 on the substrate S is at least partially illuminated, or whether at least part of the illuminated line is "seen" by the sensor 4. In the negative case one passes to a step 153 in which the column of light sources 18 currently switched on is switched off, and the central row of the area identified by the current value of the counter QUAD is switched on, so that when QUAD=0 all of the light sources 18 of the central row of the array 17 are switched on. In a subsequent step 154 the checking of whether the region 16 framed by the sensor 4 on the substrate S is at least partially illuminated, or whether at least part of the illuminated line is "seen" by the sensor 4, is repeated. In the negative case the QUAD parameter is increased by 1 in a step 155 and, in a step 156, it is checked that all of the areas in which the array 17 has been ideally divided, in particular all four quadrants (QUAD>$QUAD_{max}$, in particular QUAD>4), have not been used up. In the affirmative case, the method ends since there is a design error of the reader 1 or a malfunction thereof. If the quadrants have not yet all been explored (QUAD≤$QUAD_{max}$), the execution of step 151 is returned to, therefore switching on the central column of the quadrant being considered (the central row of the quadrant being considered in step 153). If step 152 or step 154 gives a positive outcome, then this means that the region 16 framed by the sensor 4 on the substrate S is at least partially illuminated by the line currently switched on on the array 17. It should be noted that if the reader 1 is suitably designed, the subset 18*a* of light sources 18 of the array 17 to be switched on at any reading distance D within the depth of field DOF is of neglectable size with respect to the total size of the array 17, and usually the iteration with QUAD=0 is sufficient.

In a step 158 the aforementioned step b) is implemented, in other words a single light source 18 of the array 17, belonging to the line (row or column) currently switched on and selected such as to illuminate a point "seen" also by the sensor 4, is identified and switched on; preferably the starting light source is selected as the one that illuminates the middle point of the portion seen by the sensor 4 of the illuminated line on the substrate S. Step 158 can for example consist of identifying the photosensitive element 14 of the sensor 4 intermediate between those currently illuminated, and then carrying out a rapid sequential switching on of all of the light sources 18 of the row or column under examination, each time evaluating the output of such a photosensitive element 14.

After step 158, a cycle of operations is carried out that implement steps c), d), e) outlined above. In a step 159 four service variables for such a cycle are initialized: DIR=1, SENSOR_EDGE=FALSE and two positive integer values H, L, the significance of which will become clear hereinafter. The first variable indicates along which oriented direction on the array 17 the search of the light source 18 that illuminates a point the image of which is formed on one of the photosensitive elements 14 at one edge of the sensor 4 is being carried out. The variable DIR can for example go from 1, which is the column or row, respectively, along which step 152 or step 154, respectively has been successful, to the maximum number of directions along which the search is carried out, MAX_DIR. Every direction is rotated on the array 17 by an angle, constant or not, with respect to the previous one, and preferably it is rotated by 45° so as to obtain eight oriented directions, or by 30° so as to obtain twelve oriented directions. The second variable SENSOR_EDGE is a flag that indicates whether the light source 18 searched for (i.e. that illuminates a point whose image is formed onto one of the photosensitive elements 14 at an edge of the sensor 4), along the direction DIR, has been found.

At this point, in a step 160 another H sources of the array 17 are switched on in the oriented direction DIR. Then follows step 161 in which it is checked whether at least one of the photosensitive elements 14 of one of the edges of the sensor 4 is illuminated. In the negative case it is checked in a step 162 whether SENSOR_EDGE=TRUE; in the negative case, like in the first execution of step 162, step 160 is returned to, therefore "lengthening" the line switched on in the direction DIR by H sources.

When in step 161 it is found that at least one of the photosensitive elements 14 of one of the edges of the sensor 4 is illuminated, output YES, a step 165 is carried out in which the flag SENSOR_EDGE is brought to TRUE; in a subsequent step 166 the values H and L are decreased; and in a subsequent step 167 it is checked whether H=0 and L=0.

In the negative case, i.e. if the numbers L, H are still positive, step 168 follows in which the light sources 18 switched on in direction DIR are decreased by L, in other words L light sources 18 are switched off, from the extreme of the line along the oriented direction DIR opposite to the starting source. Then 161 is returned to, therefore evaluating whether the photosensitive element 14 of the edge of the sensor 4 is still illuminated. In the affirmative case steps 165-168 are repeated, therefore each time switching off an increasingly small number L of sources, i.e. shortening (but each time by less) the illuminated line in the direction DIR.

When the checking step 161 has a negative outcome, but it had previously had a positive outcome, the check of step 162 is positive since SENSOR_EDGE is TRUE; therefore a step 163 in which the values of the variable H and of the variable L are decreased, and a step 164 in which the flag SENSOR_EDGE is brought back to FALSE are carried out; thereafter execution of step 160 is returned to. In these conditions, indeed, the photosensitive element 14 on the edge of the sensor 4 had been illuminated but it no longer is, for which reason one starts over to "lengthen" the illuminated line in the direction DIR, to go back to illuminate towards the edge of the sensor 4, but lengthening by a smaller amount.

The aforementioned steps are repeated until the values H, L are both zero, positive outcome of step 167, which indicates that the light source 18 that illuminates a point whose image is formed on one of the photosensitive elements 14 at an edge of the sensor 4 has been identified. A value indicative of such a light source 18, typically its pair of row and column indexes, is stored in a step 169, together with the corresponding edge of the sensor 4, therefore implementing the aforementioned step d).

After step 169 a step 170 of checking whether the last search direction has been reached, namely whether DIR>MAX_DIR, is carried out; in the negative case in step 171 the flag SENSOR_EDGE is brought back to TRUE and the counter DIR is increased by 1, then in step 172 all of the light sources 18 currently switched on (along the line with the previous value of DIR) are switched off apart from the starting source, after which step 160 is returned to, repeating the entire cycle of searching the light source 18 that illuminates up a point whose image is formed on one of the photosensitive elements 14 on the same edge of the sensor 4 or on the adjacent one, and storing it together with the corresponding edge of the sensor 4.

In the case of a positive outcome of step 170, the repetition of step e) identified above has ended. Then one passes to the implementation of steps f) and g), respectively through a step 173 in which the straight lines that join up, on the array 17, the light sources 18 that illuminate points corresponding to photosensitive elements 14 of a same edge of the sensor 4, are found, through interpolation, and a step 174 in which such straight lines are connected, defining the vertexes of the perimeter of the light sources 18a to be switched on on the array 17.

The use of parameters L, H is not strictly necessary, but it allows the search of the light source 18 that illuminates the point corresponding to a photosensitive element 14 of an edge of the sensor 4 to be sped up. Preferably, the parameters L, H are initially set at a power of 2, and halved each time. Alternatively, they can be decreased each time by a constant number, in particular by 1.

Alternatively, the light sources 18 could be switched on one at a time along each direction DIR, until the one that illuminates the point corresponding to a photosensitive element 14 of an edge of the sensor 4 is directly identified.

The evaluation of whether and in what way the region 16 framed by the sensor 4 is illuminated, carried out in steps 121, 124, 152, 154 and 161, can be carried out through an automatic analysis of the image output by forming device 3 of the image capturing device 2.

This automatic evaluation can be sped up if, instead of basing it on the analysis of the entire output image, it is based on the analysis of portions of image, in particular in the case of a one-dimensional sensor 4 on the analysis of the edges of the image, and in the case of a two-dimensional sensor 4 on the analysis of the rows and columns that constitute the perimeter of the image, or upon the analysis of only the central column and/or row. This type of partial analysis exploits a well known possibility of image sensors, called ROI or Multi-ROI, which allows one or more regions of interest (ROI) to be defined, which is brought in output from the sensor 4 much more rapidly with respect to the reading of the entire frame. Alternatively or additionally, it is possible to evaluate an image captured at a lower resolution, i.e. analysing for example alternate photosensitive elements 14 only, of the entire sensor 4 or of one or more regions of interest.

The evaluation of whether and in what way the region 16 framed by the sensor 4 is illuminated, carried out in steps 121, 124, 152, 154 and 161, can also be carried out visually by the operator, should the image acquired by the sensor 4 be displayed on the output device 10. In this case the user will supply adequate feedback to the reading system 1, through the manual input device 11 of control signals and/or data, which will be used like the flag of the method of FIG. 18. Otherwise there can be two or more controls that allow the user to increase or decrease, respectively, the number of sources switched on (or off) starting from each edge of the array 17, thus carrying out analogous functions to those of blocks 126, 128, 129, 163, 166.

It must be noted that, in the case of run-time determining with adaptive method and automatic evaluation of the image, a further factor comes into play, namely the inclination of the substrate S with respect to the reception axis Z. When these are not perpendicular, the distances of the various points of the region framed 16 by the sensor 4 are within a range of distances about an average working distance D and, in this case, the adaptive method will give as a result the switching on of a different subset 18a of light sources of the array 17 from that in the case of a substrate S perpendicular to the reception axis Z; however, if the image capturing device 2 is correctly designed, there is never an occasion where all of the light sources 18 of an array 17 sized to have an emission angle $T_0$ equal to the required minimum emission angle are switched on at the same time.

An abbreviated form of the adaptive method can also be used to refine the selection of the subset 18a of light sources 18 determined with analytical method (for example the one described above), for example to correct imprecisions of the array 17 of light sources of each image capturing device 2 of a production batch. In this case, steps 123-131 or 160-169 are carried out only in the neighbourhood of the subset 18a calculated with analytical method, in other words starting from numbers p, H, L indicative of the boundary (indexes m, n) of such a subset 18a.

FIGS. 22-27 schematically illustrate some particularly advantageous embodiments of a device 2 for capturing images. For the sake of simplicity of presentation, all of the embodiments are described in a plane that is assumed to contain the illumination axis A and the reception axis Z, a or the main direction of the sensor 4, and a or the main direction of the array 17, believing that they are sufficiently descriptive of the more general case, including the case of a curved array (FIG. 6), in the light of the previous teachings.

According to the embodiment of FIG. 22, the image forming device 3 is according to one of the embodiments of FIGS. 11, 13 with receiver optics 5 coaxial with the sensor 4, or one of the embodiments of FIG. 14 or 16. The illumination device 6 is according to one of the embodiments of FIGS. 11, 13 with illumination optics 19a, 19c coaxial with the array 17, or one of the embodiments of FIG. 14 or 16. The reception axis Z is therefore perpendicular to the sensor 4 and the illumination axis A is therefore perpendicular to the array 17. The illumination axis A is parallel to, but does not coincide, with the reception axis Z. The array 17 and the sensor 4 can therefore be arranged coplanar, and advantageously on a same support, on a same integrated circuit board, or be made on a same integrated circuit substrate. It should be noted that in this case the illumination device 6 should be designed to have an overall solid emission angle—i.e. corresponding to the maximum illumination beam $T_0$—greater than the required minimum solid emission angle, and thus some light sources 18 of the array 17 are always switched off. In order to reduce such a drawback, the array 17 could also be arranged parallel, but not coplanar with the sensor 4. This embodiment has the advantage of being simple to design and assemble.

The illumination device 6 according to the embodiments of FIGS. 23-27 described hereinafter can, on the other hand, be designed to have a solid emission angle equal to the required minimum solid emission angle, so that no light source 18 of the array 17 is always switched off, and the array 17 is fully exploited.

According to the embodiment of FIG. 23, the image forming device 3 is according to one of the embodiments of FIGS. 11, 13 with receiver optics 5 coaxial with the sensor 4, or one of the embodiments of FIG. 14 or 16. The illumination device 6 is according to one of the embodiments of FIGS. 11, 13 with illumination optics 19a, 19c not coaxial with the array 17, or one of the embodiments of FIG. 15 or 17. The reception axis Z is therefore perpendicular to the sensor 4, while the illumination axis A is inclined with respect to the plane of the array 17 by an angle indicated here with $\theta_0$. The illumination axis A is inclined with respect to the reception axis Z by an equal angle $\theta=\theta_0$. The array 17 and the sensor 4 can therefore be arranged on parallel planes, in particular coplanar, with the advantages outlined above with reference to FIG. 22. It should be noted that if for the illumination device 6 the configuration of FIG. 17 is used, the illumination planes could, not very advantageously, be very inclined.

According to the embodiment of FIG. 24, the image forming device 3 is according to one of the embodiments of FIGS. 11, 13 with receiver optics 5 coaxial with the sensor 4, or one of the embodiments of FIG. 14 or 16. The illumination device 6 is according to one of the embodiments of FIGS. 11, 13, with illumination optics 19a, 19c coaxial with the array 17, or one of the embodiments of FIG. 14 or 16. The reception axis Z is therefore perpendicular to the sensor 4, and the illumination axis A is therefore perpendicular to the array 17. The sensor 4 and the array 17 are arranged on planes forming an angle $\theta_1$ between them, so that the illumination axis A is inclined with respect to the reception axis Z by an equal angle $\theta=\theta_1$.

Figure 25:
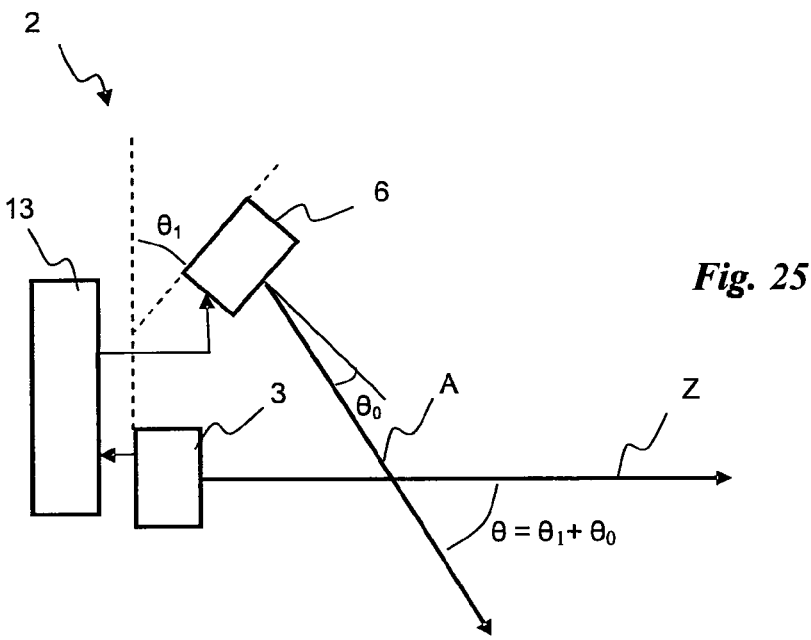

According to the embodiment of FIG. 25, the image forming device 3 is according to one of the embodiments of FIGS. 11, 13 with receiver optics 5 coaxial with the sensor 4, or one of the embodiments of FIG. 14 or 16. The illumination device 6 is according to one of the embodiments of FIGS. 11, 13 with illumination optics 19a, 19c not coaxial with the array 17, or one of the embodiments of FIG. 15 or 17. The reception axis Z is therefore perpendicular to the sensor 4, while the illumination axis A is inclined with respect to the plane of the array 17 by an angle indicated here with $\theta_0$. The sensor 4 and the array 17 are arranged on planes forming an angle $\theta_1$ between them, so that the illumination axis A is inclined with respect to the reception axis Z by an angle $\theta=\theta_1+\theta_0$. This embodiment allows small absolute values of the angles $\theta_1$ and $\theta_0$, and therefore a small size of the image capturing device 2, to be maintained, still obtaining a large angle $\theta$ and a greater design flexibility by having two parameters on which to act. This embodiment is particularly useful when the depth of field DOF is concentrated in an area close to the reader 1.

Figure 26:
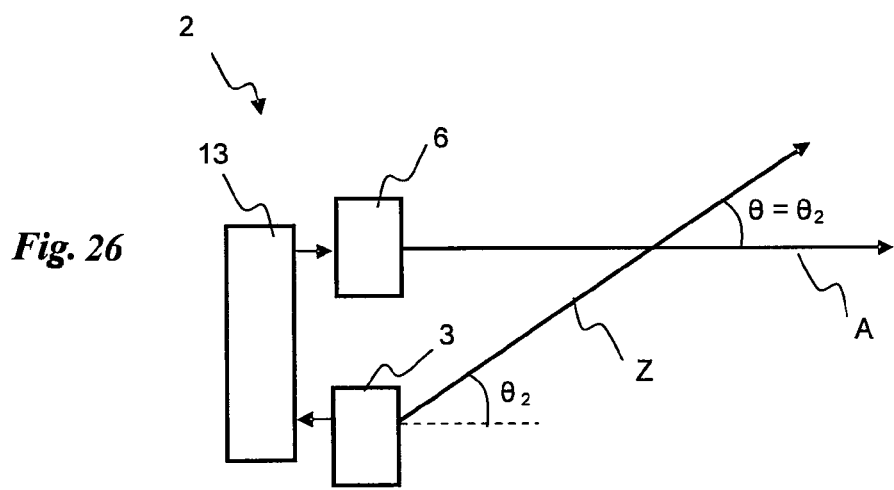

According to the embodiment of FIG. 26, the image forming device 3 is according to the embodiment of FIG. 17. The illumination device 6 is according to one of the embodiments of FIGS. 11, 13 with illumination optics 19a, 19c coaxial with the array 17, or one of the embodiments of FIG. 14 or 16. The illumination axis A is therefore perpendicular to the array 17, while the reception axis Z is inclined with respect to the plane of the sensor 4 by an angle indicated here with $\theta_2$, so that the illumination axis A is inclined with respect to the reception axis Z by an equal angle $\theta=\theta_2$. The array 17 and the sensor 4 can therefore be arranged on parallel planes, in particular coplanar, with the advantages outlined above with reference to FIG. 22.

Figure 27:
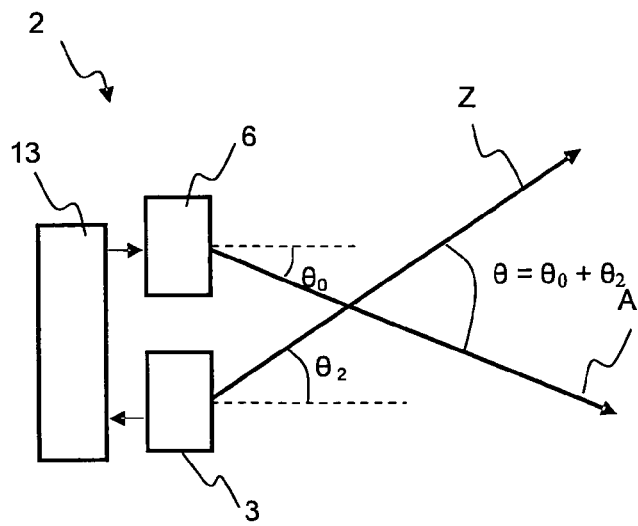

According to the embodiment of FIG. 27, the image forming device 3 is according to the embodiment of FIG. 17. The illumination device 6 is according to one of the embodiments of FIGS. 11, 13 with illumination optics 19a, 19c not coaxial with the array 17, or one of the embodiments of FIG. 15 or 17. The illumination axis A is therefore inclined with respect to the plane of the array 17 by an angle indicated here with $\theta_0$, and the reception axis Z is inclined with respect to the plane of the sensor 4 by an angle indicated here with $\theta_2$. The array 17 and the sensor 4 can therefore be arranged on parallel planes, in particular coplanar, with the advantages outlined above with reference to FIG. 22, and the illumination axis A is inclined with respect to the reception axis Z by an angle $\theta=\theta_0+\theta_2$. This embodiment also allows small absolute values of the angles $\theta_0$ and $\theta_2$, and therefore a small size of the image capturing device 2, to be maintained, still obtaining a large angle $\theta$ and a greater design flexibility by having two parameter on which to act.

The common, non-inverting illumination optics 19a of the embodiments of FIGS. 13 and 16 can also be arranged with its axis inclined with respect to the array 17, analogously to what has been described with reference to FIG. 17. Such an illumination device 6 can advantageously be used in the embodiments of the image capturing device of FIGS. 23, 25, 27.

Moreover, the provisions of FIGS. 11 and 17 can be combined, by arranging the inverting illumination optics 19a inclined and offset with respect to the array 17, to obtain angles of inclination $\theta_0$ between the illumination axis A and the normal to the plane of the array 17 of a large value, with a smaller increase in the overall size of the image capturing device 2, particularly useful when the depth of field DOF is concentrated in an area close to the reader.

Figure 28:
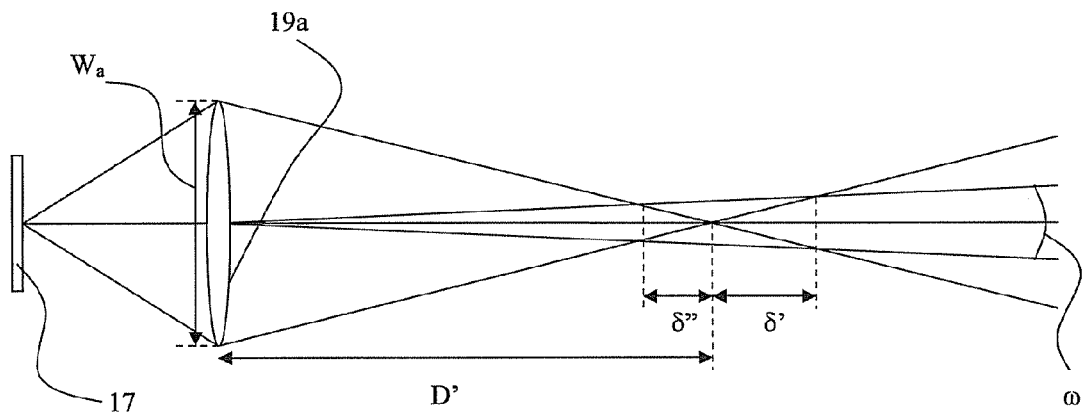
FIG. 28 is a representation of the geometry of an embodiment of the illumination device of the image capturing device.

With reference to FIG. 28, which refers to the illumination device 6 of the embodiment of FIG. 11, when the array 17 is positioned in the object plane of an inverting-type projection lens 19a, through a suitable selection of the f-number of the projection lens 19a it is possible to keep the illumination beam emitted by the array 17 of light sources 18 focused for a suitable range of distances in front of the illumination device 6. Such a range of distances should correspond at least to the depth of field DOF of the sensor 4 of the image capturing device 2.

Such a range of distances, known in literature as image side depth of focus, (W. J. Smith, "Modern Optical engineering," 3rd ed., ed. McGraw Hill 2000, chap. 6.8), is different according to whether measurement is taken, from the distance D' at which the projection lens 19a is focused, going away from the projection lens 19a ($\delta'$) or going towards the projection lens 19a ($\delta''$). However, for large values of the distance D', this difference can be neglected assuming $\delta'=\delta''$, and the range of distances is approximately equal to $\delta'=D'^2*\kappa/W_a=D'K'/W_a$, where K' is the maximum design magnification for the image $22_m$ of each light source 18 on the substrate S, in mm, K is the same amount expressed in angular blur (K'=D'*tgK), and $W_a$ is the aperture of the projection lens 19a. For small angles, like in the cases examined here, $\kappa \approx \omega_m$ or $\kappa \approx \omega'_m$, where the angles $\omega_m$ $\omega'_m$ are indicated in FIGS. 14-16.

The higher the working f/number (D'/$W_a$) of the projection optics 19a and the focal distance (D'), the greater the image side depth of focus 6", 6'. Assuming for example to focus the illumination beam T, having an emission angle of ±25°, at a distance D'=350 mm from the projection lens 19a, and accepting an angular blur K equal to about 2.5% of the size of the illuminated area, i.e. $\kappa$=1.25°, a working f-number of 35 is sufficient to have an image side depth of focus $\delta' \approx \delta''$=267 mm, i.e. to keep the image projected by the array 17 on the substrate S focused for the entire depth of field DOF of the image forming device 3, if DOF=2$\delta'$.

By selecting the aperture $W_a$ of the projection lens 19a between 5 and 20 mm, preferably between 6 and 12 mm, and the focal distance D' of the illumination device 6 between 100 and 350 mm, it is possible to obtain an image side depth of focus $\delta'$ having typical values for the application, in other words typical values of the depth of field DOF and of the minimum reading distance $D_1$ and of the maximum reading distance $D_2$ of the image forming device 2.

Thus, provided that the projections optics 19a is suitably selected, it is possible to obtain an image projected by the illumination device 6, which is the projection of the array 17 of light sources 18, having clean edges at every working distance D.

Similar considerations apply to the illumination devices of the embodiments of FIGS. 13-17.

In the embodiments of the illumination device 6 of FIGS. 11, 13, 16, 17, the illumination optics 19a or 19c preferably comprises a collimation lens, having for example a constant angular magnification law $AMAG_a$, preferably with angular magnification ratio 0.7. The illumination optics 19a, 19c preferably has a fixed focal length.

As a specific example, let us consider the configuration of FIG. 24, with the illumination device of FIG. 11, with a one-dimensional array 17 lying in the plane Z, Y (plane of FIG. 24) and having a plurality $m_{tot}$=52 of light sources 18 arranged along axis Y and spaced apart from one another by M=100 µm, for an overall length of 52*100 µm=5.2 mm. Let us assume that the angle of inclination $\theta_1$ between the illumination axis A and the reception axis Z is $\theta_1$=14°, so that cos $\alpha_1$=1.000, cos $\alpha_2$=0.000, cos $\alpha_3$=0.000, cos $\alpha_4$=0.000, cos $\alpha_5$=0.970, cos $\alpha_6$=−0.242, cos $\alpha_7$=0.000, cos $\alpha_8$=0.242, cos $\alpha_9$=0.970. The illumination vertex $A_0$ is at a distance $y_0$ from the reception vertex O within the range between 0 and 20 mm, for example $y_0$=−10 mm, and is displaced forward along the axis Z by 10 mm, and therefore has coordinates $A_0$(0,−10,10). Let us also assume that the image capturing device 3, with one-dimensional sensor 4 lying along axis X and centred around the origin O, has a constant and symmetrical field of view around the axis Z, defined between $\beta_1$=+20° and $\beta_3$=−20° (typically the field of view $\beta_1$=$\beta_3$ is between 10° and 30°). Let us also assume that the depth of field DOF of the sensor 4 is comprised between a minimum working distance $D_1$=30 mm and a maximum working distance $D_2$=500 mm, such that the depth of field is DOF=470 mm. Let us then assume that the illumination optics 19a has a constant angular magnification law, with magnification ratio $AMAG_a$=0.7, and that the array 17 is arranged at a distance t=−6 mm from the illumination optics 19a. Applying the formulae (1) to (15), at every distance D the minimum index $m_1$ and the maximum index $m_2$ of the extreme light sources 18 to be switched on the array 17 to exactly cover the line framed by the sensor 4 at that distance are obtained. The progression of such indexes is shown in Table I below, for working distances D sampled with steps of 30 mm, 20 mm for the last step.

TABLE I

| D | $m_1$ | $m_2$ |
|---|---|---|
| 30 | −25 | 12 |
| 60 | −14 | 21 |
| 90 | −10 | 23 |
| 120 | −9 | 24 |
| 150 | −8 | 24 |
| 180 | −7 | 25 |
| 210 | −7 | 25 |
| 240 | −7 | 25 |
| 270 | −6 | 25 |
| 300 | −6 | 25 |
| 330 | −6 | 26 |
| 360 | −6 | 26 |
| 390 | −6 | 26 |
| 420 | −6 | 26 |
| 450 | −6 | 26 |
| 480 | −5 | 26 |
| 500 | −5 | 26 |

Figure 29:
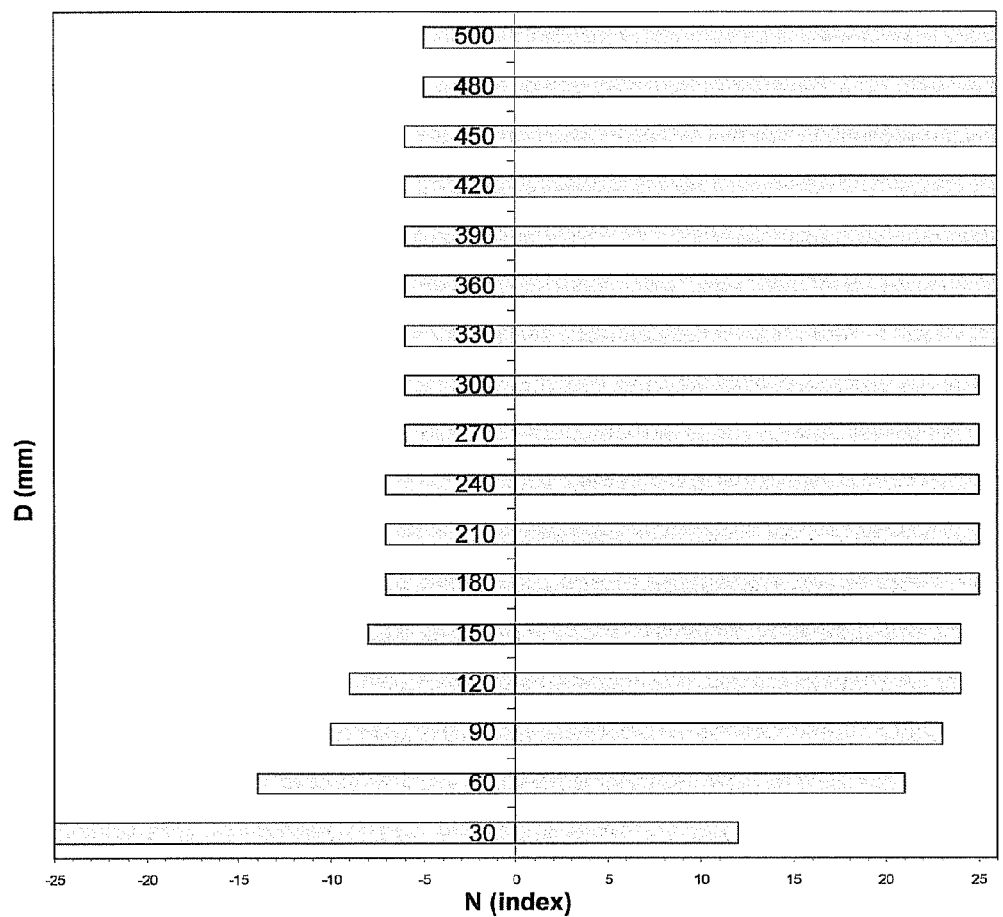
FIG. 29 illustrates the light sources of the image capturing device of an embodiment to be switched on to illuminate the entire region framed by the sensor at various working distances, FIGS. 30 to 37 schematically illustrate further functions of the illumination device of the image capturing device, FIGS. 38 and 39 schematically illustrate other embodiments of the image capturing device.

FIG. 29 provides a visual representation of the subset 18a of light sources 18 to be switched on in the array 17, indicated as a continuous strip that goes from the minimum index to the maximum one.

From the qualitative point of view, from the examination of Table I and of FIG. 29 it is manifest that, the field of view $\beta_1$, $\beta_3$ or angular target being equal, at working distances D close to the maximum distance $D_2$ there are no appreciably large changes in the position of the first and last light source 18a to be switched on in the array 17, in other words the extreme indexes $m_1$ and $m_2$ change slowly, while from close by, at working distances close to the minimum distance $D_1$, the position of the first and last light source 18a to be switched on in the array 17 undergoes a greater variation, in other words the indexes $m_1$ and $m_2$ change faster.

It should be noted that at no working distance D are all of the light sources 18 of the array 17 switched on, rather at every working distance D a certain number of light sources 18 starting from at least one edge of the array 17 are switched off. Moreover, the first and last light source 18 are, switched on at the minimum and maximum working distance $D_1$, $D_2$, respectively. As described above, this optimal condition can be obtained with any of the embodiments of FIGS. 23-27 if the solid emission angle of the illumination device 6 (subtended by the maximum illumination beam $T_0$) is equal to the required minimum solid emission angle. It is however possible to use the configuration of FIG. 22, simply in this case some light sources 18 of the array 17 will always be switched off at all working distances D.

From FIG. 29 and/or from a representation thereof in the form of a look-up table, similar to Table I but generally extending to the case of a two-dimensional array 17, and/or applying the methods described above, the indexes $m_j, n_i$ of the extreme light sources 18 to be switched on in the array 17 are therefore obtained, thus implementing the step 101 of determining the subset 18a of light sources 18 of the array 17 to be switched on at each working distance D within the depth of field DOF of the sensor 4 to illuminate the entire region 16 framed by the sensor 4 on the substrate S.

If the determining of the subset 18a of light sources 18 of the array 17 to be switched on to illuminate the entire region 16 framed by the sensor 4 takes place with analytical method, both run-time (FIG. 7) and one-off (FIG. 8), the driver 13 must know the reading distance D.

Such information can be provided by a suitable measurer of the reading distance, which can be part of the reading system 1 shown in FIG. 2 or be in communication therewith through the communication interface 9. Such a measurer of the reading distance D can be made in different per sé well known ways, for example through a device based on a system of photocells, a device based on the measurement of the phase or of the time of flight of a laser or LED, visible or IR, beam or of the radar or ultrasound type, etc.

The intrinsic flexibility of the array 17 of individually drivable light sources 18 of the illumination device 6 offers however the possibility of illuminating, on the substrate S, a luminous figure of variable shape, size and/or position in the region 16 framed by the sensor 4 as a function of the reading distance D, as well as possibly at variable wavelength(s), which allows the reading distance D to be measured or estimated, as well as the presence of a substrate S to be detected, and possibly the focal condition of the image forming device 3 to be measured or estimated.

By acquiring, through the image capturing device 3, an image of the substrate S (partially) illuminated by the luminous figure, it is therefore possible to evaluate or even precisely measure the distance at which the substrate S is placed, namely the reading distance D. Alternatively, the estimate or measurement of the reading distance D is carried out by the user, and suitably provided to the driver 13 through the manual control and/or data input device 11.

For example, with reference to FIGS. 30 and 31, wherein the image capturing device 2 is, by way of an example, according to the embodiment of FIG. 23, the driver 13 can drive the array 17 to switch on a subset 18b of light sources 18 such as to intentionally illuminate only a portion of the region 16 framed by the sensor 4, for example the set of sources 18b that emits within a certain predetermined emission angle cp. As the reading distance D changes, due to the parallax error (which in this case is not corrected, rather intentionally exploited for this purpose) between the illumination device 6 and the image forming device 3, the size and the position of the boundary of the luminous FIG. 23 illuminated on the substrate S change within the image captured by the sensor 4. In the depicted case, the luminous FIG. 23 projected is a rectangle that starts from an edge of the region 16 framed by the sensor 4 and increasingly widens towards its opposite edge as the reading distance D increases. Analogously, a strip can be projected that moves—possibly widening—or a cross in the case of a two-dimensional array 17. If the substrate S is absent or outside the depth of field DOF, the luminous FIG. 23 does not fall or only partially falls within the region 16 framed by the sensor S, or it has an excessive blur, so that a function of detecting the presence of the substrate S is also obtained.

In an alternative embodiment, the driver 13 can drive the array 17 to switch on a configuration 18b of light sources 18 such as to project a pair of inclined bars, which, by changing position on the substrate S according to the reading distance D, form a luminous figure that continuously changes among two separate bars, a V, an X, an inverted V and two separate bars with opposite inclination to the initial one, as described for example in the aforementioned EP1466292B1. The X shape can advantageously be associated with the optimal focal distance of the image forming device 3. In another embodiment, the driver 13 can drive the array 17 to switch on a configuration 18b of light sources 18 such as to project a pair of crosses, which, by changing position on the substrate S according to the reading distance D, form a luminous figure that continuously changes among two distinct crosses, and possibly differently inclined to each other, and a single cross at the working distance D at which they overlap, which can advantageously be associated with the optimal focal distance of the image forming device 3, as described for example in the aforementioned U.S. Pat. No. 5,949,057. The estimate or measurement of the working distance D can also exploit the fact that the luminous FIG. 23 projected onto the substrate S progressively loses definition, in other words it blurs, moving away from the optimal focal distance of the image forming device 3, as discussed above with reference to FIG. 28. These embodiments, and other analogous ones, therefore also allow a function of estimating or evaluating the focal condition, and/or of its visual information to the user, in the case of illumination in the visible range, to be implemented with the image capturing device 2. In the case for example of projection of two oblique bars, the luminous figure is also advantageously indicative to the user of the direction in which to mutually displace the image capturing device 2 and the substrate S in order to achieve the focused condition.

Figure 34:
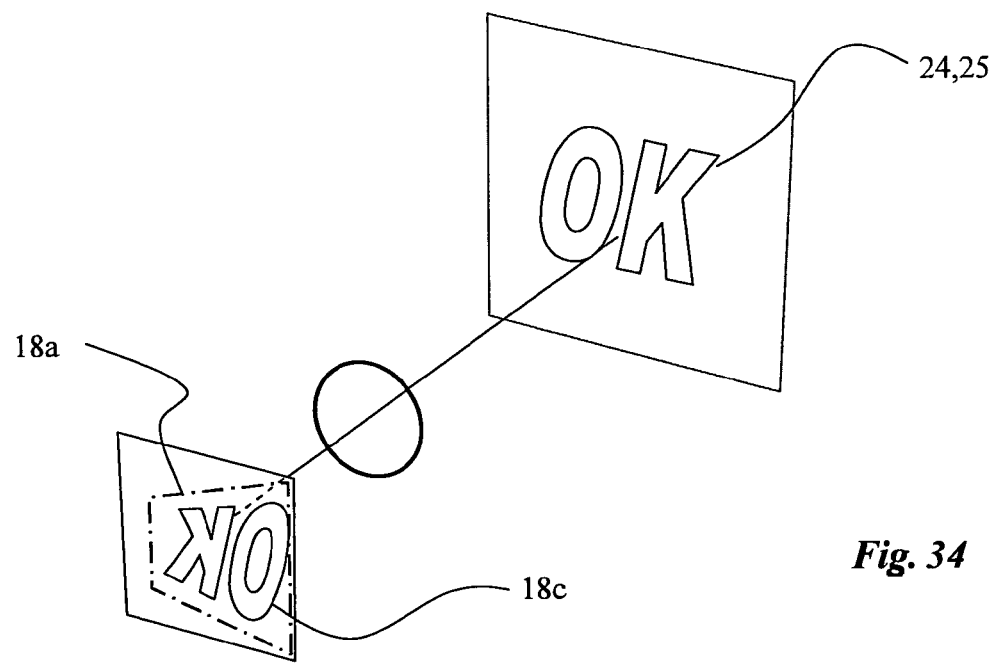

Alternatively or additionally, after the measurement or automatic estimate of the working distance D, or based on the information received from a device external to the image capturing device 2, the driver 13 can drive the array 17 to switch on a configuration 18c of light sources 18 such as to project onto the substrate S, at the distance D, a luminous FIG. 24 in the visible spectrum, and that is straightforward to understand, for example the words "TOO FAR", "TOO CLOSE", possibly accompanied by a blurred condition thereof, made through a suitable matching of the focal distances of the array 17 and of the reception device 3, so as to further convey the intended meaning, and possibly the word "OK" in focused condition, as schematically illustrated in FIGS. 32-34.

It should be noted that while the configurations 18b described above are switched on by the driver 13 before having determined the subset 18a of light sources 18 that illuminate the entire region 16 framed by the sensor 4 on the substrate S, the configuration 18c now described can be switched on by the driver 13 after having determined the subset 18a of light sources 18 that illuminate the entire region 16 framed by the sensor 4 on the substrate S, and therefore it can advantageously be centred with respect to such a subset 18a, as shown in FIG. 34.

The intrinsic flexibility of the array 17 of individually drivable light sources 18 of the illumination device 6 also offers the possibility of implementing an outcome indication device. In such an operating mode, the driver 13 drives the array 17 to switch on a configuration of light sources 18 such as to illuminate, on the substrate S, a luminous FIG. 25 indicative of the positive or negative outcome, and possibly of the reasons for a negative outcome, of an attempt at capturing an image and/or decoding the optical information C, for example an "OK" as already shown by the configuration 18c of light sources 18 in FIG. 34, or a "NO" made in an analogous way. As an alternative or in addition to such changes in shape of the luminous FIG. 25 for indicating outcome, changes in size, colour and/or position of the luminous figure can be used, for example any green coloured luminous figure will indicate a positive outcome, while a red coloured luminous figure will indicate a negative outcome. Also in this case the configuration 18c is preferably centred with respect to the subset 18a.

The intrinsic flexibility of the array 17 of individually drivable light sources 18 of the illumination device 6 also offers the possibility of implementing an aiming device.

Figure 35:
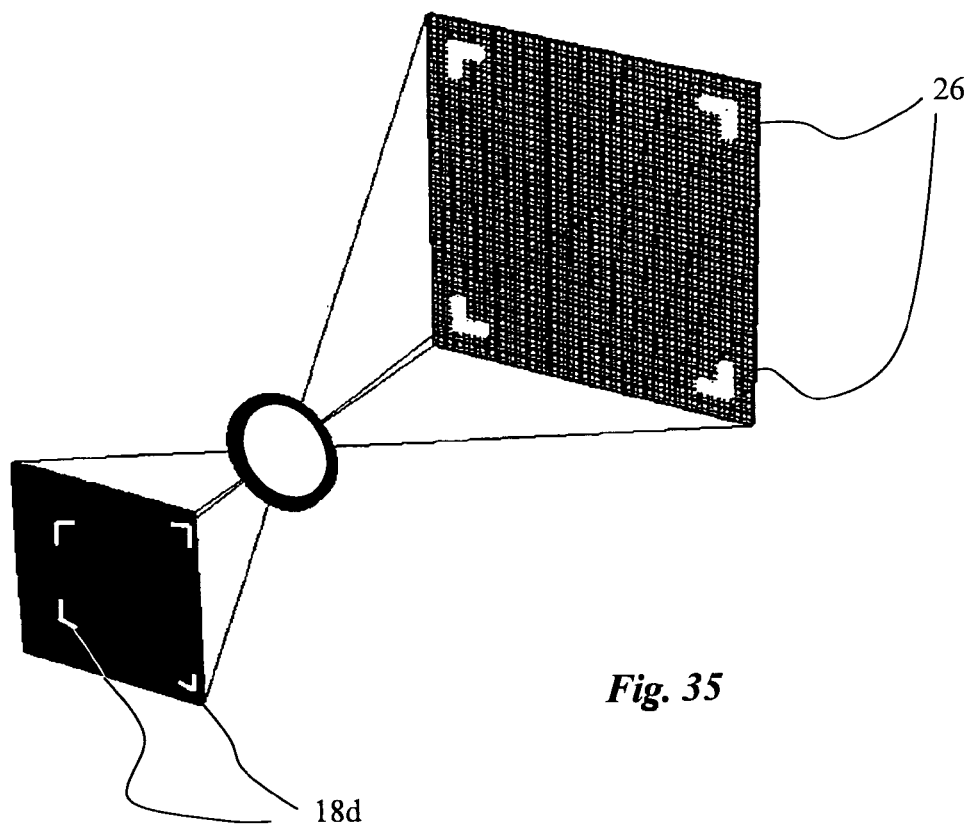

Thus, for example, in order to supply an image for aiming at the entire region 16 framed by the sensor 4, which aids the operator to position the reader with respect to the optical information C by displaying on the substrate S a visual indication of the region 16 framed by the sensor 4, the driver 13, once the subset 18a of light sources to be switched on to illuminate the entire region 16 framed by the sensor 4 has been defined, can drive the array 17 to switch on one or a certain number of light sources 18d at the edges of such a subset 18a or near to them, so as to illuminate the boundary of the region 16 framed by the sensor 4, or one or more sections thereof, like for example the corners in the case of a two-dimensional sensor 4, as schematically shown by the luminous aiming FIG. 26 in FIG. 35. Alternatively or additionally, the driver 13 will take care of illuminating one or a certain number of light sources 18 at intermediate sections of the four sides of the rectangle or quadrilateral defined by the subset 18a, and/or a certain number of light sources arranged as a cross at the centre of the rectangle or quadrilateral defined by the subset 18a.

There are also various applications in which it may be advantageous for the image capturing device 2 to only capture one or more regions of interest ROI within the region 16 framed by the sensor 4. The provision of the plurality of individually drivable light sources 18 of the array 17 allows a corresponding partial illumination and/or the aiming of such regions of interest ROI to be easily obtained. In this case the driver 13 drives the array 17 of the illumination device 6 to switch on only one or more configurations 18e (not shown) of sources 18 of the subset 18a, determined according to one of the methods outlined above, each sized and positioned with respect to the subset 18a in a way corresponding to how the associated region of interest ROI is sized and positioned with respect to the entire region 16 framed by the sensor 4 on the substrate S.

A first application consists of configuring a reader 1 having a two-dimensional sensor 4 as a linear reader. In order to increase the frame rate and the reading promptness, it is possible and per se known to reduce the number of active lines of the sensor 4 to a few only (down to one); in this situation the region of interest ROI is a thin rectangular area, down to a line, ideally arranged at the centre of the vertical field of view $\beta_2$, $\beta_4$ or horizontal field of view $\beta_1$, $\beta_3$, respectively. The configuration 18e of light sources 18 switched on by the driver 13 thus comprises the or some intermediate sources of the subset 18a in one direction and all of the sources of the subset 18a in the perpendicular direction, so as to project onto the substrate S a thin strip of light at the region of interest ROI.

Figure 36:
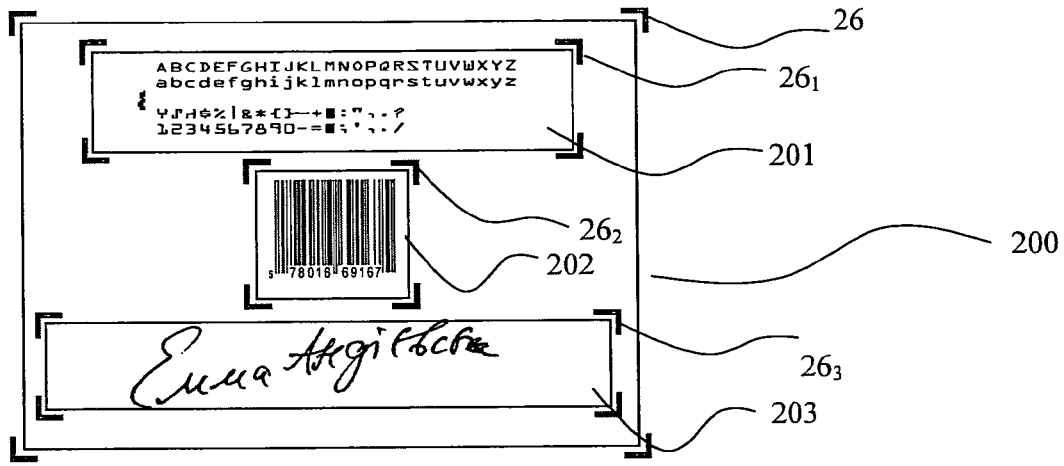

A second application is the processing of the image of documents in standardised format, or forms. As an example, FIG. 36 illustrates a document or form 200 comprising different types of information to be processed, in particular:
- an area 201 comprising encoded information in OCR (optical character recognition) format, in other words writing done in characters able to be recognised by a suitable software;
- an area 202 comprising one or more optical, linear and/or two-dimensional codes;
- an area 203 comprising other encoded information in graphical form, such as hand-written text, signatures, trademarks or logos, stamps or images.

Through suitable processing of a first image captured by the sensor 4, or of a part thereof, possibly in low resolution, it is possible, in a per se well known way, to locate the position of such areas 201-203 within the region 16 framed by the sensor 4, which for the sake of simplicity of presentation is assumed to coincide with the entire document 200. In the case in which the region 16 framed by the sensor 4 extends beyond the entire document 200, this can be considered a further region of interest.

Once one or more of such areas 200-203 has/have been located, the driver 13 can drive the array 17 to switch on only the light sources 18 that illuminate, in a manner analogous to what has been described with reference to FIG. 35, the centres and/or the boundary, at least in part, of the located area(s) 200-203, to act as an aid for aiming and/or for the interactive selection of the located areas to be actually processed, as shown by the aiming luminous figures $26, 26_1, 26_2, 26_3$, in FIG. 36.

The interactive selection by the user can take place for example through presentation of the different areas 201-203, and possibly of the entire region 16 framed by the sensor 4, with different numbers associated, also projected by the illumination device 6 itself, near to or at the aiming luminous figures $26, 26_1, 26_2, 26_3$, of the located areas 200-203, or through presentation of the different aiming luminous figures $26, 26_1, 26_2, 26_3$, with different colours, in the case in which the light sources 18 are suitable for emitting, individually or as a whole, according to at least two different wavelengths in the visible field. Each number or colour can for example have a different button of the manual input device 11 of the reader 1 associated with it, or there can be one or two buttons for cyclically selecting among the different areas 200-203, the selection becoming final after a certain time, or by pressing a further button, or in another suitable way. The area 200-203 selected on each occasion can be highlighted for example through greater illumination, intermittent illumination or similar, or every time the selection button is pressed a single area 201-203 can be illuminated at a time.

Figure 37:
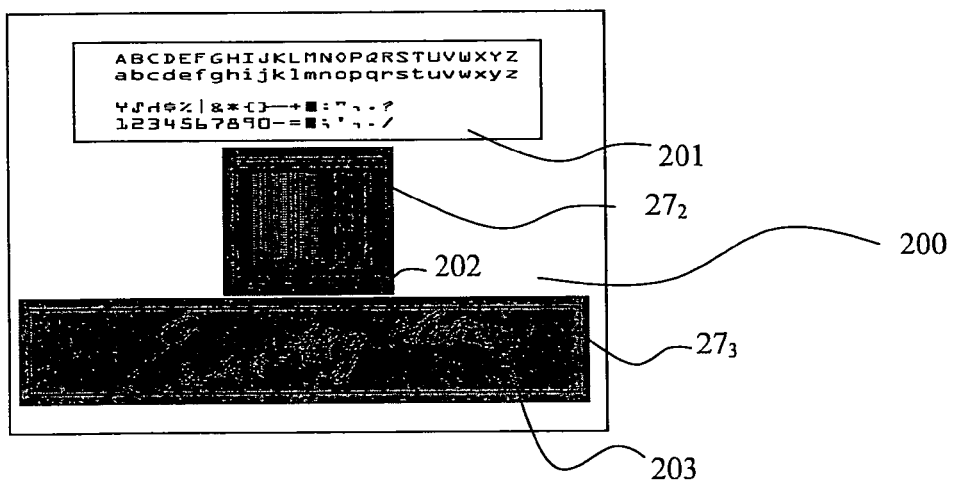

For the same purpose of interactive selection, or in a subsequent step to the selection by the user of one or more of the located areas 200-203, the driver 13 can drive the array 17 to switch on a configuration 18e comprising only the light sources 18 that illuminate the located area(s) 200-203, to provide an optimised illumination for the purposes of capturing the image of such areas, as shown for example by the luminous regions $27_2, 27_3$ in FIG. 37.

In the case of a reader 1 used with standardised documents or forms, the size and positions of the aiming figures 26, $26_i$ and/or partial illumination figures. 27, $27_i$ within a region 16 framed by the sensor 4 corresponding to the entire form 200 can be preset in the reader 1 in a configuration step instead of being located run-time.

As a further application, in the case of an unattended reader 1, for example for reading optical codes C carried by objects in relative movement with respect to the reader 1, for example on a conveyor belt, the driver 13 can drive the array 17 to switch on a configuration 18f comprising only the light sources 18 that illuminate the area where the optical code C has been located.

Also for the aiming and/or the selection of regions of interest and/or of the entire region 16 framed on the substrate S, instead of the illumination of their centres and/or boundaries, at least in part, these can be totally illuminated (FIG. 37).

Figure 38:
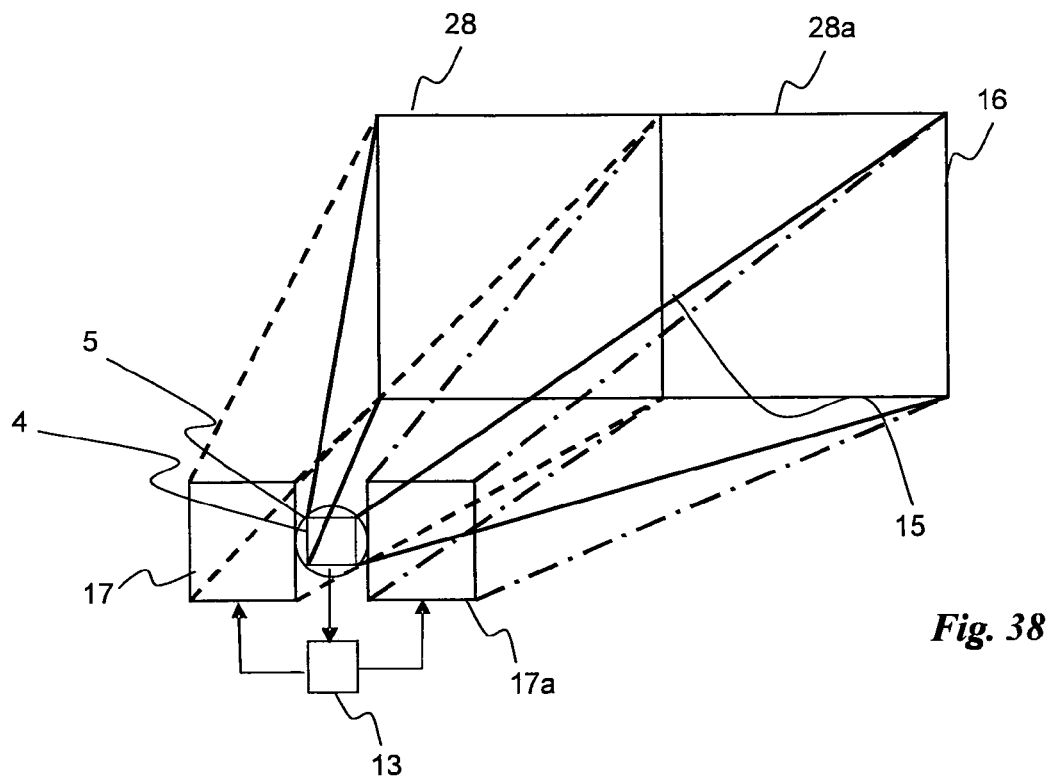

In a further embodiment, shown in FIG. 38, two arrays 17, 17a of individually drivable light sources 18 can be arranged on opposite sides of the sensor 4 of the image forming device 3. The two arrays 17, 17a can be driven by the driver 13 so as to each illuminate at most one respective half 28, 28a of the region 16 framed by the sensor 4. In this case it is possible to more easily illuminate a large region 16 framed by the sensor 4.

Figure 39:
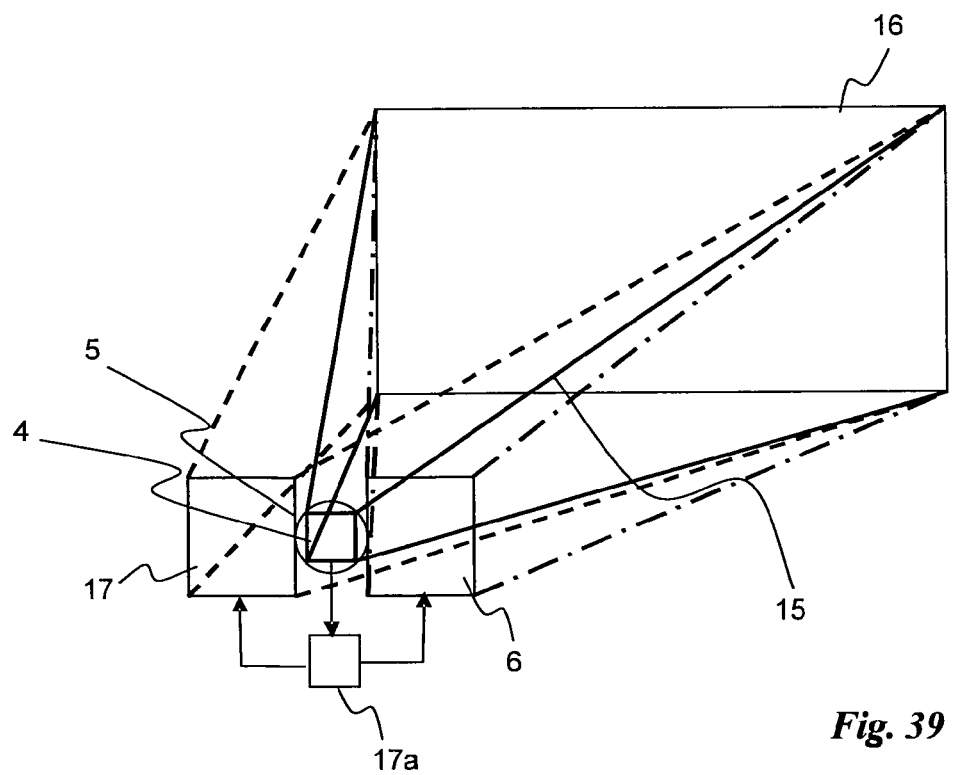

Alternatively, the two arrays 17, 17a can be driven by the driver 13 in a symmetrical manner, with respect to the reception axis Z, so as to double the radiant flux density in the entire region 16 framed by the sensor 4, or in one or more region of interest thereof, by overlapping the emissions of the two arrays 17, 17a, as shown in FIG. 39. A more uniform illumination of the region 16 framed by the sensor 4 on the substrate S is also automatically obtained, since the light sources 18 of the array 17 that illuminate less because they are farther from the substrate S correspond to light sources 18 of the array 17a that illuminate more because they are closer to the substrate S, and vice-versa.

In FIGS. 38 and 39 it is assumed that a non-inverting illumination optics is used at both arrays 17, 17a, for example comprising individual lenses 19b, and non-inverting illumination optics is used at the sensor 4, but it should be understood that all of the configurations described above can be used.

Similarly, in a further embodiment (not shown) four arrays 17 of individually drivable light sources 18 can be provided, arranged at the four sides of a rectangular sensor 4, or in particular a square one, of the image forming device 3.

In the various auxiliary functions described above, the illumination device 6 can be caused to work at a low "resolution", in other words in the subsets 18a, 18b, 18c, 18d, 18e, 18f respectively, only alternate light sources 18 can be switched on, or alternate groups of one or more light sources 18 can be switched on and off, so as to consume less energy. Alternatively or additionally, the image forming device 3 can operate at a low resolution, by analysing only some of the photosensitive elements 14, for example only alternate photosensitive elements 14 or groups of photosensitive elements 14, of the entire sensor 4 or of one or more regions of interest, in other words the reader 1 can implement a suitable algorithm for evaluating at least one first sample image with low resolution.

Those skilled in the art will easily understand how to apply the concepts and methods outlined above, in particular the correlation, expressed by the formulae discussed above, between any point P in the working space region 15 of the sensor 4, and the light source(s) 18 of each array 17, 17a to be switched on to illuminate such a point, in order to precisely define the criteria that the driver 13 follows for the selection of which light sources 18 of the array 17, 17a to switch on, and optionally with what intensity and/or wavelength(s) of emission, to implement the various embodiments and/or the various additional functions to that of illuminating the region 16 framed by the sensor 4, described above with reference to FIGS. 30-37.

Those skilled in the art will understand that, in the various embodiments described, the number of light sources 18 of the array 17, 17a and/or their density can be selected considering different factors, including: the depth of field DOF of the image forming device 3, the size and resolution of the sensor 4, the cost, the calculation capacity of the driver 13 or of the processer that builds the look-up table.

It has been found that a suitable number of light sources 18, in the two-dimensional case, is at least 32×32, preferably 64×64 or more, or, in the case of a sensor 4 having shape factor 4:3, 44×32, preferably, 86×64 or more. Similarly, in the one-dimensional case, a suitable number of individually addressable light sources 18 is 32 or 64 or more.

The image capturing device 2 described above, and in particular its illumination device 6, therefore has substantial advantages.

A first advantage consists of avoiding any parallax and perspective distortion error between the field of view of the image capturing device 3 and the illumination field of the illumination device 6, although they are not coaxial. This allows energy to be saved since it is not necessary for the illuminated region to extend beyond the region 16 framed by the sensor 4 to take the parallax error into account.

The intrinsic flexibility of the array 17 of individually drivable light sources 18 also offers the possibility of very easily changing the region illuminated on the substrate S, without any moving part (apart from the embodiment with micromirrors), rather by simply switching on—as described above—all and only the light sources 18 necessary for the illumination of the entire region 16 framed by the sensor 4 on the substrate S, in other words those of the subset 18a, or by switching on only a part of such light sources 18 of the subset 18a for the various purposes described above. In other words, the provision of the array 17 of individually drivable light sources 18 allows the illumination device 6 of the invention to be used to carry out one or more other different functions, which according to the prior art are typically implemented by distinct devices, therefore reducing the costs and the bulk of the reader 1.

The incorporation of one or more of the aforementioned auxiliary functions into a single image capturing device 2 for is innovative and represents in itself an inventive aspect, even in the case in which the illumination axis A and the reception axis Z coincide.

A variant to making an array 17 of light sources 18 on a substrate consists of an array 17 of light sources 18 having an aperture at its centre such as to allow its concentric arrangement with the image forming device 3. This solution, which falls outside the scope of claim 1, has the advantage of implementing a symmetrical arrangement with respect to the optical reception axis Z, at the expense of making a perforated support, which is not standard and complicates the design of the driver 13.

Similarly to the use of a zoom and/or autofocus system, the maximum illumination beam $T_0$ of the illumination device 6 can also be made dynamically variable in size and/or in proportions through well known zoom and/or autofocus systems, such as electromechanical, piezoelectric or electro-optical actuators for moving one or more lenses of the illumination optics, and/or for changing the curvature of one or more lenses of the illumination optics, for example through the use of liquid lenses or deformable lenses, and/or for moving the array 17.

A further solution, which falls outside the scope of claim 1, consists of making an illumination device through a plurality of relatively few segments of OLEDs, in particular through irregular segments of such a shape as to be able to be put together to form a certain number of partially overlapping quadrangular figures, for example three. Based on the reading distance, the irregular segments that make up the figure that has the least parallax error with respect to the image capturing device 3 are switched on. There can also be one or more series of rectangular and/or angular segments arranged to form one or more concentric rectangles around the irregular segments, that can be illuminated to provide an aiming figure.

The illumination optics 19a, 19b, 19c could be absent in the case of light sources 18 that are sufficiently collimated and emit according to suitable directions, for example in the case of an array 17 arranged along a curved surface (FIG. 6).

In the case of an array 17 arranged along a curved surface (FIG. 6), all of the references to the plane of the array 17 apply to the plane locally tangent to the array 17.

What is claimed is:

1. An imager type image capturing device, comprising:
   an image forming device including a sensor including a one-dimensional or two-dimensional array of photosensitive elements, and defining an optical reception axis, at leastone reading distance, and a region framed by the sensor on a substrate at said at least one reading distance,
   an illumination device including an array of adjacent light sources, defining an optical illumination axis,
   wherein:
   the light sources are individually drivable and each light source is adapted to illuminate an area of a size much smaller than the size of said region framed by the sensor,
   the optical illumination axis does not coincide with the optical reception axis,
   a driver of the light sources is adapted to drive the light sources so as to switch off at least the lien sources that illuminate outside of the boundary of the region framed by the sensor on the substrate at said at least one reading distance,
   the driver is adapted to run-time determine which light sources of the array to switch on or off, respectivelv, as a function at least of the reading distance, and
   the driver is adapted to carry out the run-time determining in a recursive manner, wherein the driver is adapted to switch on a subset of light sources, evaluate at least one of the position and the extent of the area illuminated on the substrate with respect to the region framed by the sensor, and adapt the subset of light sources based on the evaluation.

2. The device according to claim 1, wherein each individually drivable light source comprises a single illuminating element.

3. The device according to claim 1, wherein said at least one reading distance at which the driver is adapted to drive the light sources so as to switch off at least the light sources that illuminate outside of the boundary of the region framed by the sensor on the substrate comprises a plurality of reading distances within a depth of field (DOF).

4. The device according to claim 3, wherein the reading distances at which the driver is adapted to drive the light sources so as to switch off at least the light sources that illuminate outside of the boundary of the region framed by the sensor on the substrate are discrete from one another.

5. The device according to claim 3, wherein the reading distances at which the driver is adapted to drive the light source so as to switch off at least the light sources that illuminate outside of the boundary of the region framed by the sensor on the substrate are variable with continuity within the depth of field.

6. The device according to claim 1, wherein the image forming device further comprises at least one receiver optics.

7. The device according to claim 6, wherein the receiver optics comprises at least one single lens or optical group shared by the photosensitive elements of the sensor and/or an array of lenses, prismatic surfaces and/or diaphragms each associated with a photosensitive element or sub-group of photosensitive elements.

8. The device according to claim 1, wherein the reception axis coincides with normal to a plane of the sensor.

9. The device according to claim 1, wherein the reception axis is inclined with respect to normal to a plane of the sensor by an angle.

10. The device according to claim 1, wherein the array of light sources is associated with at least one projection lens.

11. The device according to claim 10, wherein at least one projection lens is provided, shared by the light sources of the array.

12. The device according to chum 10, wherein each light source is provided with an optical element selected from the group consisting of its own projection lens, a diaphragm, a prismatic surface, a light guide, a gradient index lens, and combinations thereof.

13. The device according to claim 1, wherein the illumination axis coincides with normal to a plane of the array.

14. The device according to claim 1, wherein the illumination axis is inclined with respect to normal to a plane of the array by an angle.

15. The device according to claim 1, wherein the illumination axis is parallel to and spaced from the reception axis.

16. The device according to claim 1, wherein the illumination axis is inclined with respect to the reception axis.

17. The device according to claim 1, wherein the array and the sensor are coplanar.

18. The device according to claim 1, wherein the array and the sensor are arranged on planes inclined to each other.

19. The device according to claim l, wherein the number of light sources is selected so that the area overall illuminated on the substrate by the illumination device undergoes a percentage change that is less than or equal to 15% when a single light source is switched on/off.

20. The device according to claim 19, wherein the percentage change is less than or equal to 10%.

21. The device according to claim 1, wherein the drive is adapted so as not to switch on all of the light sources of the array at any reading distance.

22. The device according to claim 1, wherein the driver is adapted to switch off all of the light sources that illuminate outside of the boundary of the region framed by the sensor at the reading distance, and to switch on all of the sources that illuminate within the boundary of the region framed by the senor hr an operating mode.

23. The device according to claim 1, wherein the driver is adapted to switch on only the light sources that illuminate at least one region of interest within the region framed by the sensor in an operating mode.

24. The device according to claim 1, wherein the driver responds to a measurer of, or device for estimating, the reading distance.

25. The device according to claim 1, wherein the driver is adapted to switch on light sources of the array selected to project it luminous figure for evaluation of the reading distance in an operating mode.

26. The device according to claim 1, wherein the driver is adapted to switch on light sources of the array selected to overall illuminate a luminous figure for aiming the region framed by the sensor or at least one region of interest thereof in an operating mode.

27. The device according to claim 1, wherein the driver is adapted to switch on light sources of the array selected to overall illuminate a luminous figure for indicating the outcome of an attempt at capturing an image within the region frame by the sensor in an operating mode.

28. The device according to claim 1, wherein the light sources of the array are individually drivable also in intensity of emission.

29. The device according to claim 1, wherein the array of light sources is suitable for emitting light of more than one wavelength.

30. The device according to claim 1, wherein the array of light sources is selected from the group consisting of a one-dimensional array and a two-dimensional array.

31. The device according to claim 1, wherein the array of light sources is selected from the group consisting of a fiat array and a curved array.

32. The device according to claim 30, wherein the number of light sources of the array is greater than or equal to 32 in the one-dimensional case, or 32×32 in the two-dimensional case, respectively.

33. The device according to claim 1, wherein the driver is adapted to switch off at least all of the sources that illuminate outside of the boundary of a first half of the region framed by the sensor at the reading distance, the image capturing device further comprising a second array of individually drivable, adjacent light sources, defining a second illumination axis, the second illumination axis not coinciding with the reception axis and the driver of the light sources being adapted to drive the light sources of the second array so as to switch off at least the light sources that illuminate outside of the boundary of a second half of the region framed by the sensor, complement to the first half.

34. The device according to claim 1, wherein the image capturing device further comprises a second array of individually drivable, adjacent light sources, defining a second illumination axis, the second illumination axis not coinciding with the reception axis, and the driver of the light sources being adapted to drive the light sources of the second array so as to switch off at least the light sources that illuminate outside of the boundary of the region framed by the sensor.

35. The device according to claim 1, wherein the subset of light. sources to be switched on is carried out along a plurality of radially spaced directions.

36. The device according to claim 35, wherein the subset of light sources to be switched on is determined by an interpolation of the positions of extreme light sources to he switched on along said plurality of radially spaced directions.

37. The device according to claim 1, wherein the light sources of the array are solid state light source or organic light sources,and include LEDs, OLEDs, microLEDs or microlasers.

38. An imager type reader of optical information comprising an illumination device according to claim 1.

39. The device according to claim 1, wherein the subset of light sources to be switched on is carried out along a plurality of radially spaced directions.

40. The device according to claim 39, wherein the subset of light sources to be switched on is determined by an interpolation of the positions of extreme light sources to be switched on along said plurality of radially spaced directions.

41. A non-transitory, machine readable storage medium encoded with program code adapted to manage in a parametric manner at least one quantity of an image capturing device, said image capturing device comprising:
    an image forming device including a sensor including a one-dimensional or two-dimensional array of photosensitive elements, and defining an optical reception axis at least one reading distance, and a region framed by the sensor on a substrate at said at least one readine distance,
    an illumination device including an array of adjacent light sources defining an optical illumination axis,
    wherein:
    light sources are individually drivable and each light source is adapted to illuminate an area that does not overlap with areas illuminated by light sources in the array adjacent to the each light source,
    the optical illumination axis does not coincide with the optical reception aixs, and
    a driver of the light sources is adapted to drive the sources so as to switch off at least the light sources that illuminate outside of the boundary of the region framed by the sensor on the substrate at said at least one reading distance,
    wherein when the program code is executed by a processor, the processor performs a method, the method comprising for an actual value of said at least one quantity, determining the light sources to switch on or off, respectively, as a function of the reading distance, and outputting a look-up table of the light sources to he switched on or off, respectively, as a function of the reading distance.

42. An imager type image capturing device, comprising:
    an image forming device including a sensor including a one-dimeitsional or two-dimensional array of photosensitive elements, and delining an optical reception axis, at least one reading distance, and a region framed by the sensor on a substrate at said at least one rending distance,
    an illumination device including an array of adjacent light sources, defining an optical illumination axis,
    wherein:
    the light sources are individually drivable and each light source is adapted to illuminate an area of a size much smaller than the size of said legion framed by the sensor,
    the optical illumination axis does not coincide with the optical reception axis,
    a driver of the light sources is adapted to drive the light sources so as to switch off at least the light sources that illuminate outside of the boundary of the region framed by the sensor on the substrate at said at least one reading distance,
    the driver is adapted to runtime determine which light sources of the array to switch on or off, respectively, as a function at least of the reading distance,
    the run-time determining is carried out at least in part based on analytics performed by the driver, and
    the driver is adapted to:
    calculate coordinates of peculiar points of the region framed on the substrate by the sensor in a first reference system associated with the reception image forming device;

transform the coordinates into a second reference system associated with the illumination device; and calculate the light sources of the array that illuminate corresponding peculiar points in the second reference system.

\* \* \* \* \*